United States Patent
Sikora et al.

(10) Patent No.: US 12,145,822 B2
(45) Date of Patent: Nov. 19, 2024

(54) INTEGRATED AND MODULAR SUSPENDED LOAD CONTROL APPARATUSES, SYSTEMS, AND METHODS

(71) Applicant: Vita Inclinata IP Holdings LLC, Broomfield, CO (US)

(72) Inventors: Derek Sikora, Denver, CO (US); Caleb B. Carr, Denver, CO (US); Adam L.K. Philipp, Mercer Island, WA (US)

(73) Assignee: Vita Inclinata IP Holdings LLC, Broomfield, CO (US)

( * ) Notice: Subject to any disclaimer, the term of this patent is extended or adjusted under 35 U.S.C. 154(b) by 55 days.

(21) Appl. No.: 17/752,509

(22) Filed: May 24, 2022

(65) Prior Publication Data

US 2022/0281721 A1 Sep. 8, 2022

Related U.S. Application Data

(63) Continuation of application No. 17/398,638, filed on Aug. 10, 2021, which is a continuation-in-part of
(Continued)

(51) Int. Cl.
*B66C 13/08* (2006.01)
*A61G 1/06* (2006.01)
(Continued)

(52) U.S. Cl.
CPC ............. *B66C 13/085* (2013.01); *A61G 1/06* (2013.01); *A61G 3/006* (2013.01); *B64D 1/22* (2013.01);
(Continued)

(58) Field of Classification Search
CPC ....... B66C 13/085; B66C 13/063; A61G 1/06; A61G 3/006; A61G 2220/10; B64D 1/22
See application file for complete search history.

(56) References Cited

U.S. PATENT DOCUMENTS

| | | |
|---|---|---|
| 1,935,283 A | 11/1933 | Adams |
| 2,264,936 A | 12/1941 | Dorsa |

(Continued)

FOREIGN PATENT DOCUMENTS

| | | |
|---|---|---|
| CN | 114423703 A | 4/2022 |
| EP | 0606108 A1 | 7/1994 |

(Continued)

OTHER PUBLICATIONS

Extended European Search Report and Search Opinion, Application No. EP 19 751 097.7, mailed Aug. 31, 2021, 15 pages.
(Continued)

*Primary Examiner* — Kyle O Logan
(74) *Attorney, Agent, or Firm* — Martin Spencer Garthwaite

(57) ABSTRACT

Load control apparatuses, systems and methods to control a location, orientation, or rotation of a suspended load by imparting thrust vectors to the suspended load or to a structure that holds the load. The load control apparatuses, systems and method may be integrated into a structure that holds a load, such as a rescue litter. The load control apparatuses, systems, and methods may be modular. The modular load control apparatuses, systems, and methods may be secured to a load or to a structure that holds the load.

17 Claims, 38 Drawing Sheets

Related U.S. Application Data application No. 16/988,373, filed on Aug. 7, 2020, which is a continuation of application No. PCT/US2019/013603, filed on Jan. 15, 2019, said application No. 17/398,638 is a continuation-in-part of application No. PCT/US2020/042936, filed on Jul. 21, 2020, which is a continuation-in-part of application No. PCT/US2020/017790, filed on Feb. 11, 2020.

(60) Provisional application No. 62/757,414, filed on Nov. 8, 2018, provisional application No. 62/627,920, filed on Feb. 8, 2018, provisional application No. 62/931,666, filed on Nov. 6, 2019, provisional application No. 62/876,721, filed on Jul. 21, 2019, provisional application No. 62/804,020, filed on Feb. 11, 2019.

(51) Int. Cl.
*A61G 3/00* (2006.01)
*B64D 1/22* (2006.01)
*B66C 13/06* (2006.01)

(52) U.S. Cl.
CPC ........ *B66C 13/063* (2013.01); *A61G 2220/10* (2013.01)

(56) References Cited

U.S. PATENT DOCUMENTS

| | | | |
|---|---|---|---|
| 2,428,656 A | 10/1947 | Elliott et al. | |
| 2,513,646 A | 7/1950 | August | |
| 2,651,533 A | 9/1953 | Cecil | |
| 2,717,656 A | 9/1955 | Bannister | |
| 3,036,797 A | 5/1962 | Domenico | |
| 3,044,818 A | 7/1962 | Harry | |
| 3,210,115 A | 10/1965 | Irving et al. | |
| 3,265,336 A | 8/1966 | Peterson | |
| 3,498,476 A | 3/1970 | Mattson et al. | |
| 3,554,468 A | 1/1971 | Mcvicar | |
| 3,598,440 A | 8/1971 | Ramsden et al. | |
| 3,601,342 A | 8/1971 | Piasecki | |
| 3,602,544 A | 8/1971 | Marsh | |
| 3,656,796 A | 4/1972 | Cook | |
| 3,690,602 A | 9/1972 | Marsh | |
| 3,724,817 A | 4/1973 | Simons | |
| 3,780,220 A * | 12/1973 | Fugitt | B63C 11/48 |
| | | | 348/81 |
| 3,829,052 A | 8/1974 | Flannelly | |
| 3,838,836 A | 10/1974 | Asseo et al. | |
| 3,904,156 A | 9/1975 | Smith | |
| 3,946,971 A * | 3/1976 | Chadwick | B64D 1/08 |
| | | | 244/137.4 |
| 4,124,181 A | 11/1978 | Kolwey | |
| 4,138,078 A | 2/1979 | Hester et al. | |
| 4,267,987 A | 5/1981 | McDonnell | |
| 4,364,704 A | 12/1982 | Dreesen et al. | |
| 4,378,919 A | 4/1983 | Smith | |
| 4,553,719 A | 11/1985 | Ott | |
| 4,601,444 A | 7/1986 | Lindenbaum | |
| 4,695,012 A | 9/1987 | Lindenbaum | |
| 4,747,745 A | 5/1988 | Pippen et al. | |
| 4,826,109 A | 5/1989 | Camus | |
| 4,881,601 A | 11/1989 | Smith | |
| 4,883,184 A | 11/1989 | Albus | |
| 4,889,297 A | 12/1989 | Ikeda | |
| 4,984,757 A | 1/1991 | Hartung et al. | |
| 5,071,184 A | 12/1991 | Dessaux | |
| 5,071,573 A | 12/1991 | Coffindaffer et al. | |
| 5,125,707 A | 6/1992 | Chaen et al. | |
| 5,131,491 A | 7/1992 | Varner et al. | |
| 5,143,326 A | 9/1992 | Parks | |
| 5,190,250 A | 3/1993 | DeLong et al. | |
| 5,249,652 A | 10/1993 | Leitzman et al. | |
| 5,273,333 A | 12/1993 | Hatfield et al. | |
| 5,299,845 A | 4/1994 | Gabriel | |
| 5,344,203 A | 9/1994 | Tollenaere | |
| 5,352,056 A | 10/1994 | Chandler | |
| 5,358,219 A | 10/1994 | Shenk et al. | |
| 5,396,815 A | 3/1995 | Polites et al. | |
| 5,443,566 A | 8/1995 | Rushmer et al. | |
| 5,451,032 A | 9/1995 | Rhoads | |
| 5,465,925 A | 11/1995 | Connolly et al. | |
| 5,499,785 A | 3/1996 | Roberts et al. | |
| 5,518,205 A | 5/1996 | Wurst et al. | |
| 5,524,870 A | 6/1996 | Tallent et al. | |
| 5,562,394 A | 10/1996 | Brown, Jr. | |
| 5,593,113 A | 1/1997 | Cox | |
| 5,613,722 A | 3/1997 | Fandrich et al. | |
| 5,816,098 A | 10/1998 | Kanki et al. | |
| 5,816,636 A | 10/1998 | Gibson et al. | |
| 5,871,249 A | 2/1999 | Williams | |
| 5,898,746 A | 4/1999 | Baversten et al. | |
| 5,927,438 A | 7/1999 | Ostrobrod | |
| 5,961,563 A | 10/1999 | Overton | |
| 6,189,834 B1 | 2/2001 | Dietz et al. | |
| 6,199,793 B1 | 3/2001 | Hainsworth et al. | |
| 6,439,407 B1 | 8/2002 | Jacoff et al. | |
| 6,533,220 B2 | 3/2003 | Schuster | |
| D473,482 S | 4/2003 | Felmingham | |
| 6,578,796 B2 | 6/2003 | Maeda | |
| 6,708,926 B2 | 3/2004 | Bonisch | |
| 6,814,185 B1 | 11/2004 | Ostrobrod | |
| 6,983,833 B2 | 1/2006 | Ivers et al. | |
| 7,028,351 B1 * | 4/2006 | Frieder | A61G 3/0858 |
| | | | 244/118.6 |
| 7,131,515 B2 | 11/2006 | Gartsbeyn et al. | |
| 7,267,240 B2 | 9/2007 | Maurer et al. | |
| 7,720,582 B2 | 5/2010 | Makinadjian | |
| D617,293 S | 6/2010 | Yoshihashi | |
| 7,887,011 B1 | 2/2011 | Baldwin | |
| 7,948,237 B2 | 5/2011 | Kuzmin et al. | |
| 8,131,384 B2 | 3/2012 | Karpman et al. | |
| 8,157,205 B2 * | 4/2012 | McWhirk | B64B 1/06 |
| | | | 244/30 |
| 8,226,042 B1 * | 7/2012 | Howell | B64D 1/22 |
| | | | 244/137.4 |
| 8,231,083 B2 | 7/2012 | Kutzmann et al. | |
| 8,292,229 B2 | 10/2012 | Pancotti et al. | |
| D671,293 S | 11/2012 | Fredriksson | |
| 8,413,923 B2 | 4/2013 | Brenner et al. | |
| 8,496,279 B2 | 7/2013 | Aoki | |
| 8,534,607 B2 | 9/2013 | Tardiff et al. | |
| 8,534,608 B1 | 9/2013 | Cox, IV | |
| 8,591,161 B1 | 11/2013 | Bernhardt | |
| 8,840,355 B1 | 9/2014 | Kulesha | |
| 8,886,402 B1 | 11/2014 | Lou | |
| 8,888,048 B2 | 11/2014 | Figoureux et al. | |
| 8,894,050 B2 | 11/2014 | Wootten et al. | |
| 8,899,903 B1 | 12/2014 | Saad et al. | |
| 8,903,568 B1 | 12/2014 | Wang et al. | |
| 8,925,901 B2 | 1/2015 | Gaillard | |
| 8,938,325 B1 * | 1/2015 | McGinnis | B66C 13/08 |
| | | | 701/4 |
| 8,967,533 B2 | 3/2015 | DeVaul et al. | |
| 9,027,976 B1 | 5/2015 | Tollenaere | |
| 9,096,294 B1 | 8/2015 | Dong et al. | |
| 9,114,871 B2 | 8/2015 | Woodworth et al. | |
| 9,194,977 B1 | 11/2015 | Dungan et al. | |
| 9,205,922 B1 * | 12/2015 | Bouwer | B64D 1/22 |
| 9,223,008 B1 | 12/2015 | Hartman et al. | |
| 9,242,741 B1 | 1/2016 | Cockell | |
| 9,302,770 B2 | 4/2016 | Burgess et al. | |
| 9,375,841 B1 | 6/2016 | Kemper | |
| 9,422,139 B1 | 8/2016 | Bialkowski et al. | |
| 9,688,404 B1 | 6/2017 | Buchmueller et al. | |
| 9,797,723 B1 | 10/2017 | Huang | |
| 9,800,091 B2 | 10/2017 | Nugent, Jr. et al. | |
| 9,836,063 B1 | 12/2017 | Bonawitz et al. | |
| 9,849,981 B1 | 12/2017 | Burgess et al. | |
| 9,850,113 B2 | 12/2017 | Melin et al. | |
| 9,881,506 B1 * | 1/2018 | Gentry | H04W 76/10 |
| 9,908,756 B2 | 3/2018 | Heravi et al. | |
| 9,958,876 B2 | 5/2018 | Lind et al. | |

(56) References Cited

U.S. PATENT DOCUMENTS

| | | |
|---|---|---|
| 10,023,312 B2 | 7/2018 | Repp et al. |
| 10,023,313 B2 | 7/2018 | Behrens et al. |
| 10,071,804 B1 | 9/2018 | Buchmueller et al. |
| 10,112,805 B1 | 10/2018 | Joralmon |
| 10,286,943 B1 | 5/2019 | Greenblatt et al. |
| 10,288,075 B2 | 5/2019 | Ishiba |
| 10,451,504 B2 | 10/2019 | Campbell et al. |
| 10,479,503 B2 | 11/2019 | Sikora et al. |
| 10,519,013 B2 | 12/2019 | Curran et al. |
| 10,676,190 B2 | 6/2020 | Mitchell et al. |
| 10,870,558 B2 | 12/2020 | Sikora et al. |
| 10,899,586 B2 | 1/2021 | Cranney, III |
| 10,918,892 B2 | 2/2021 | Dickson |
| 10,940,061 B2 | 3/2021 | Sikora et al. |
| 10,960,976 B2 † | 3/2021 | Bosma |
| 11,008,198 B2 | 5/2021 | Sikora et al. |
| 11,142,316 B2 | 10/2021 | Sikora et al. |
| 11,142,433 B2 | 10/2021 | Sikora et al. |
| 11,209,836 B1 | 12/2021 | Sikora et al. |
| 11,339,034 B2 | 5/2022 | Sikora et al. |
| 11,370,642 B2 | 6/2022 | Markwell |
| 11,535,496 B2 | 12/2022 | Al-Husseini et al. |
| 2002/0113448 A1 | 8/2002 | Kazerooni et al. |
| 2003/0085319 A1 | 5/2003 | Wagner et al. |
| 2003/0121024 A1 | 6/2003 | Hill et al. |
| 2003/0220177 A1 | 11/2003 | Orlando |
| 2004/0026349 A1 | 2/2004 | Colgate et al. |
| 2004/0032140 A1 | 2/2004 | Solstad |
| 2005/0072965 A1 | 4/2005 | Sanders et al. |
| 2005/0242237 A1 | 11/2005 | Scott |
| 2006/0163892 A1 | 7/2006 | Nguyen et al. |
| 2006/0226281 A1* | 10/2006 | Walton ............... B64C 27/20 244/17.23 |
| 2007/0200032 A1 | 8/2007 | Eadie et al. |
| 2008/0027566 A1 | 1/2008 | Baek et al. |
| 2008/0272566 A1 | 11/2008 | Thompson |
| 2009/0004004 A1 | 1/2009 | Vincenzi |
| 2009/0152391 A1 | 6/2009 | McWhirk |
| 2009/0200428 A1 | 8/2009 | Smith et al. |
| 2010/0000349 A1 | 1/2010 | Stevens et al. |
| 2010/0012771 A1 | 1/2010 | Jess |
| 2010/0176618 A1 | 7/2010 | Souke et al. |
| 2010/0237183 A1 | 9/2010 | Wilson et al. |
| 2010/0291707 A1 | 11/2010 | Mirkin et al. |
| 2010/0319910 A1 | 12/2010 | Ives et al. |
| 2011/0168514 A1 | 7/2011 | Lee |
| 2011/0192932 A1 | 8/2011 | Brenner et al. |
| 2012/0006779 A1 | 1/2012 | Mills et al. |
| 2012/0145832 A1 | 6/2012 | Schuster |
| 2012/0150364 A1 | 6/2012 | Tillotson et al. |
| 2012/0231682 A1* | 9/2012 | Roodenburg ......... B63H 25/42 440/54 |
| 2012/0271582 A1 | 10/2012 | Bageshwar et al. |
| 2012/0292434 A1 | 11/2012 | Welsh |
| 2012/0293177 A1* | 11/2012 | Dodds ................. G01V 3/17 324/330 |
| 2013/0054054 A1 | 2/2013 | Tollenaere et al. |
| 2013/0056586 A1 | 3/2013 | Occhiato et al. |
| 2013/0270393 A1 | 10/2013 | Shrapnel |
| 2013/0299634 A1 | 11/2013 | Haggard |
| 2014/0154965 A1 | 6/2014 | Han et al. |
| 2014/0224755 A1* | 8/2014 | Eriksson ................ G01C 9/08 700/228 |
| 2014/0252170 A1 | 9/2014 | Prud'Homme-Lacroix |
| 2014/0333232 A1 | 11/2014 | Verheyen |
| 2015/0041598 A1 | 2/2015 | Nugent et al. |
| 2015/0151837 A1 | 6/2015 | Sane et al. |
| 2015/0266570 A1* | 9/2015 | Metreveli .............. B64C 27/20 244/17.23 |
| 2015/0360779 A1 | 12/2015 | Behrens et al. |
| 2016/0009393 A1 | 1/2016 | Repp et al. |
| 2016/0009531 A1 | 1/2016 | Saliba et al. |
| 2016/0031683 A1 | 2/2016 | Fenker et al. |
| 2016/0048131 A1 | 2/2016 | Lesperance et al. |
| 2016/0236779 A1 | 8/2016 | Thomas et al. |
| 2016/0240417 A1 | 8/2016 | Tomida |
| 2016/0297650 A1 | 10/2016 | Bang |
| 2016/0298962 A1 | 10/2016 | Lee |
| 2016/0332728 A1 | 11/2016 | Winfree et al. |
| 2016/0340030 A1 | 11/2016 | Roussey et al. |
| 2016/0340035 A1 | 11/2016 | Duru |
| 2016/0340039 A1 | 11/2016 | Waltner et al. |
| 2017/0009859 A1 | 1/2017 | Sevagen |
| 2017/0052676 A1 | 2/2017 | Puller et al. |
| 2017/0073055 A1 | 3/2017 | Song |
| 2017/0088261 A1 | 3/2017 | Sequeira et al. |
| 2017/0129749 A1 | 5/2017 | Mijangos et al. |
| 2017/0138737 A1 | 5/2017 | Cordova et al. |
| 2017/0197718 A1 | 7/2017 | Buchmueller |
| 2017/0217566 A1 | 8/2017 | Ichinose |
| 2017/0276139 A1 | 9/2017 | Ishiba |
| 2017/0284795 A1 | 10/2017 | Carlson et al. |
| 2017/0291707 A1 | 10/2017 | Veronesi et al. |
| 2018/0297650 A1 | 2/2018 | Bang et al. |
| 2018/0057318 A1 | 3/2018 | Benton et al. |
| 2018/0072404 A1 | 3/2018 | Prager et al. |
| 2018/0099748 A1 | 4/2018 | Lesperance et al. |
| 2018/0208309 A1 | 7/2018 | Wang |
| 2018/0229855 A1 | 8/2018 | Sane et al. |
| 2018/0251346 A1* | 9/2018 | Thomson ................. B66C 1/10 |
| 2018/0252616 A1 | 9/2018 | Bryson et al. |
| 2018/0282130 A1 | 10/2018 | Kale et al. |
| 2018/0339891 A1 | 11/2018 | Ijadi-Maghsoodi et al. |
| 2019/0016480 A1 | 1/2019 | Kashiwa et al. |
| 2019/0031474 A1 | 1/2019 | Stilborn et al. |
| 2019/0033892 A1 | 1/2019 | Gomez et al. |
| 2019/0193827 A1 | 6/2019 | Zerweckh |
| 2019/0236370 A1 | 8/2019 | Man |
| 2019/0241267 A1 | 8/2019 | Sikora et al. |
| 2019/0337776 A1 | 11/2019 | Fanello et al. |
| 2020/0087121 A1 | 3/2020 | Ohayon et al. |
| 2020/0165010 A1 | 5/2020 | Sun et al. |
| 2020/0182252 A1 | 6/2020 | Nakasuji et al. |
| 2020/0210704 A1 | 7/2020 | Han et al. |
| 2020/0222257 A1 | 7/2020 | Sikora et al. |
| 2020/0231415 A1 | 7/2020 | Sikora et al. |
| 2020/0271270 A1 | 8/2020 | Sikora et al. |
| 2020/0369492 A1 | 11/2020 | Sikora et al. |
| 2020/0400330 A1 | 12/2020 | Przybylski et al. |
| 2021/0371250 A1 | 12/2021 | Bedgood et al. |
| 2021/0371252 A1 | 12/2021 | Sikora et al. |
| 2022/0121225 A1 | 4/2022 | Sikora et al. |
| 2022/0135378 A1 | 5/2022 | Sikora et al. |
| 2022/0274696 A1 | 9/2022 | Sikora et al. |
| 2022/0274809 A1 | 9/2022 | Sikora et al. |
| 2022/0277472 A1 | 9/2022 | Birchfield et al. |
| 2022/0281721 A1 | 9/2022 | Sikora et al. |
| 2022/0371736 A1 | 11/2022 | Sikora et al. |
| 2023/0117935 A1 | 4/2023 | Al-Husseini et al. |

FOREIGN PATENT DOCUMENTS

| | | |
|---|---|---|
| GB | 2327657 A | 2/1999 |
| GB | 2457149 A | 8/2009 |
| GB | 2513646 A | 11/2014 |
| GB | 2513646 B | 11/2014 |
| JP | H04256686 A | 9/1992 |
| JP | H0543184 A | 2/1993 |
| JP | H05193584 A | 8/1993 |
| JP | H07179288 A | 7/1995 |
| JP | 08312588 A | 11/1996 |
| JP | 09317795 A | 12/1997 |
| JP | H09317795 A | 12/1997 |
| JP | 10032961 | 2/1998 |
| JP | H10305989 A | 11/1998 |
| JP | H1111859 A | 1/1999 |
| JP | 11037093 A | 2/1999 |
| JP | 2013203394 A | 10/2013 |
| JP | 2016210607 A | 12/2016 |
| JP | 2018140860 A | 9/2018 |
| JP | 2019023143 A | 2/2019 |
| JP | 6554258 B1 | 7/2019 |
| JP | 2021011386 A | 2/2021 |

(56) References Cited

FOREIGN PATENT DOCUMENTS

| JP | 2022529961 A | 6/2022 |
| JP | 2022530316 A | 6/2022 |
| NO | 20171181 A1 | 1/2019 |
| WO | 2011012915 A1 | 2/2011 |
| WO | 2014076189 A1 | 5/2014 |
| WO | 2018090104 A1 | 5/2018 |
| WO | 2018234670 A1 | 12/2018 |

OTHER PUBLICATIONS

Internal Search Report mailed Apr. 30, 2020 for PCT/US2020/017790, filed Feb. 11, 2020.

International Search Report dated Apr. 3, 2019, for PCT/US19/13603 filed Jan. 15, 2019.

International Search Report in PCT/US2020/062414, mailed Feb. 19, 2021, entire document.

International Search Report mailed May 27, 2020 for PCT.US20/19967 filed Feb. 26, 2020.

International Search Report mailed Oct. 6, 2020, for PCT/US2020/042936, filed Jul. 2020.

Phillip J. McKerrow, The design of a tethered aerial robot, Faculty of Informatics—Papers (Archive) Faculty of Engineering and InformationSciences University of Wollongong, Oct. 4, 2007, pp. 1-8, University of Wollongong, Australia, https://ro.uow.edu.au/infopapers/519.

Written Opinion in PCT/US2020/062414, mailed Feb. 19, 2021, entire document.

Written Opinion mailed Apr. 3, 2019, for PCT/US19/13603, filed Jan. 15, 2019.

Written Opinion mailed Apr. 30, 2020 for PCT/US20/017790, filed Feb. 11, 2020.

Written Opinion mailed May 27, 2020, for PCT/US20/19967, filed Feb. 26, 2020.

Written Opinion mailed Oct. 6, 2020 for PCT/US2020/042936 filed Jul. 21, 2020.

Young, L.A ,"Enhanced Rescue Lift Capability", 63rd Annual Forum of the AHS international, Virginia Beach, VA, May 1-3, 2007 (May 2007). FIG.2,5, 12, 16, Abstract pp. 6-12.

\* cited by examiner
† cited by third party

INTEGRATED AND MODULAR SUSPENDED LOAD CONTROL APPARATUSES, SYSTEMS, AND METHODS

CROSS-REFERENCE TO RELATED APPLICATIONS

This application is a continuation of U.S. patent application Ser. No. 17/398,638, filed 2021 Aug. 10; Ser. No. 17/398,638 is a continuation-in-part of U.S. patent application Ser. No. 16/988,373, filed 2020 Aug. 7; 16/988,373 is a continuation of Patent Cooperation Treaty application serial number PCT/US19/13603, filed 2019 Jan. 15; PCT/US19/13603 was a nonprovisional of and claimed the benefit of U.S. provisional patent application No. 62/757,414, filed 2018 Nov. 8; PCT/US19/13603 was a nonprovisional of and claimed the benefit of U.S. provisional patent application No. 62/627,920, filed 2018 Feb. 8; Ser. No. 17/398,638 further is a continuation-in-part of Patent Cooperation Treaty application serial number PCT/US20/42936, filed 2020 Jul. 21; PCT/US20/42936 was a nonprovisional of and claimed the benefit of U.S. provisional patent application No. 62/931,666, filed 2019 Nov. 6; PCT/US20/42936 was a nonprovisional of and claimed the benefit of U.S. provisional patent application No. 62/876,721, filed 2019 Jul. 21; Ser. No. 17/398,638 further is a continuation-in-part of Patent Cooperation Treaty application serial number PCT/US20/17790, filed 2020 Feb. 11; PCT/US20/17790 was a nonprovisional of and claimed the benefit of U.S. provisional patent application No. 62/804,020.

FIELD

This disclosure is directed to improved systems and methods to control suspended loads, such as loads suspended by cable from helicopters, cranes, or the like, including systems and methods for suspended load control that are integrated into or which are removably secured from a load or from a structure that holds the load.

BACKGROUND

People and/or equipment ("loads") may be transported to or from a location as a load suspended by a cable from a helicopter or crane, using a hoist system. The loads are not generally buoyant. Cranes, helicopters, and other structures capable of carrying a load with a hoist system may be referred to herein as "carriers". During such operations, loads are subject to winds and other external and internal factors that may cause the load to move in an unstable or hazardous manner. During such operations, it may be desirable to move the load to a location other than its lowest energy hanging position below the carrier.

In hoist and sling operations, observed motion of suspended loads includes the following components: vertical translation (motion up and down) along the Y axis (referred to herein as "vertical translation"); horizontal translation along either or both the X and Z axis; and rotation or "yaw" about the Y axis. Roll (rotation about the X axis) and pitch (rotation about the Y axis) may also occur, though if a load is suspended by a cable and is not buoyant, the typical motions are vertical translation, horizontal translation, and yaw. Axis, when discussed herein, are relative to a normal axis of a suspended load. Vertical and horizontal translation may be caused by movement of the suspension cable, such as by movement of the carrier, pulling in or paying out the suspension cable, movement of the load, differences in momentum between the load and the carrier, as well as by wind—including propeller wash—impacts, and external forces. Horizontal translation can manifest as lateral motion or as or conical pendulum motion of the load, with the pivot point of the pendulum being where the cable is secured to the carrier ("pendular motion"); pendular motion generally also includes a component of vertical translation.

Yaw, lateral motion, and pendular motion can complicate lift operations, cause delays, and can lead to death of aircrew, crane operators, and of people on the ground. Yaw can produce dizziness and disorientation in humans. Yaw and lateral and pendular motion can also interfere with bringing a load into or delivering a load to a location. For example, delivery of a load to a deck of a ship may be significantly complicated by pendular motion or yaw of the load, even if the deck is stable and is not also subject to heave, roll, or pitch, as it may be. For example, bringing a person in a litter into a helicopter or onto a helicopter strut may be hazardous if the litter is undergoing yaw or pendular motion as it is drawn up to the helicopter. One or more components of undesired motion of the load may accelerate or grow more pronounced as a load is drawn up to the carrier and the suspension cable shortens. Horizontal and pendular motion of a load can also interact with the carrier to produce dangerous or undesired reactive or sympathetic motion in the carrier.

In addition, some suspended load operations may involve an obstacle, such as a surface, cliff wall, building, bridge, tree limb, overhang, narrow passage or other obstacle that may interfere with one or more of carrier, load, and/or suspension cable. It may be desirable to move the load relative to such an obstacle, or for other reasons, in a manner which does not involve the load hanging at a lowest energy position below the carrier.

Management of loads and carriers would be improved if the load may be moved independently from the carrier, including horizontal translation, pendular motion, and yaw control.

Operators of carriers, such as helicopter and crane crews, may use legacy equipment that would benefit from independent load control.

DETAILED DESCRIPTION

Figure 1:
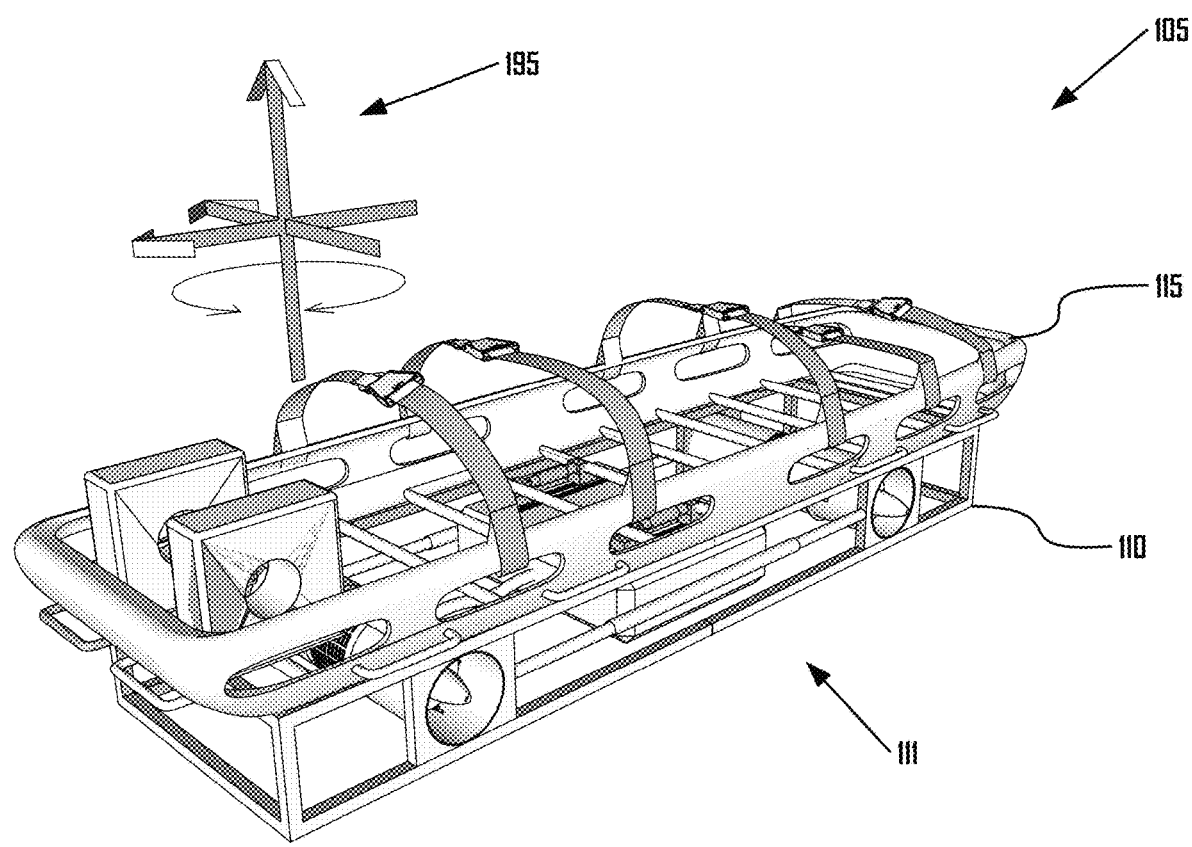
FIG. 1 is a perspective view of a suspended load control system ("SLCS") releasably secured to a litter, in accordance with an embodiment.

It is intended that the terminology used in the description presented below be interpreted in its broadest reasonable manner, even though it is being used in conjunction with a detailed description of certain examples of the technology. Although certain terms may be emphasized below, any terminology intended to be interpreted in a restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "coupled," or any variant thereof means any coupling, either direct or indirect between two or more elements; a coupling between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list. References may be made herein to modules, routines, and subroutines; generally, it should be understood that a module or routine is a software program executed by computer hardware and that a subroutine is a software program executed within a module or routine. However, modules or routine discussed herein may be executed within another module or routine and submodules or subroutines may be executed independently (modules or routines may be submodules or subroutines and visa versa).

As used herein, "releasable," "connect," "connected," "connectable," "disconnect," "disconnected," and "disconnectable" refers to two or more structures which may be connected or disconnected, generally without the use of tools (examples of tools including screwdrivers, pliers, wrenches, drills, saws, welding machines, torches, irons, and other heat sources) and generally in a repeatable manner. As used herein, "attach," "attached," or "attachable" refers to two or more structures or components which are attached through the use of tools or chemical or physical bonding. As used herein, "secure," "secured," or "securable" refers to two or more structures or components which are either connected or attached.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Approaches to control suspended loads include countermeasures installed on a carrier. For example, some airframes, such as the Skycrane™, have a rail system installed beneath a cabin to mitigate sway of a load, though, being remote from the suspended load, such rail system has margin effect. Some approaches to this problem involve automated countering algorithms in an aircraft's stability augmentation system, though, again, the effect of these measures is limited. At times, crew chiefs who remain within a helicopter during an extraction try to affect a suspended load by pushing or pulling a suspension cable from the helicopter; such efforts have limited effect and can be hazardous. Carriers may move loads at slow rates to minimize horizontal or pendular motion or may use additional suspension cables or dedicated control cables (whether on the ground, neighboring structures, or on a carrier); these measures increase costs, complexity, and risk of failure. All of these measures are inadequate and highly problematic.

In various embodiments, as described further herein, a suspended load control system provides control of a load, independent from a carrier. The suspended load control system or load stability system (referred to together as, "SLCS") of this disclosure controls a load by exerting force from thrusters, fans, or propellers, as are found in electric ducted fans at, or near, the location of the load. Thrusters, fans, propellers and electric ducted fans are referred to herein as "EDFs". Vector thrust force produced by the EDFs may be used to counteract yaw and pendular motion, may be used to translate a load horizontally, such as to avoid an obstacle or to move a load into an offset position relative to a normal lowest-energy hanging position, or may otherwise be used to control the fine location and yaw of a load, independently from the carrier. Consequently, an SLCS enhances mission safety and improves performance of carrier and load operations as the SLCS dynamically controls fine location and yaw of a load, separate from motion of the carrier.

As disclosed herein, an SLCS controls the motion of a suspended load through a system that may be releasably secured to or incorporated into the suspended load or a structure that holds the suspended load. The SLCS is agnostic with respect to the platform from which the load is suspended (e.g., the characteristics of a helicopter "ownship", or a crane, etc., or other carrier), as it independently determines thrust necessary to stabilize the load or to direct the load in a desired direction. This permits widespread adoption of the system regardless of carrier type, lowering cost and mitigating solution risks.

An SLCS can provide benefits to, for example, helicopter search and rescue ("SAR") and sling load operations, forest fire helicopters, crane operations, construction sling load operations, and civilian firefighting.

An SLCS may be releasably secured to an existing structure designed to hold other loads, such as litters, cages, platforms, or the like or an SLCS may be integrated into a structures designed to hold other loads.

Reference is now made in detail to the description of the embodiments illustrated in the drawings. While embodiments are described in relation to the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. For example, the embodiments set forth below are primarily described in the context of a helicopter sling load, search and rescue operations, and/or crane operations. However, these embodiments are illustrative examples and in no way limit the disclosed technology to any particular application or platform.

FIG. 1 is a perspective view of an embodiment of a litter-SLCS assembly 105, wherein litter 115 is releasably secured to an embodiment of an SLCS, SLCS 111. Illustrated in FIG. 1 is axis 195. Axis 195 illustrate 3-dimensional axis, including an X axis, a Y axis, and a Z axis. Axis 195 is illustrated with the X axis parallel to the long normal axis of litter 115, and with Y axis and Z axis perpendicular to the X axis and perpendicular to one another. Axis 195 further illustrates rotation, or yaw, about the Y axis. When references are made herein to clockwise or counter-clockwise yaw or to the right or left side of an SLCS, such references are made from a perspective of a party looking up from a lying position on the litter or equipment comprising the SLCS. Axis 195 are illustrated to provide a frame of reference to describe orientation of other components and are not a physical component.

Litter 115 may be, for example, a Stokes basket or Stokes litter, a stretcher, or a basket. Litter 115 may be designed to hold a human or other load. The human may be strapped to litter 115. Litter 115 may include a cervical collar, a spine board, and the like to immobilize the human. Litter 115 may include sides designed to withstand impacts. Litter 115 may include handles. Litter 115 may be existing inventory or equipment used by a SAR unit. Litter 115 is an example of a structure that holds a load.

SLCS 111 is illustrated as comprising frame 110. Frame 110 may be made of metal, plastic, and/or a composite material, such as fiber reinforced resin. SLCS 111 and frame 110 are discussed further in relation to FIG. 2.

Figure 2:
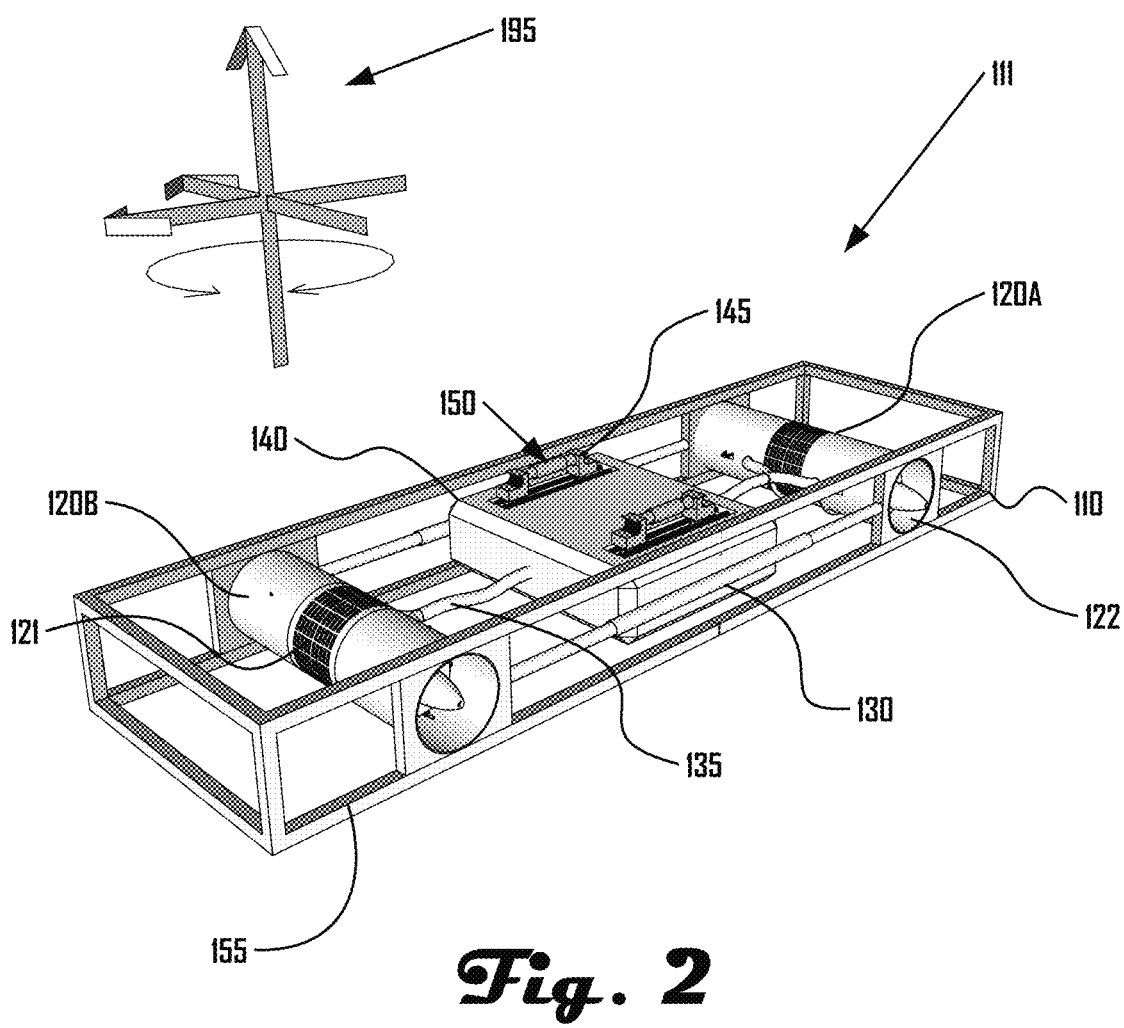
FIG. 2 is a perspective view of the suspended load control system ("SLCS") of FIG. 1, without the litter.

FIG. 2 a perspective view of SLCS 111 of FIG. 1, without litter 115. SLCS 111 comprises two fan units, fan unit 120A and 120B. A greater or lesser number of fan units may be used. For example, additional fan unit(s) perpendicular to, or with another offset relative to, fan units 120A and 120B may be incorporated into SLCS.

Fan unit 120 may comprise a cowl which protects one or more EDF. The cowl may be hardened to withstand impact with the environment. The cowl unit may be made of metal, plastics, composite materials, including fiber reinforced resin, and the like. Fan unit 120 may include air intake 121, though which air may be drawn, and outlet 122. Air intake 121 may comprise one or more screens or filters to prevent entry of some objects into EDF. As illustrated by way of the example in FIG. 2, fan unit 120 may comprise two EDF. The EDF in fan unit 120 may comprise blades and motor(s), such as electric motor(s). The electric motors within an EDF may be sealed against dust, sand, water, and debris.

The two EDF in fan unit 120 propel thrust fluid (such as air) in fixed directions, as illustrated, along the Z axis. In the embodiment illustrated in FIG. 2, the fixed directions are opposite each other on the Z axis; e.g. offset by 180 degrees along the Z axis. In other embodiments, a fewer or greater number of EDF may be used. In other embodiments, the EDF may be aligned other than as illustrated, e.g., offset by greater or fewer than 180 degrees, with or without offset along other of the axis. A mechanical steering component may be included (not illustrated) to dynamically reposition fan unit 120 and/or EDF within fan unit 120.

EDF in fan unit 120 may be activated individually or together, with the same or different power to the EDF, to produce thrust vectoring or thrust vector control of an assembly of fan units. For example, to produce clockwise yaw, an EDF in a left side of fan unit 120B may be activated by itself or in conjunction with an EDF in a right side of fan unit 120A. To produce left-ward lateral translation of SLCS-litter assembly 105 along the Z axis, EDF in the right side of both fan units 120A and 120B may be activated. Simultaneous lateral translation and rotation may be produced.

Illustrated in FIG. 2 is housing 140. Housing 140 may contain and protect computer hardware, such as a computer processor and memory, a power supply, electronic speed controllers, microcontrollers, sensors, and the like, such as load control system logical components 1601 and electrical component illustrated in FIGS. 24-26. Housing 140 may be secured to, for example, frame 110 as in FIG. 1. The power supply may be a single power brick or single battery or an array of battery cells wired in series and/or in parallel, such as lithium-polymer (LiPo) or lithium metal hydride (LiMH) cells. Batteries may be removable from housing 140 for inspection and/or to swap out or exchange discharged and charged batteries. Batteries in housing 140 may be charged while installed in the SLCS (i.e., without having to remove them) via nodes or a wireless charging system on or in SLCS 111 that is secured to a charging dock. Batteries may include auxiliary battery(ies) to supply a steady supply of power to processor, communications, and the like even if thrusters in fan units 120 draw a relatively large amount of power from and even deplete main batteries. In embodiments, a carrier, such as a helicopter or crane, from which the SLCS may suspended may provide power through a line extending down a suspension cable to the SLCS. In embodiments, the carrier may provide some power to the SLCS, while the SLCS may obtain other power from an on-board power supply. In various embodiments, the SLCS may be powered by a combination of on-board and remote power. In environments, all power for the SLCS may be contained on board, allowing fully autonomous operation without dependence on the availability of external power sources or delivery means.

Housing 140 may comprise a wireless or wireline data link which allows a microcontroller unit or processor to, among of functions, monitor power information including (but not limited to) cell voltage and real-time power dissipation or consumption. Other uses of such a data link are discussed herein.

Housing 140 may comprise a power controller to allow a computer processor and memory and, for example, a thrust control module in the memory, to control the speed, power draw, and thrust of thrusters in the EDF. The power controller may comprise, e.g., an electronic speed controller ("ESC") for an EDF. An ESC typically has at least three couplings: to the power supply, to a thruster, and to the processor or a microcontroller. The ESC and power controller pulls power from the power supply and allocates it to the thrusters to control the amount of thrust produced by the EDF.

Housing 140 may comprise a computer processor or central processing unit (CPU) and memory. The processor and memory may be an embedded system including a signal board computer and one or more microcontroller units ("MCUs") and memory units. The CPU, MCUs, and memory may be contained within, e.g., housing 140, in which data link couplings may be made. Housing 140 may be a rugged plastic or polymer, protecting the system from environmental and operational factors such as weather and other operational conditions. In some embodiments, the CPU, MCUs, and memory may be mounted to the same printed circuit board (PCB).

Housing 140 may comprise one or more wireless transceivers, which may comprise separate transmitter(s) and receiver(s), as well as antennas for wireless communication. The transceiver and/or wireless antennas may also be mounted to or printed on the same printed circuit board as CPU, MCUs, and memory. The wireless transceivers may comprise access points for Bluetooth, Wi-Fi, microwave, and/or radio frequency (RF) transmission and reception. Wireless transceivers may be used to communicate with remote sensors, a remote control interface, a remote positional unit or target node, a remote interface, and the like, as discussed further herein.

Housing 140 may comprise a vector navigation unit, which may include an inertial measurement unit ("IMU"). The IMU may provide inertial navigation data to the processor. IMU may be located in or proximate to fan unit 120.

SLCS 111 may comprise or be communicatively coupled to one or more sensors in addition to the IMU. Such additional sensors may comprise, for example, an inertial measurement system, an orientation measurement system, and an absolute position measurement system. The inertial measurement system ("IMS") may include 3 degrees of freedom (3DOF) accelerometers, gyroscopes, and gravitational sensors, which may comprise microelectromechanical systems (MEMS) sensors. The orientation measurement system may include a magnometer or magnetometer such as a compass, an inclinometer, a directional encoder, and a radio frequency relative bearing system. The absolute position measurement system may include global positioning system (GPS) sensors.

Sensors may further comprise a proximity sensor, such as a depth camera, or light detection and ranging (LIDAR) system (e.g., rotating or linear), and/or an optical sensor such as one or more cameras, infrared (IR) sensors, and/or distance or depth sensors. Proximity sensors may include ground height sensors. Optical sensors may also provide visual information to a user. This information may be communicated to remote devices by the SLCS processor, via a data link cable and/or the wireless transceiver. Proximity and optical sensors may allow the system to be capable of 360 degree awareness, to determine distance between a sensor and points or objects in the environment, perform collision avoidance through detection of obstacles (e.g., a portion of a tree canopy), altering the course of the SLCS or the orientation of a load to avoid the obstacles, and/or to avoid obstacles in the environment by rotating a load to equalize distance between sensors at distal ends of the load and obstacles in the environment and/or by presenting a smallest frontal area of the load to obstacles in the environment. The system may also be capable of providing ground (or water) position data to aircraft pilot and crew.

Figure 10:
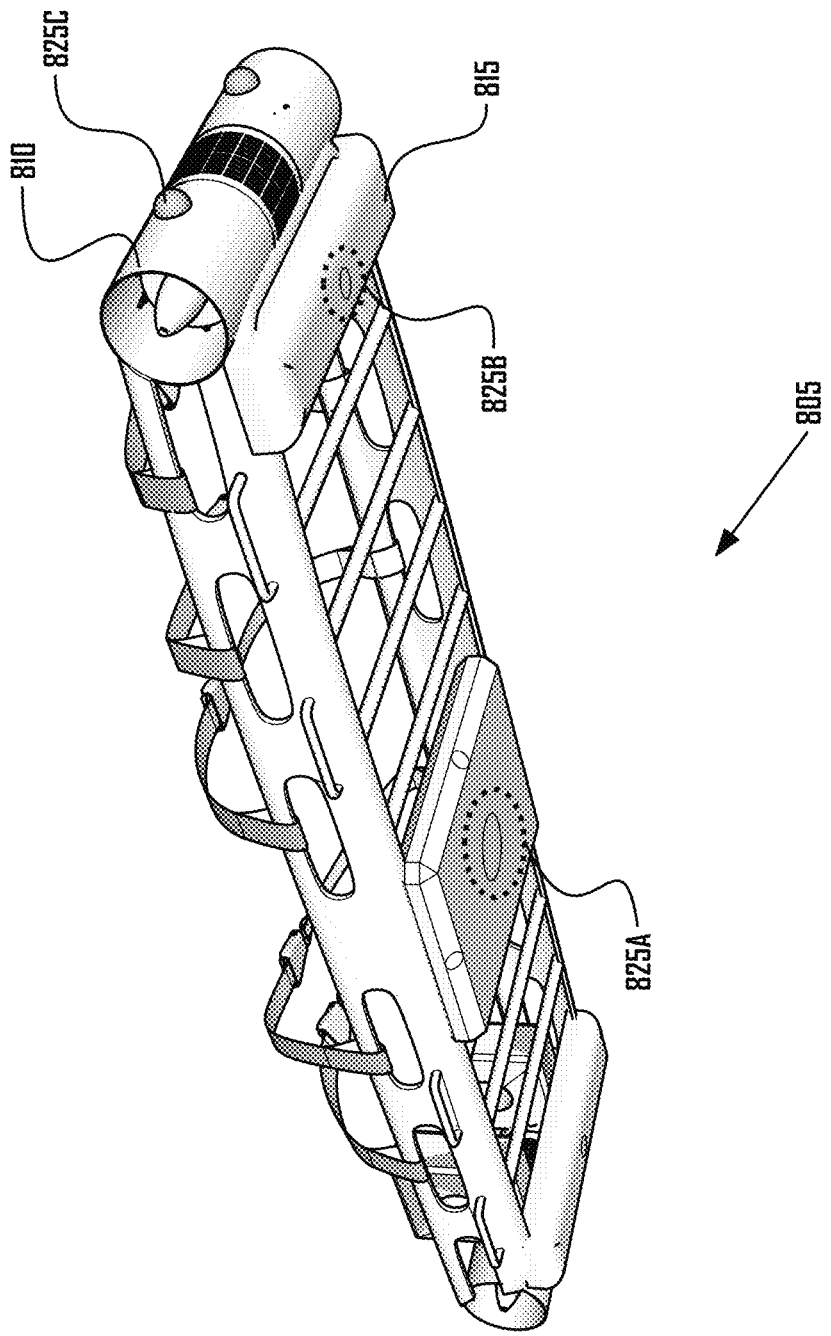
FIG. 10 is a perspective view of sensors in or of a suspended load control system ("SLCS"), in accordance with one embodiment.

Sensors which require a view of a surrounding environment may be placed on or at the surface of housing 140 and/or remote from housing 140. By way of example, embodiments of placement locations for such sensors are illustrated in FIG. 10 at sensor location 825A, 825B, and 825C. These sensor locations are illustrated as examples; other sensor locations may be utilized.

Additional SLCS sensors may include a strain sensor to gauge stain on housing 140, on fan unit(s) 120, on conduits, such as conduit 135, on a securement to a suspension cable, on a suspension cable, and the like. Additional sensors may include a rotational encoder or thruster speed sensor which may be incremental or absolute, and a shutdown pin presence sensor.

A plurality of sensors may collectively be referred to as a sensor suite.

SLCS 111 may use remote positional sensors or beacons, remote computational units, remote cameras, or target node transceiver devices to assist in characterizing the location and/or motion of the suspending load and/or SLCS 111 (e.g., relative to a helicopter ownship), the carrier, and a target location of interest such as a person to rescue or a load destination.

The SLCS processor executes modules with respect to sensor system data to yield a desired system response. For example, GPS sensor data may be refined through real-time kinetic (RTK) algorithms to develop a refined absolute position. Measurements may be fused together through non-linear data fusion methods, such as Kalman filtration methods, to yield optimal state estimates in all degrees of freedom to characterize the system's location and motion in geodetic space.

Figure 16:
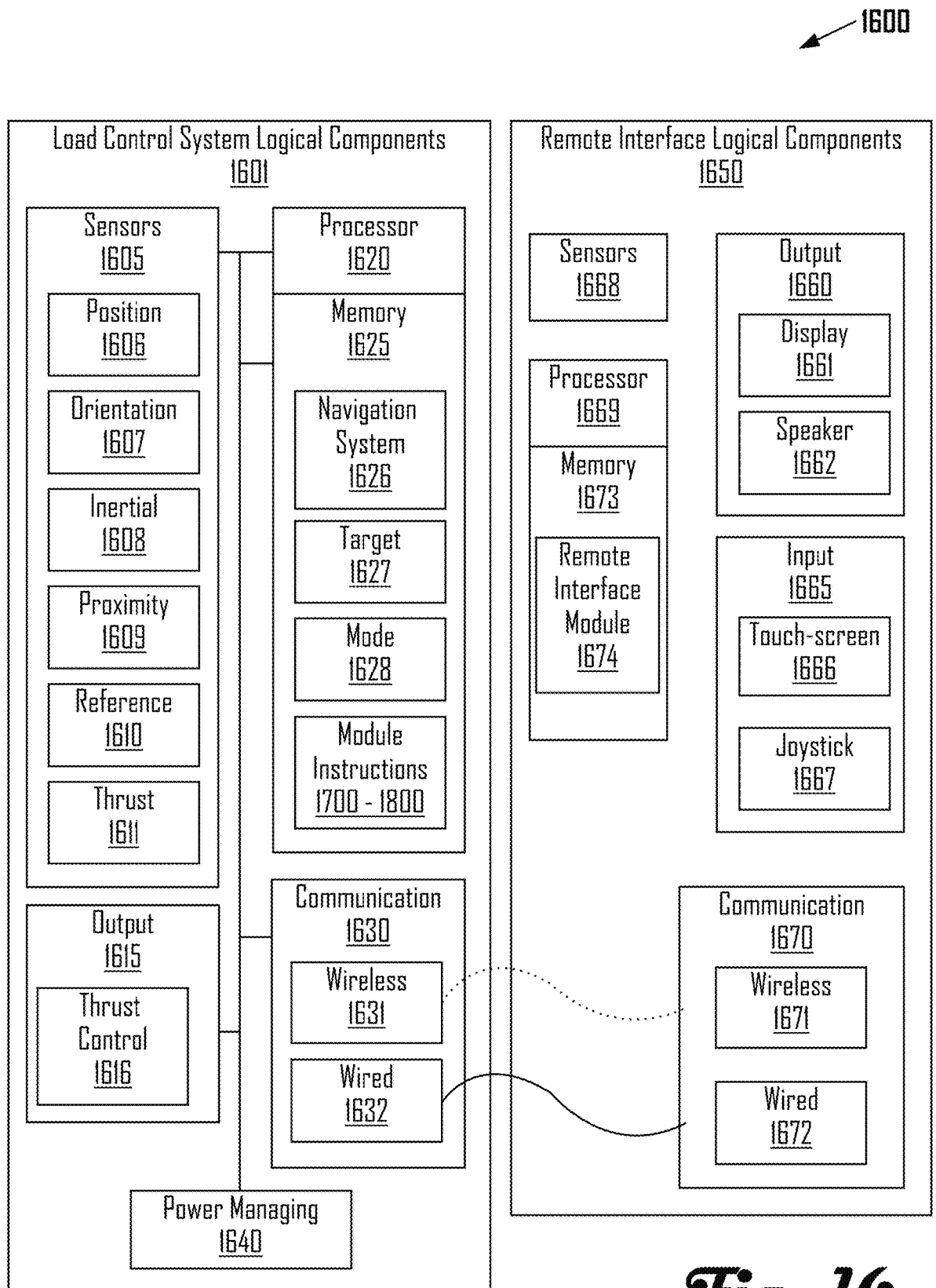
FIG. 16 schematically illustrates suspended load control system logical components and remote interface logical components in accordance with one embodiment.
Figure 24:
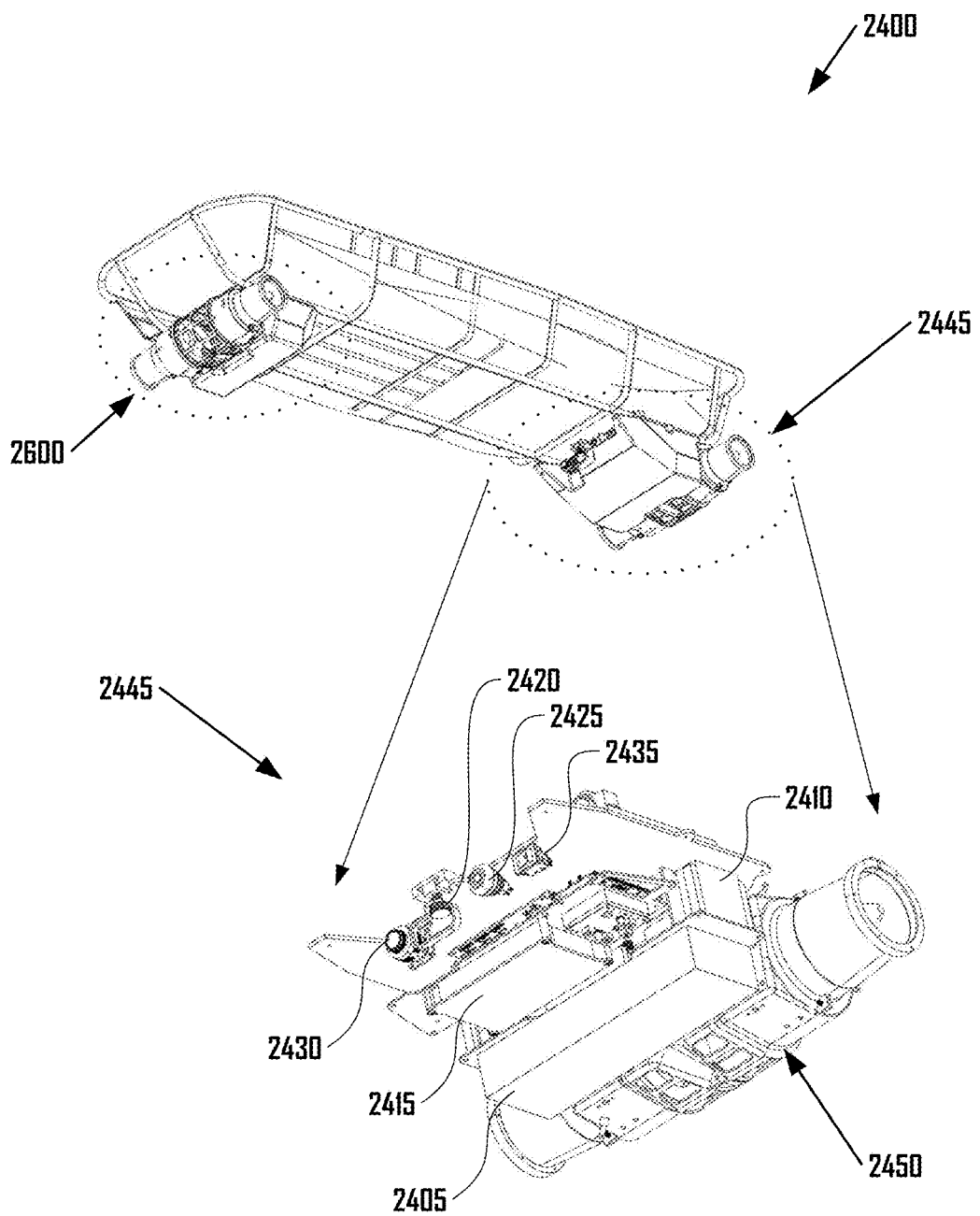
FIG. 24 illustrates a parallel projection of a suspended load control system ("SLCS") secured to a litter and a detail of electronic components of the SLCS, in accordance with an embodiment.
Figure 25:
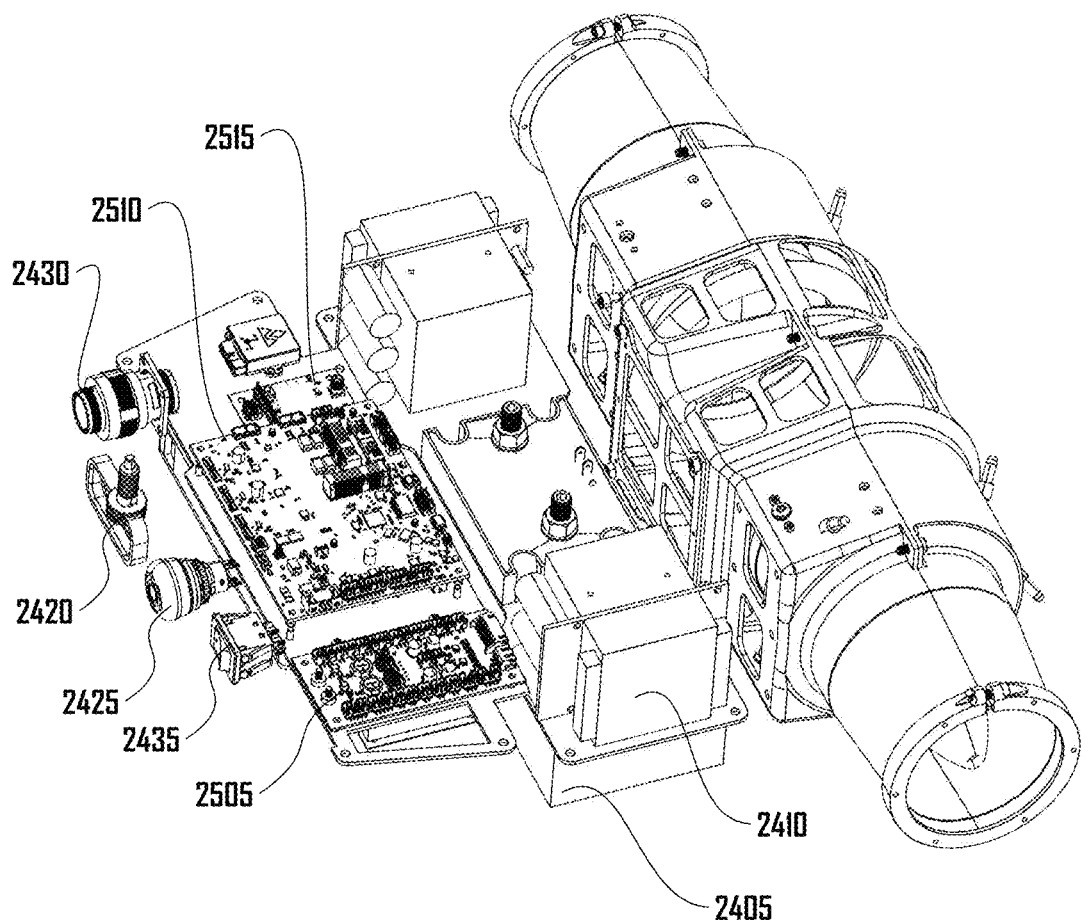
FIG. 25 illustrates a parallel projection of details of electronic components of the SLCS, in accordance with an embodiment.

Examples of components which may be within SLCS and housing 140 and within remote positional sensors or beacons, remote interfaces, or target node transceiver devices are discussed further herein, such as in relation to FIGS. 16, 24, 25, and/or 26.

Housing 140 may be formed of any suitable material such as metal, plastic, composite materials, such as fiber reinforced resin. Housing 140 may allow access into the internal space of housing 140 via a sealed hatch or one or more removable panels, allowing for maintenance and inspection.

FIG. 2 further illustrates slider rail 155 and expansion rod 130. Expansion rod 130 and slider rail 155 may allow fan units 120A and 120B to be repositioned within frame 110, such as to positions closer or further away from a center of frame 110 and/or housing 140. Expansion rod 130 and slider rail 155 are examples of mechanism to allow fan units to be repositioned within frame 110; all mechanisms to allow fan units to be repositioned within frame 110 may be referred to herein as "repositioning mechanism". Expansion rod 130 may be spring-loaded, may comprise a jackscrew, a piston, or the like, which components may be activated by a human, by an electronic actuator, or the like. Fan units 120 may be repositioned for a variety of reasons, such as to place fan units 120 further toward the edges of a load to which SLCS 111 is secured, which may increase the rotational force imparted by activation of an individual EDF. Fan units 120 may be repositioned to accommodate obstructions posed by a secured load, such as if a load in or secured to SLCS 111 has a projection that is incompatible with a location of a fan unit 120. Two expansion rods are illustrated in FIG. 2, though less than two or more than two expansion rods may be used in embodiments.

FIG. 2 further illustrates conduit 135. Conduit 135 may contain or comprise power and/or data or other communication conduits; for example, conduits within conduit 135 may provide power to fan units 120 as well as data conduits to obtain sensor or other information from remote sensors, and the like. Conduit 135 may comprise a coil, such as a spring-loaded coil, to allow conduit 135 to expand or contract as fan units 120 are moved relative to housing 140. By way of example, excess conduit 135 may retract within housing 140. Conduit 135 may be incorporated into expansion rod 130. Conduit 135 may comprise a series of wires bundled into a single cable with couplings such as, but not limited to, multipole ruggedized couplings such as EC5 couplings, such as coupling 2430.

FIG. 2 further illustrates releasable clasp 150. Releasable clasp 150 is further illustrated and discussed in relation to FIG. 3.

Figure 3:
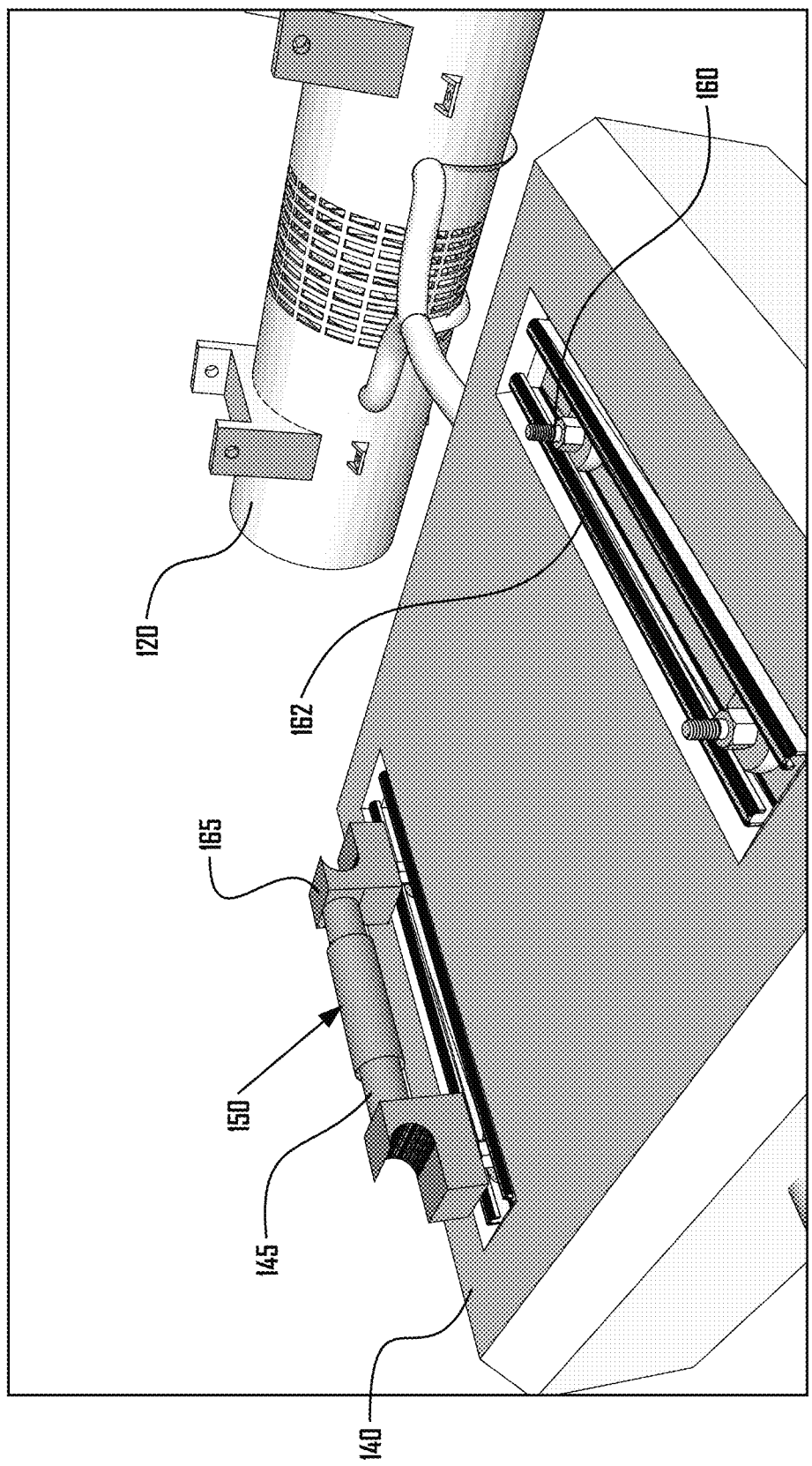
FIG. 3 is a detail perspective view of components to releasably secure a suspended load control system ("SLCS") to a load, in accordance with an embodiment.

FIG. 3 is a detail perspective view of components to releasably secure an SLCS to a load, in accordance with an embodiment. Releasable clasp 150 is an example of means to secure housing 140 or another component of an SLCS to a range of existing loads. In the illustrated embodiment, releasable clasp 150 is designed to fit against rungs or crossbars of a litter, such as litter 115. Clasp 150 is illustrated as comprising clasp expansion rod 145. Clasp expansion rod 145 may be spring-loaded, may comprise a jackscrew, a piston, or the like, which components may be activated by a human, by an electronic actuator, or the like. Ends of releasable clasp 150 may comprise bracket 165, which may fit against rungs or crossbars of a litter, to thereby secure housing 140 to a litter. Bracket 165 may secure to roller 160. Roller 160 may travel within roller track 162, allowing brackets 165 to be positioned relative to a range of rungs or crossbars of a litter. Roller 160 may be released or locked in place within or to track 162. Bracket 165, roller 160, and track 162 are examples of components which may allow components of an SLCS, such as a housing, a fan unit, a conduit, or the like, to be secured to a load. Other examples include mounting plates with holes which may allow a secured component to be bolted to a load. Other examples include clips which may allow a secured component to be clipped to a load. Other examples include webbing, which may allow a secured component to be strapped to a load. Other examples include flanges. Other examples include arms that may be extended or contracted to releasably secure to a load or to a structure that holds a load.

Figure 4:
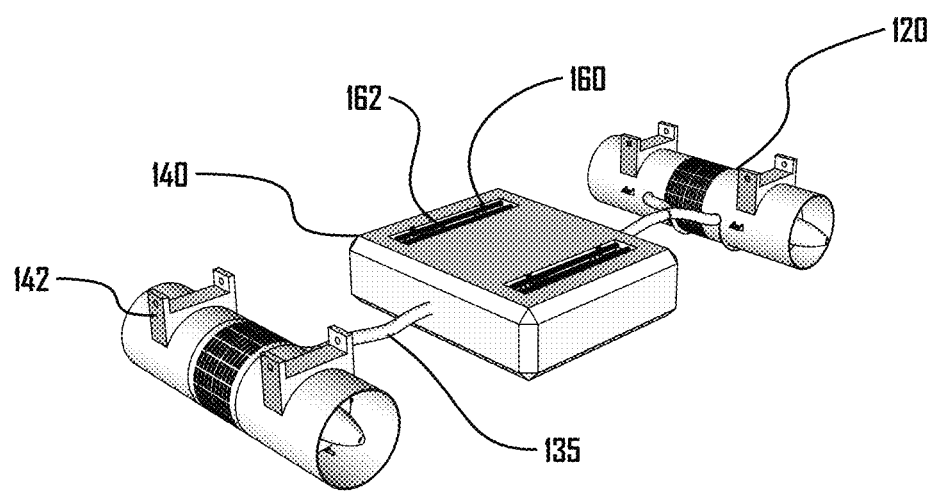
FIG. 4 is a perspective view of a suspended load control system ("SLCS") to be releasably secured to a load, in accordance with an embodiment.

FIG. 4 is a perspective view of an SLCS to be releasably secured to a load, in accordance with an embodiment. In the example embodiment illustrated in FIG. 4, housing 140 and fan units 120 are not within a frame, such as frame 110, but may be independently and releasably secured to a load or to a structure that holds a load. Brackets 142 in FIG. 4 are illustrated as being drilled, to allow bolting to a crossbeam or similar component of a load or a structure that holds a load. In embodiments, brackets 142 may comprise or work with straps, to allow fan unit 120 to be strapped to a load. Brackets 142 may comprise or work with quick-release bolts, nuts, and levers. Brackets 142 are another example of components may be used to secure a fan unit or another component of an SLCS to a load. In embodiments, housing 140 and one or more fan units may be within one housing.

Figure 5:
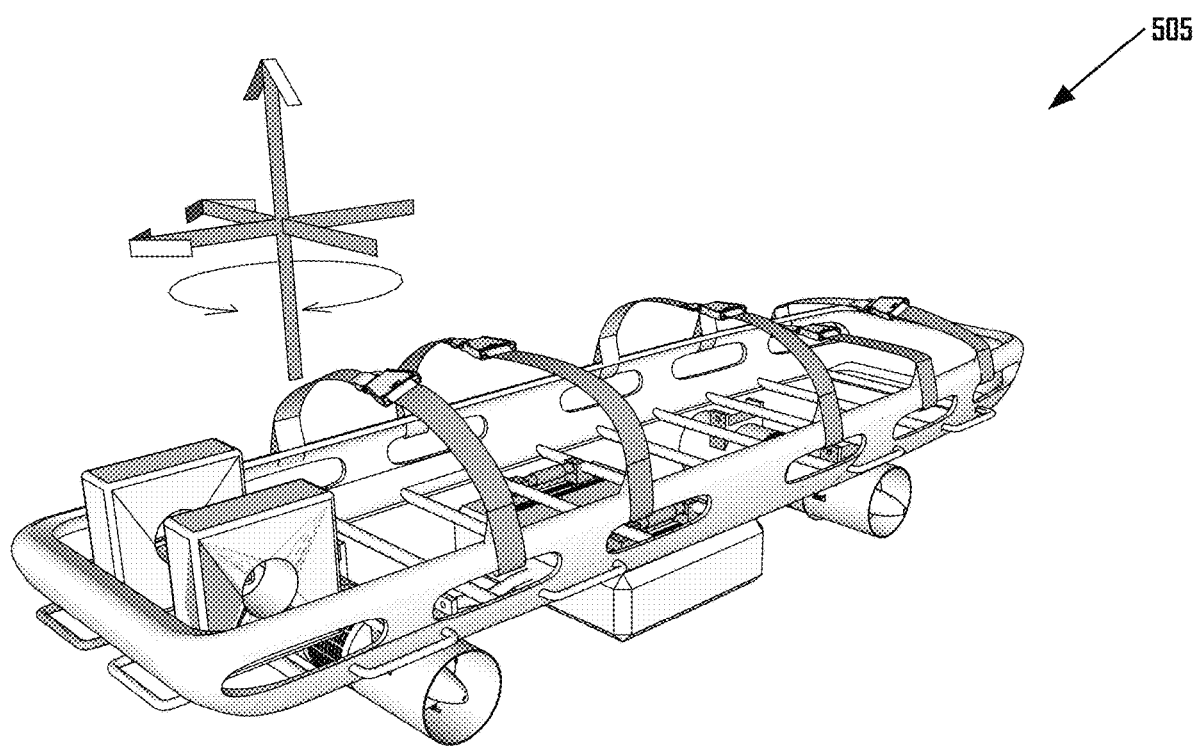
FIG. 5 is a perspective view of the suspended load control system ("SLCS") of FIG. 4 releasably secured to a litter.

FIG. 5 is a perspective view of the SLCS of FIG. 4 releasably secured to a litter, as litter-SLCS assembly 505. In litter-SLCS assembly 505, fan units and housing are secured to rungs or crossbars of the litter. In embodiments in which conduit 135 is within an expansion rod, expansion rod and conduit may be expanded to where fan unit 120 may be secured to the load, and the fan unit 120 may then be releasably secured to the load, such as, for example, using bracket 142 or other hardware or components provided to releasably secure such components.

Figure 6:
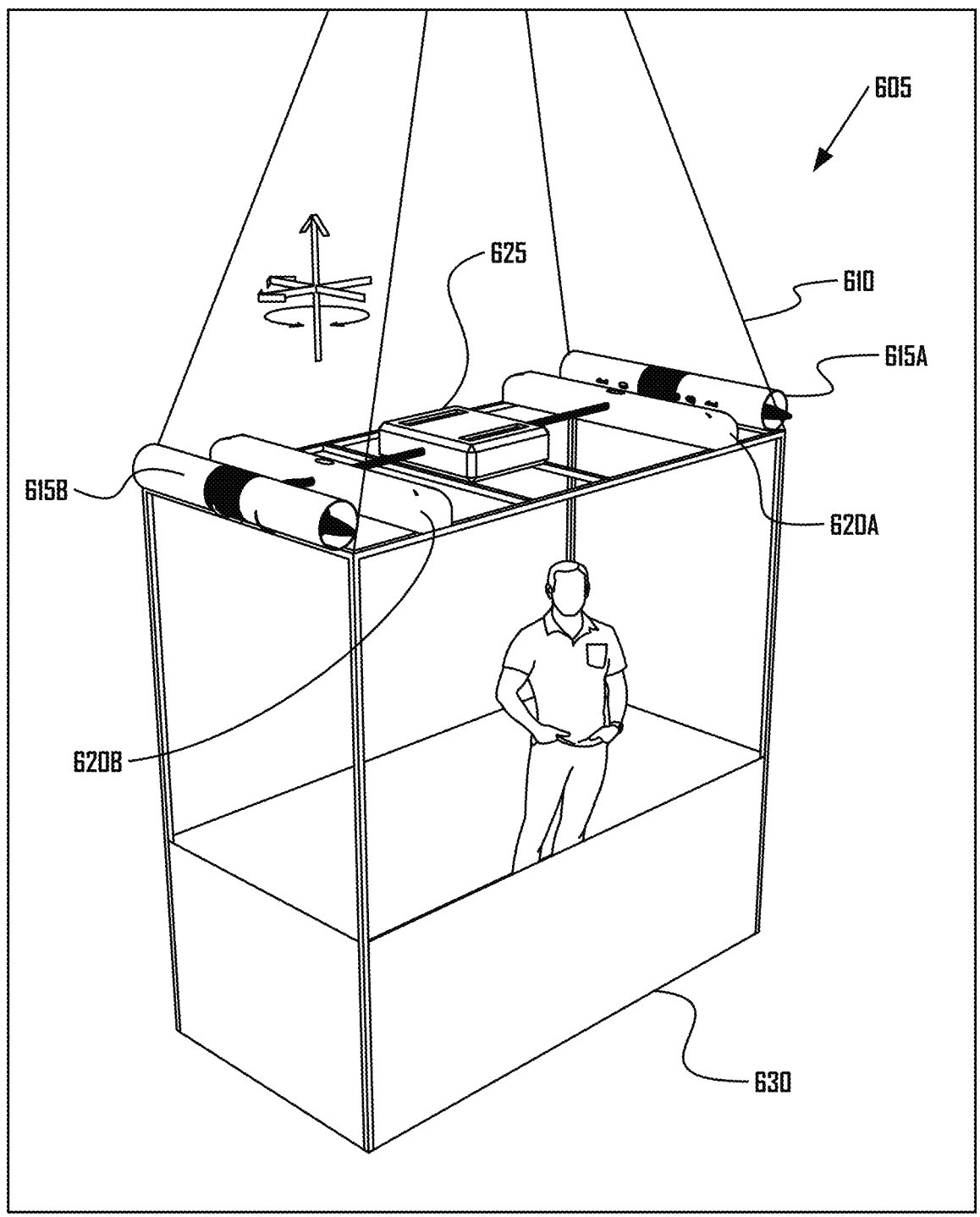
FIG. 6 is a perspective view of a suspended load control system ("SLCS") releasably secured to or incorporated into a basket structure for holding a load, in accordance with an embodiment.

FIG. 6 is a perspective view of an SLCS releasably secured or incorporated into a basket structure for holding a load as SLCS-basket assembly 605, in accordance with an embodiment. In SLCS-basket assembly 605, basket 630 may be secured to housing 625, power supply housings 620A and 620B, and fan units 615A and 615B. SLCS-basket assembly 605 may be secured to a carrier, such as a helicopter or crane, via load bearing connector line 610 and main load bearing line (see FIG. 7, 611). Housing 625 may comprise components similar to those of housing 140; fan units 615A and 615B may be similar to fan units 120. Housing 625, power supply housings 620A and 620B, and fan units 615A and 615B may be permanently or releasably secured to basket 630.

Power supply housings 620A and 620B may include a power supply, electronic speed controllers, microcontrollers, sensors, and the like. Power supply housings 620 may be located proximate to fan units, such as fan units 615, to reduce losses and signal latency that may otherwise occur when power is transmitted between a power supply and a power drain, such as a fan unit 615. Similar to the power supply in housing 140, the power supply in power supply housing 620 may be a single power brick or single battery or an array of battery cells wired in series and/or in parallel, such as LiPo or LiMH cells. The batteries may be removable for inspection and/or to swap discharged and charged batteries. Batteries in power supply housing 620 may be charged while installed on a load (i.e., without having to remove them) via nodes or a wireless charging system on or when coupled to a charging dock.

A data or other communication link between housing 625 and power supply housings 620 may allow a microcontroller unit or processor in housing 625 to monitor power information including (but not limited to) cell voltage and real-time power dissipation or consumption and to control a power controller in power supply housings 620, to allow a computer processor to control the speed, power draw, and thrust of thrusters in EDFs in fan units 615.

Figure 7:
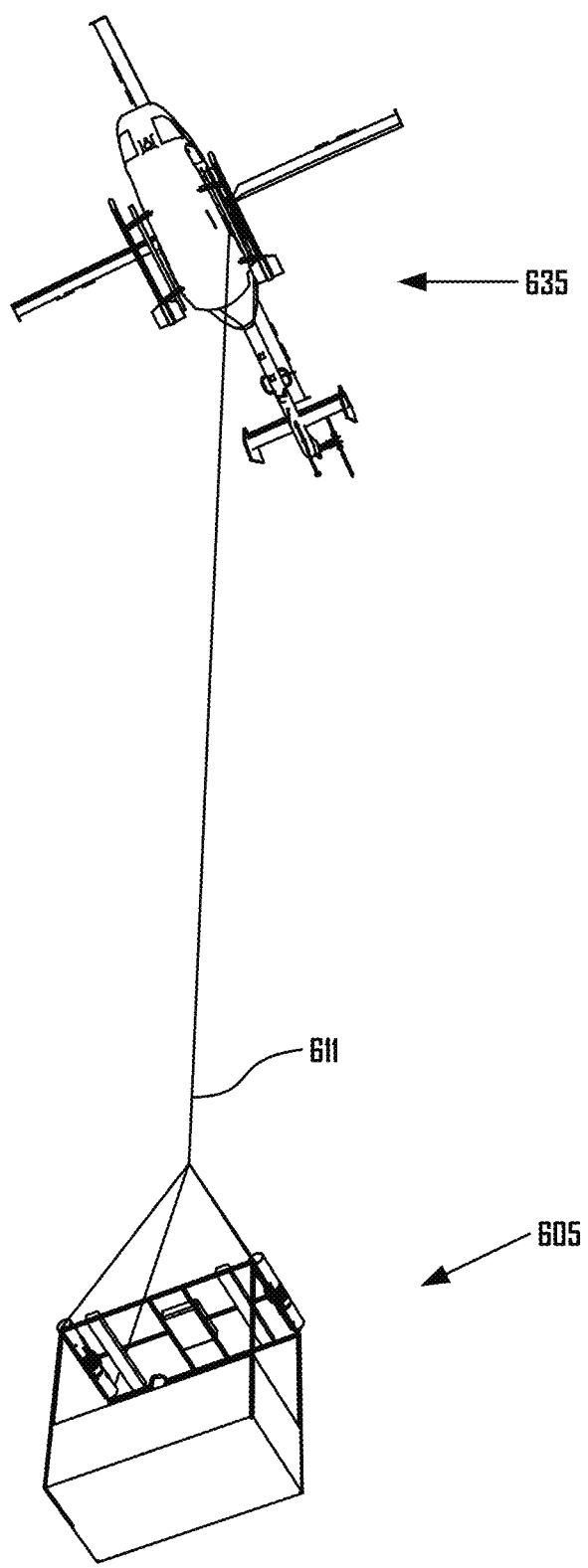
FIG. 7 is a perspective view of the suspended load control system ("SLCS") releasably secured to or incorporated into a basket structure for holding a load of FIG. 6, suspended by a helicopter.

FIG. 7 illustrates a perspective view of SLCS-basket assembly 605, further illustrating a relationship with helicopter 635. Helicopter 635 may represent any carrier. An arm may project out of helicopter 635. A hoist on such arm may be used to raise and lower SLCS-basket assembly 605 relative to helicopter 635. An interactive display or remote interface in or of helicopter 635 may be used to control SLCS-basket assembly 605 to stabilize and/or control the fine position and orientation of SLCS-basket assembly 605 relative to helicopter 635 and/or relative to a remote positional unit or target node, as discussed further herein. Without the SLCS of SLCS-basket assembly 605, the cable and SLCS-basket assembly 605 are subject to develop yaw or pendular motion. With the SLCS of SLCS-basket assembly 605, yaw and/or pendular motion may be counteracted, so that SLCS-basket assembly 605 may be delivered to a desired point or location of interest.

Figure 8:
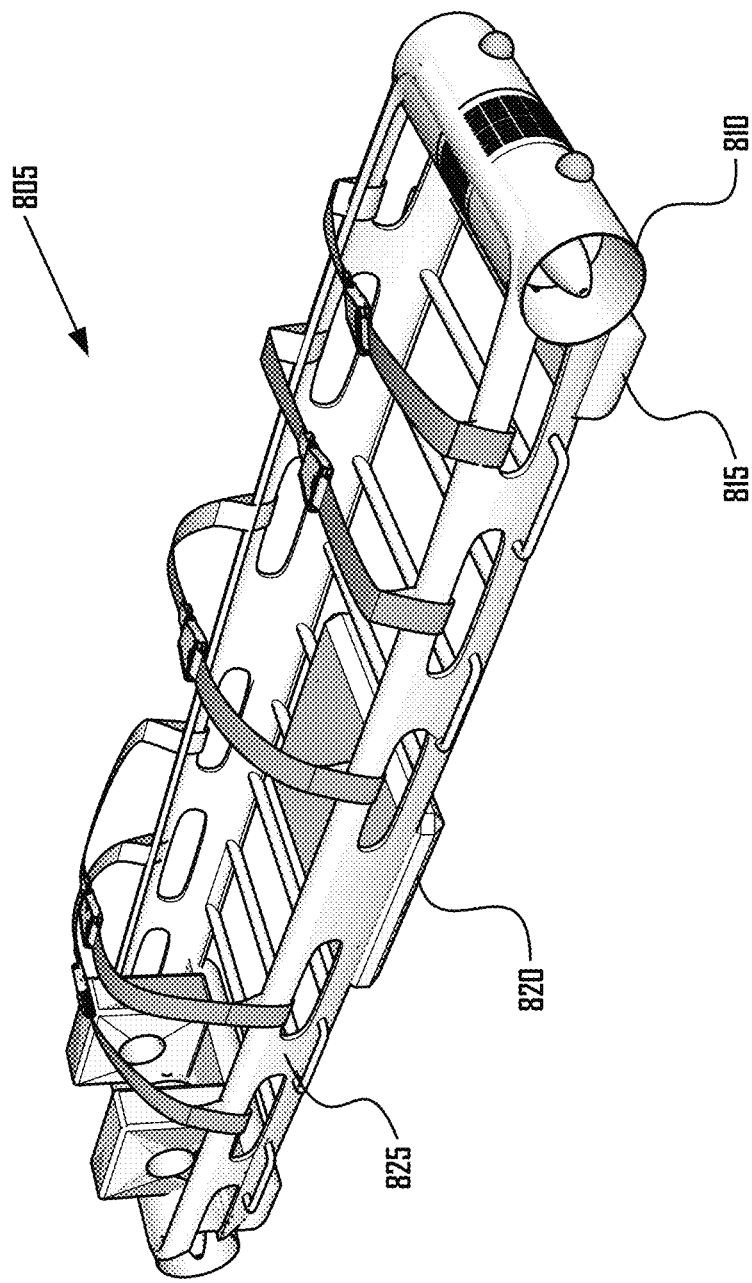
FIG. 8 is a perspective view of a suspended load control system ("SLCS") integrated into a litter, in accordance with an embodiment.

FIG. 8 is a perspective view of components of an SLCS integrated into litter 825, as integrated litter-SLCS assembly 805, in accordance with an embodiment. In integrated litter-SLCS assembly 805, fan units 810, housing 820, and (optional) power supply housings 815 are permanently integrated into litter 825, rather than being separate modular components that may be releasably secured to a litter or other load via load securement components. In integrated litter-SLCS assembly 805, fan units 810 may be similar to fan units 120, housing 820 may be similar to housing 140, and power supply housings 815 may be similar to power supply housings 620, though without releasable securement components to allow these components to be secured to a range of loads. In addition or alternatively, power supply housings 815 and/or fan units 810 may act as bumpers, cushions, or shock absorbers to absorb impact of integrated litter-SLCS assembly 805 with objects in the environment. The location and position of fan units 810, housing 820, and (optional) power supply housings 815 in the litter of integrated litter-SLCS assembly 805 are illustrated as examples; other locations or positions may be used, consistent with the disclosure herein.

Figure 9:
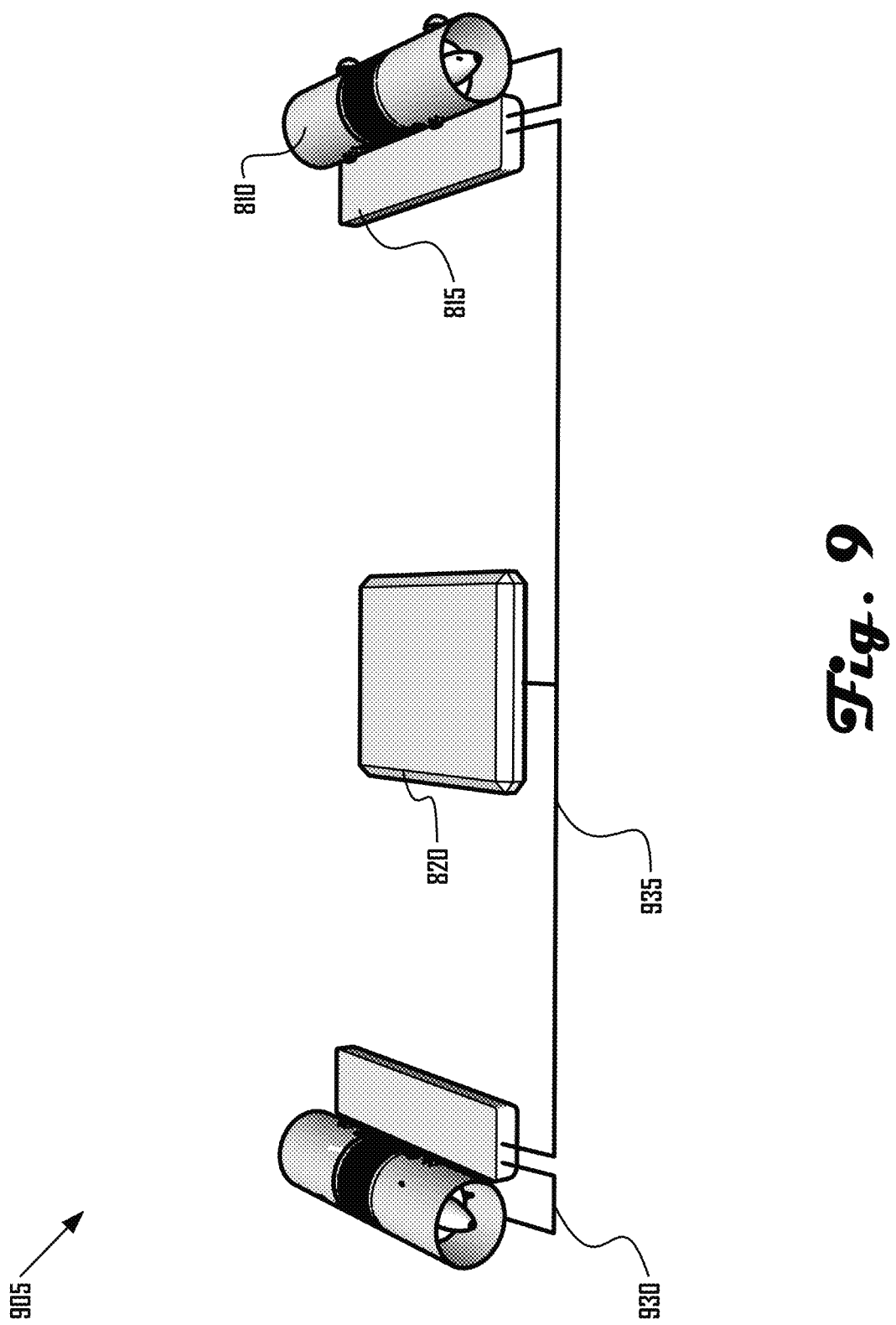
FIG. 9 is a perspective view of wiring components of a suspended load control system ("SLCS"), in accordance with an embodiment.

FIG. 9 is a perspective view of power and/or data conduits 930 and 935 of an SLCS 905, in accordance with one embodiment. For the sake of clarity, SLCS 905 is disembodied from a load and from load securement components. Power and/or data conduits 930 and 935 may contain or comprise power and/or data or other communication lines or couplings. Power and/or data conduits 930 and 935 may be integrated into a frame or superstructure of a load or of a structure to hold a load or may be located in conduits secured to a frame or superstructure of a load, similar to conduits 135. In an embodiment, data conduit 935 may comprise data or other communication lines to convey control signals from a processor or other components in housing 820 to power supply housings 815, while power and/or data conduit 930 may comprise power as well as data or other communication lines between power supply housings 815 and fan units 810. In this embodiment, resistance, induction, signal delay and other problems caused by powerlines between a power supply and a motor are reduced.

FIG. 10 is a perspective view of sensors in or of an SLCS, in accordance with one embodiment and using integrated litter-SLCS assembly 805 as an example. Sensor locations 825A, 825B, and 825C are examples of sensor locations that provide a view in a downward and/or horizontal direction; equivalent sensors at mirror locations are illustrated, though not labeled. Other sensor locations may be chosen to provide other views, such as upward. Sensors in sensor locations 825A, 825B, and 825C may include, for example, water sensors, near-field communication sensors or transceivers, a proximity sensor or light detection and ranging (LIDAR)

system (e.g., rotating or linear), and/or an optical sensor such as one or more cameras or infrared (IR) sensors. Proximity sensors may include ground height sensors. Optical sensors may also provide visual information to users. This information may be communicated to and by a processor and communication equipment in an SLCS and to a remote control or remote interface, or the like, via a data link cable and/or wireless transceiver. Proximity and optical sensors allow the system to be capable of 360 degree awareness and collision avoidance by detecting obstacles (e.g., a portion of a tree canopy) and altering the course of the SLCS to avoid the obstacles or by detecting environmental conditions (e.g. water, proximity to a target or to a carrier) and responding as programmed, such as by shutting fan units down, initiating visual signaling devices, or the like. The system is also capable of providing ground (or water) position data to aircraft pilot and crew.

Figure 11:
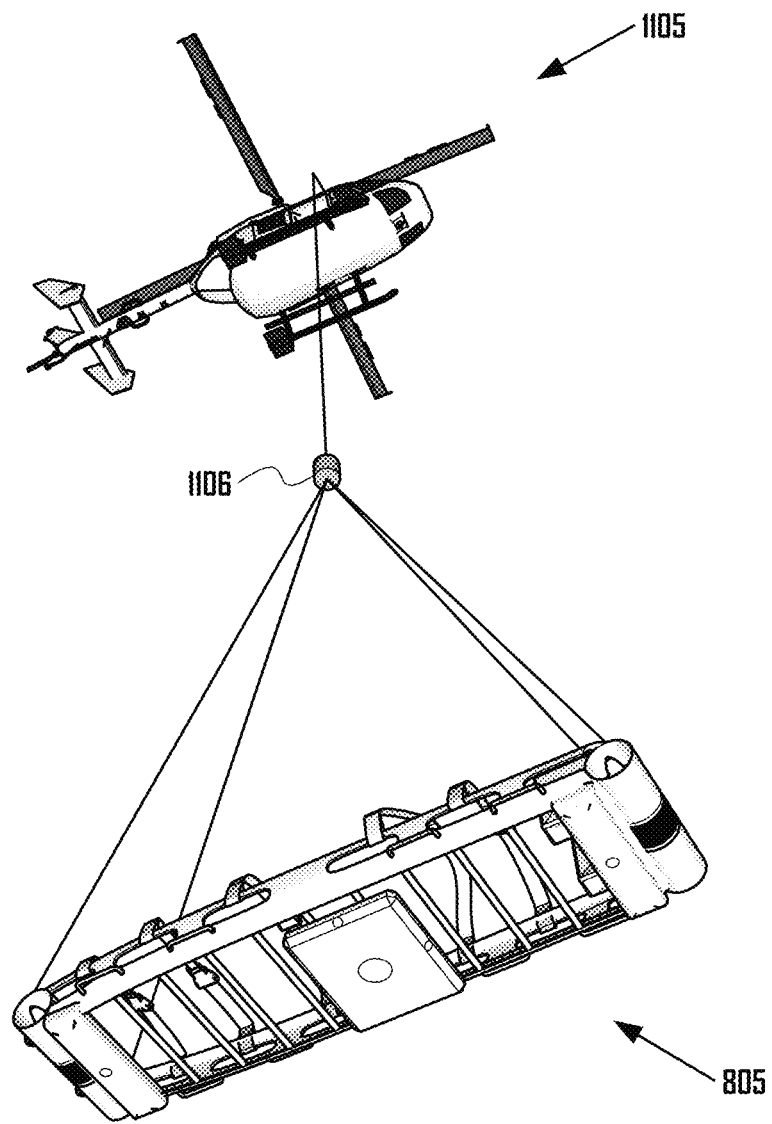
FIG. 11 is a perspective view of the suspended load control system ("SLCS") integrated with the litter of FIG. 8, further illustrating a relationship with a carrier.

FIG. 11 is a perspective view of integrated litter-SLCS assembly 805 of FIG. 8, further illustrating a relationship with helicopter 1105. As in the example of FIG. 7, helicopter 1105 may represent any carrier. An arm may project out of helicopter 1105. A hoist on such arm may be used to raise and lower SLCS-basket assembly 805 relative to helicopter 1105. Rotational pivot 1106 may allow integrated litter-SLCS assembly 805 to rotate, without winding up or unwinding the suspension cable. An interactive display or remote interface in or of helicopter 1105 may be used to control litter-SLCS assembly 805 to stabilize and/or control the fine position and orientation of litter-SLCS assembly 805 relative to helicopter 1105 and/or relative to a remote positional unit or target node, as discussed further herein. Without the SLCS of Integrated Litter-SLCS assembly 805, the cable and integrated litter-SLCS assembly 805 are liable to undergo yaw or develop pendular motion. With the SLCS of integrated litter-SLCS assembly 805, yaw and/or pendular motion may counteracted, so that integrated litter-SLCS assembly 805 may more quickly be delivered to a desired point or location of interest with reduced risk.

Figure 12:
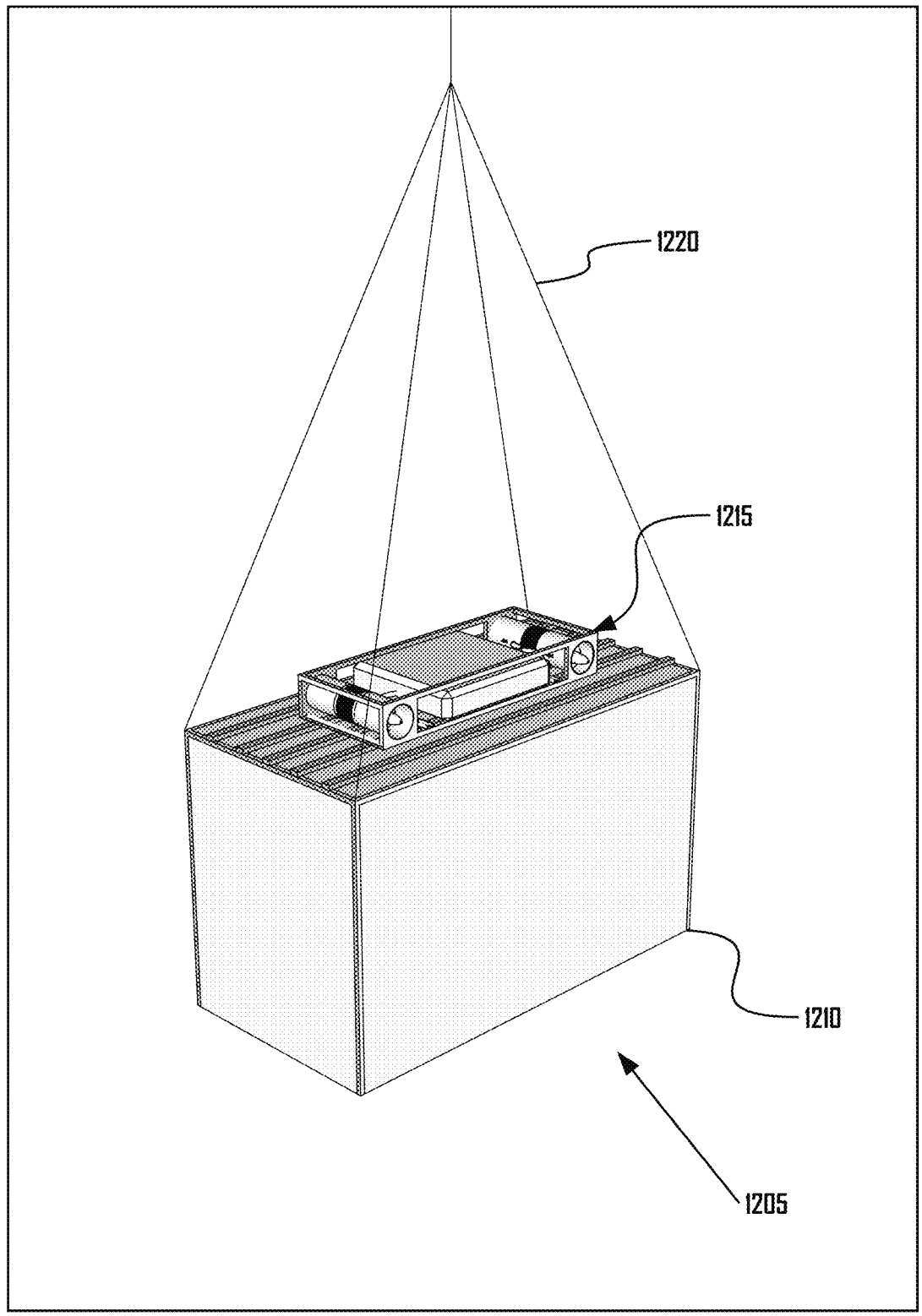
FIG. 12 is a perspective view of a suspended load control system ("SLCS") releasably secured to a load, in an embodiment.

FIG. 12 illustrates a perspective view of an embodiment of an SLCS 1215 unit secured to load 1210, as SLCS-load assembly 1205. Securement may be bolts, straps, quick-release bolts and levers, and the like. SLCS-load assembly 1205 may be secured to a carrier via suspension cables 1220. Load 1210 may comprise, for example, a generator, a structural box or container, or the like. Load 1210 is illustrated with structural members on its top; Load 1210 may comprise other or alternative structural members.

Figure 13:
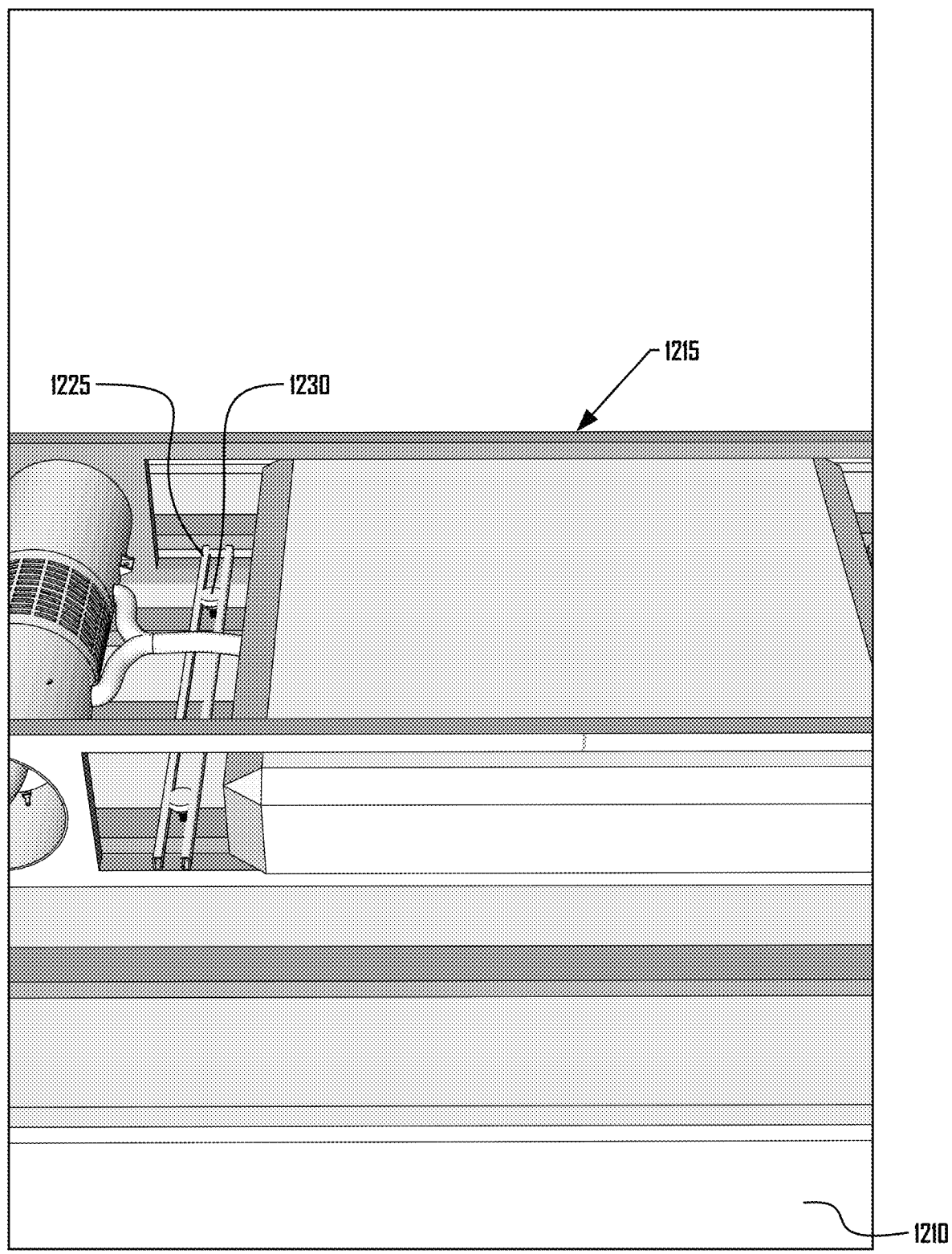
FIG. 13 is a detailed perspective view of mounting components of the suspended load control system ("SLCS") of FIG. 12, in accordance with one embodiment.

FIG. 13 is a detailed perspective view of mounting components of SLCS 1215 unit of FIG. 12, in accordance with one embodiment. Mounting components may be designed to allow an SLCS to be secured to a range of loads. In the example illustrated in FIG. 13, the mounting components comprise track 1225 and rollers 1230. Rollers 1230 may be secured to load 1210, such as to bolt holes or other securement locations in structural members of load 1210. Rollers 1230 may be released, to allow rollers 1230 to translate along track 1225, to allow rollers 1230 to be secured to a range of bolt holes or other securement structures in structural members of load 1210. When moved to an appropriate location, rollers 1230 may be secured to bolt holes or other securement structures in structural members of load 1210 and may be tightened, to secure rollers 1230 to track 1225 and to prevent rollers 1230 from sliding within track 1225. In other embodiments, mounting components may comprise straps, webbing, clips, hooks, bolts, and the like.

Figure 14:
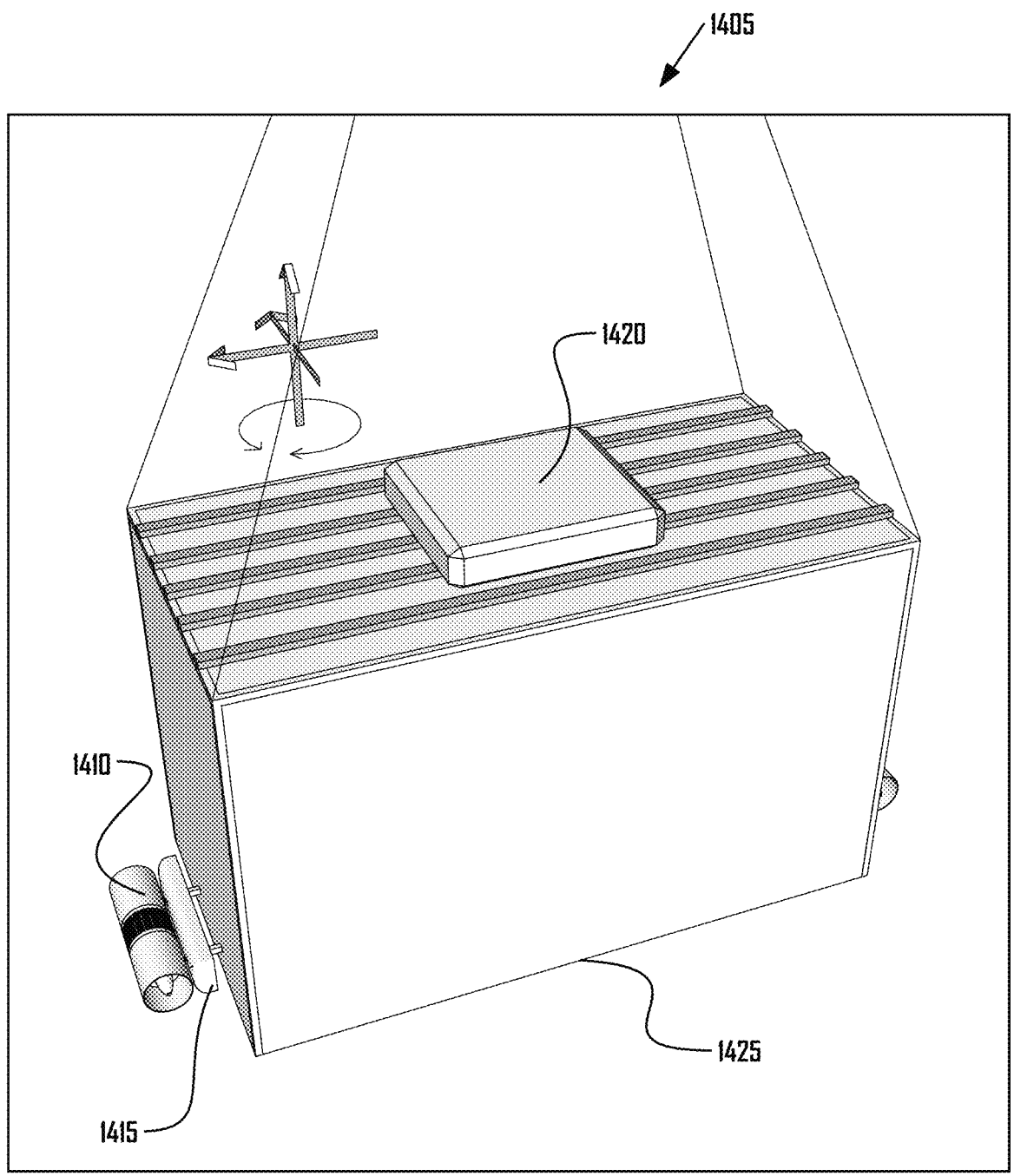
FIG. 14 is a perspective view of a suspended load control system ("SLCS") secured to a load, illustrating a first example embodiment of securement of fan units to the load.

FIG. 14 is a perspective view of SLCS-load assembly 1405, in one embodiment, illustrating a first example of securement locations of fan unit 1410 and power supply housing 1415 on load 1425. Securement may be via securement components as discussed herein (not illustrated). Communication of power and data between fan unit 1410, power supply housing 1415, and housing 1420 may be via conduits (not shown), as discussed herein. Housing 1415 may be similar to housing 140. Fan unit 1410 may be similar to fan unit 120. Power supply housing 1415 may be similar to power supply housing 620. Securement of fan unit 1410 and power supply housing 1415 at the locations illustrated in FIG. 14, proximate to a bottom of load 1425, may allow sensors on or of fan unit 1410 and power supply housing 1415 to have greater downward view, with less obstruction by load 1425 than might otherwise be the case.

Figure 15:
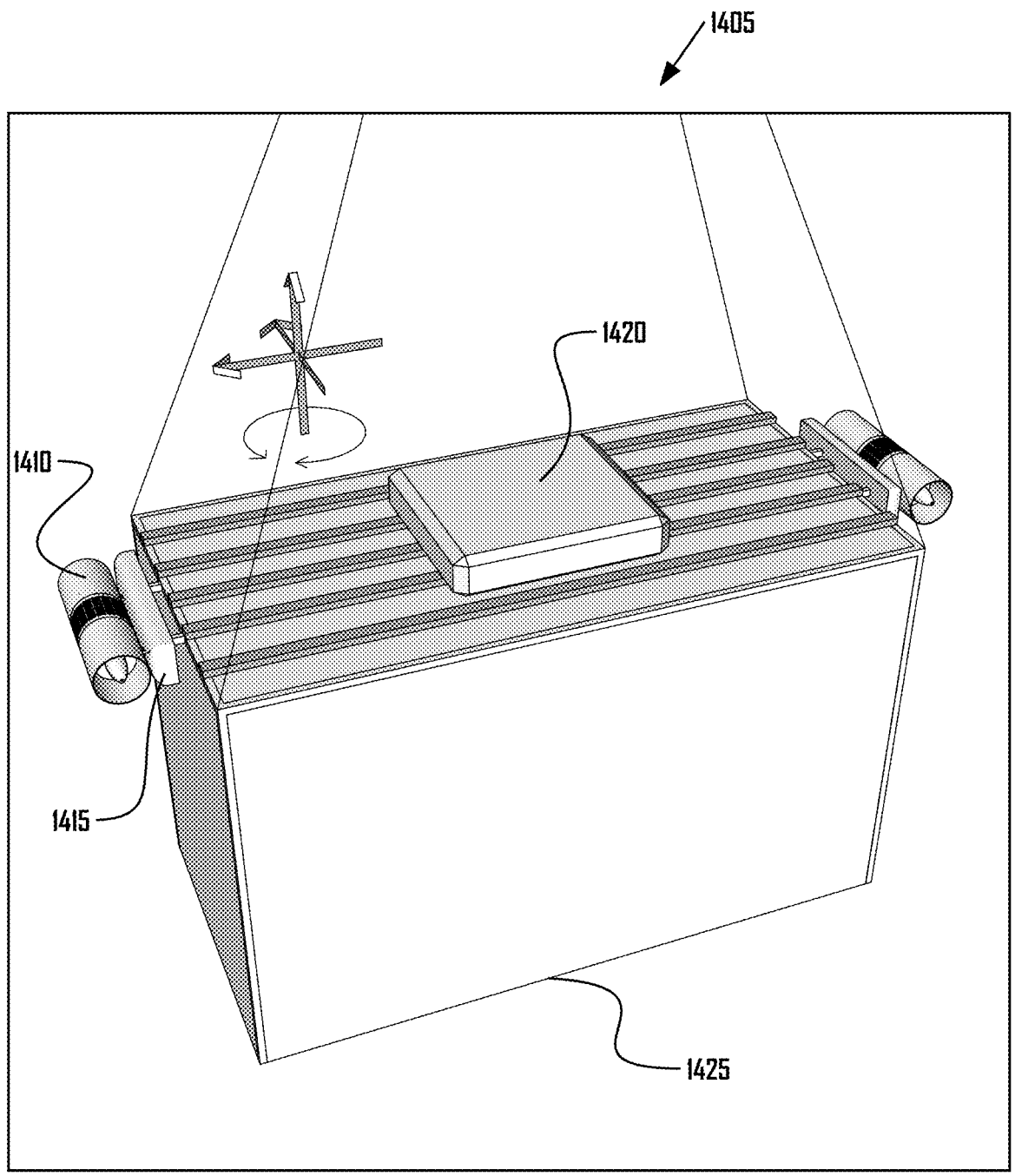
FIG. 15 is a perspective view of a suspended load control system ("SLCS") secured to a load, illustrating a second example embodiment of securement of fan units to the load.

FIG. 15 is a perspective view of SLCS-Load Assembly 1405, in one embodiment. This embodiment illustrates a second example of securement locations of fan unit 1410 and power supply housing 1415 to load 1425. Securement may be via securement components as discussed herein. The locations of fan unit 1410 and power supply housing 1415 illustrated in FIG. 15 may allow sensors on or of fan unit 1410 and power supply housing 1415 to have greater upward view, with less obstruction by load 1425 than might otherwise be the case.

FIG. 16 schematically illustrates suspended load control system logical components 1601 and remote interface logical components 1650 in accordance with one embodiment. Within load control system logical components 1601 are sensor suite 1605, which may include position sensors 1606, orientation sensors 1607, inertial sensors 1608, proximity sensors 1609, reference location sensors 1610, thrust sensors 1611, and cameras. The SLCS processing capacity 1620 includes a computer processor and microcontrollers. SLCS memory 1625 generally comprises a random-access memory ("RAM") and permanent non-transitory mass storage device, such as a solid-state drive, and contains navigation systems 1626, target data 1627, mode or command state information 1628, and software or firmware code, instructions, or logic for one or more of operational module 1700 and suspended load control decision and thrust control module 1800. Communication systems 1630 include wireless systems 1631 such as a wireless transceiver, and wired systems 1632. SLCS output 1615 includes thrust control 1616 via power controllers or ESCs. Power managing systems 1640 regulate and distribute the power supply from, e.g., the batteries. A data bus couples the various internal systems and logical components of load control system logical components 1601.

An interactive display, remote interface, remote positional unit, or target node may be a computational unit comprising one or more of remote interface logical components 1650; such a unit may be self-powered or hardwired into an airframe. The remote interface logical components 1650 receive data from and/or send data to the SLCS, e.g., wirelessly. The data from the SLCS may be displayed in display 1661 of remote interface logical components 1650; the computational data is parsed and converted to visual cues. Remote interface logical components 1650 may also communicates the SLCS the operator's desired command states and operational instructions, as discussed below.

Remote interface logical components 1650 may be in communication with load control system logical components 1601 via communication systems 1670, which may be wireless 1671 or wired 1672. Output 1660 from remote interface logical components 1650 may include information displayed on a screen or display 1661, and auditory cues or access to remote audio (such as audio detected by sensors in a load) via audio output 1662. Input 1665 to remote interface logical components 1650 to control an SLCS may include commands through a touchscreen 1666 or a joystick 1667 or other input interface. In various embodiments, remote interface logical components 1650 may comprise one or more physical and/or logical devices that collectively provide the functionalities described herein.

Aspects of the system may be embodied in a specialized or special purpose computing device or data processor that is specifically programmed, configured, or constructed to perform one or more of the computer-executable instructions explained in detail herein, in conjunction with suitable memory. Aspects of the system may also be practiced in distributed computing environments where tasks or modules are performed by remote processing devices and memory that are linked through a communications network, such as a local area network (LAN), wide area network (WAN), or the Internet. In a distributed computing environment, modules may be located in both local and remote memory storage devices. As schematically illustrated in FIG. 16, load control system logical components 1601 and remote interface logical components 1650 are coupled by a wired or wireless network.

Load control system logical components 1601 may work with a remote positional unit, remote interface, or target node comprising one or more remote interface logical components 1650, in accordance with one embodiment. The remote positional unit, remote interface, or target node may comprise an internal or external sensor suite, such as sensors 1668, configured to communicate, such as wirelessly, with load control system logical components 1601 as a positional reference. Sensors 1668 may be similar to sensors 1605. If sensors 1605 are considered the primary sensor suite, a secondary sensor suite location may be the platform or carrier from which a suspension cable is suspended, sensors 1668 in or in communication with remote interface logical components 1650, and a tertiary sensor suite location may be a location of interest for the load (e.g., for positioning to obtain or deliver the load). Remote interface logical components 1650 may further comprise processor 1669 and memory 1673, which may be similar to processor 1620 and memory 1625. Memory 1673 may comprise software or firmware code, instructions, or logic for one or more modules used by the remote positional unit, remote interface, or target node, such as remote interface module 1674. For example, remote interface module 1674 may provide control and interface for a remote positional unit, remote interface, or target node, such as to allow it to be turned on/off, to pair it with an SLCS, to input instructions, or the like.

A remote positional unit may include a transceiver configured to communicate with load control system logical components 1601 via a wireless transceiver and provide a positional reference. For example, a remote positional unit may be secured to a helicopter ownship or crane below which the load is suspended and/or a remote positional unit may be secured to a load.

In some embodiments, the remote positional unit, remote interface, or target node may be made of durable polymer or plastic, large enough to fit into a hand. The remote positional unit, remote interface, or target node may have an external antenna. The remote positional unit, remote interface, or target node may be secured to, e.g., the helicopter by magnets, bolts, or any other securement mechanism. The remote positional unit, remote interface, or target node may be dropped to a location on the ground or secured to, e.g., a life preserver or other flotational device, a rescuer, a load to be picked up, a location for a load to be delivered, or an operational specific location.

Aspects of the load control system logical components 1601 and/or remote interface logical components 1650 may be embodied in a specialized or special purpose computing device or data processor that is specifically programmed, configured, or constructed to perform one or more of the computer-executable instructions explained in detail herein. Aspects of the load control system logical components 1601 and/or remote interface logical components 1650 may also be practiced in distributed computing environments where tasks or modules are performed by remote processing devices that are linked through a communications network, such as a local area network (LAN), wide area network (WAN), or the Internet. In a distributed computing environment, modules may be located in both local and remote memory storage devices. As schematically illustrated in FIG. 16, load control system logical components 1601 and remote interface logical components 1650 may be coupled by a wired or wireless network.

Figure 17:
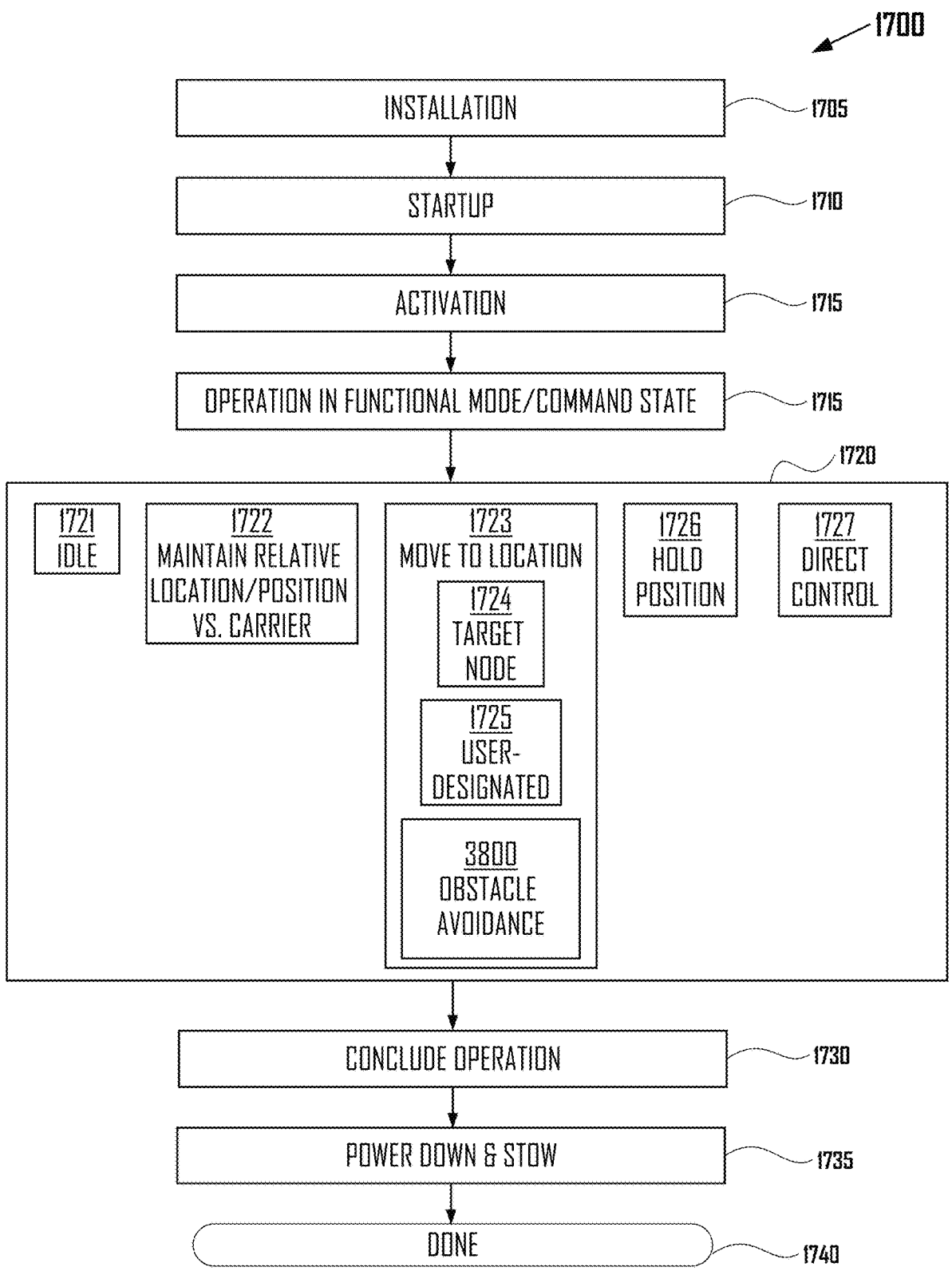
FIG. 17 illustrates a suspended load control system operational module including multiple modes or command states in accordance with one embodiment.

FIG. 17 illustrates an example of operational module 1700 of a suspended load control system ("SLCS") including multiple mode or command state modules in accordance with one embodiment. Instructions of, or which embody, decision and operational module 1700 may be stored in, for example, memory 1625, and may be executed or performed by, for example, processor 1620, as well as by electrical circuits, firmware, and other computer and logical hardware of SLCS with which operational module 1700 may interact. In embodiments, computer processors and memory to perform some or all of operational module 1700 may be remote from SLCS, such as in an auxiliary computer in, for example, a carrier.

In block 1705, a suspended load control system apparatus may be installed onto a load and/or onto a cable from which a load will be suspended. The suspended load control system apparatus need not be powered on for installation.

In block 1710, the suspended load control system ("SLCS") in the apparatus may be started up and operational module 1700 activated. In some embodiments, operational module 1700 may be initialized by the press of a button located on a face of a control module of the SLCS. Near the accessible external button which may initialize operational module 1700, another button may be present that allows for immediate shut down when pressed. In addition to the initialization interface on the center or control module, operational module 1700 may also be initialized by an operator not directly next to the system. One or more external operators, including but not limited to a rescuer on the end of the cable, may initialize operational module 1700 by pressing a button on one or more remote interface linked wirelessly to operational module 1700. One or more modules of a complete SLCS, such as physically separated control unit, fan unit, and the like (as illustrated in, for example, FIG. 27), may be started up in block 1710 and may be paired to function together. During block 1710, operational module 1700 may determine a relative orientation of fan units which operational module 1700 is to control. This determination may be based on sensor information from the fan units, such as a compass heading sampled from each fan unit. This determination may be performed to adjust for fan units which are not parallel to one another, as may be the case when a modular SLCS is deployed on an irregular load, such as a rope or webbing enclosed load, and the fan units may not be parallel. This determination may be used in block 1830, with respect to fan mapping. This determination may not be necessary when the SLCS is in a rigid frame and the fan units may be presumed to be parallel to one another. This determination may produce an error condition if the fan units are not within an acceptable orientation range.

In block 1715, operational module 1700 is activated in and/or receives a functional mode or command state selected by the operator. In block 1720, operational module 1700 may perform or call suspended load control decision and thrust control module 1800 as a subroutine or submodule, to implement a functional mode or command state. The functional modes or command states of the system are:

Idle mode 1721: internal systems of the SLCS are operating (e.g., operational module 1700 observes motion of the SLCS and calculates corrective action), but the thrusters are shut off or maintain an idle speed only, without action to affect the motion of the load.

Maintain relative position vs. ownship mode 1722: stabilizes the SLCS with respect to a slung origin point. For example, when SLCS is suspended with a load below a helicopter, SLCS will stay directly below the helicopter. Maintain relative position vs. ownship mode 1722 localizes the ownship motion and performs the corrective actions necessary to critically damp any other suspended load motion. If the ownship is traveling at a low speed, maintain relative position vs. ownship mode 1722 will couple the velocity so the two entities are moving in unison. Upon a disturbance to the load, maintain relative position vs. ownship mode 1722 provides thrust in the direction of the disturbance to counteract the disturbance, eliminating the swing.

Move to/stop at position mode 1723: will stabilize an SLCS to a fixed position, counteracting the influence of the weather or small movements of the helicopter or other suspending platform. This mode has the effect of killing all motion. The operator may send the desired target position to SLCS via a remote interface. This may be accomplished in at least two ways:

Target node position 1724: The operator may place reference location sensors 1668 at the desired lowering location (e.g., location 2815 of FIG. 28). Reference location sensors 1668 may communicate wirelessly with target node position 1724 module to indicate the desired position, and target node position 1724 module responds by maneuvering the SLCS to the desired location. Remote interface display 1661 may receive and display the location information of both entities.

User-designated position/orientation 1725: The operator may use the remote interface display 1661 to send a designated position (e.g., latitude and longitude coordinates) or orientation as a commanded location to user-designated position/orientation 1725 module. The system will then steadily direct the suspended load to the desired position or to the desired orientation. The system will simultaneously send feedback to remote interface logical components 1650 regarding position, distance, and orientation information.

Hold position mode 1726: will resist all motion of an SLCS and maintain current position and/or orientation independent of the ownship's motion. This module has the effect of killing all motion. This module has conditional responses respectively to ownship speed, safety factors, and physical constraints.

Direct control mode 1727: Joystick operation of an SLCS in three degrees of freedom. Though operational module 1700 is entirely closed loop and does not require external control during operation, there is an option for user control. The operator is able to provide input to direct control mode 1727 module to directly control positioning, rotation, and thruster output level.

Obstacle avoidance module 3800 module: receives and processes sensor information such as to i) to equalize the distance between sensor locations, such as at fan units, and objects, such as obstacles, sensed in the environment or ii) to measure or receive geometry of a load, measure geometry of obstacles sensed in the environment, determine or receive the position, orientation, and motion of the load, and negotiate the load relative to the obstacle. Please see, for example, FIG. 3800 and discussion of obstacle avoidance module 3800.

In block 1730, the operator completes the operation and retrieves SLCS.

In block 1735, operational module 1700 may be shut down by pushing a button on the interactive display or by pressing the button on the center module of the SLCS apparatus. If the SLCS apparatus includes collapsible frame, propulsion arms or fan units, they may be folded up. If the SLCS apparatus includes removable modules, such as for fan units, a housing, a power supply housing, and the like, the modules may be removed from a load, disassembled. The load may be detached from a load hook or the like, and then a suspension cable may be detached from a hoist ring at the top of the load and/or SLCS. SLCS may then be stowed in or electrically connected to charger and/or any suitable location.

Figure 18:
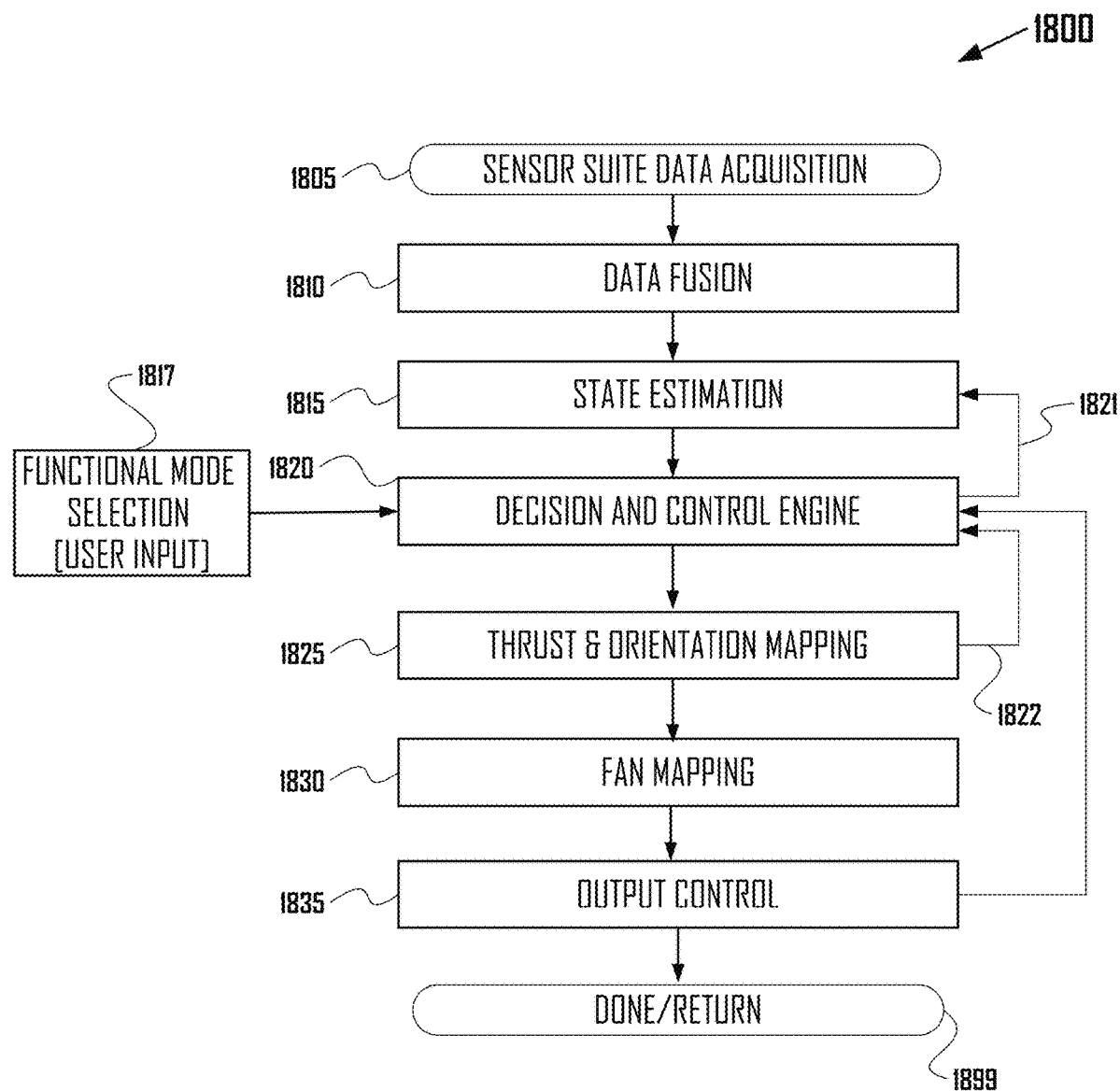
FIG. 18 illustrates a suspended load control system decision and thrust control module in accordance with one embodiment.

FIG. 18 illustrates a decision and thrust control module 1800 of a suspended load control system in accordance with one embodiment. Instructions of, or which embody, decision and thrust control module 1800 may be stored in, for example, memory 1625, and may be executed or performed by, for example, processor 1620, as well as by electrical circuits, firmware, and other computer and logical hardware of SLCS with which decision and thrust control module 1800 may interact. In embodiments, computer processors and memory to perform some or all of decision and thrust control module 1800 may be remote from SLCS, such as in an auxiliary computer in, for example, a carrier.

Decision and thrust control module 1800 may operate in a closed loop to understand its position and motion in near real time, determine a most desired system response, and send desired response(s) to the air propulsion system thruster array to mitigate swing of the cable or otherwise control a load during operations At block 1805, decision and thrust control module 1800 may obtain data from sensors such as, for example, sensors 1605, such as accelerometer, gyroscope, magnetometer, GPS, lidar/radar, machine vision, and/or range finders.

In block 1810, decision and thrust control module 1800 combines data from the sensors to obtain a data fusion describing position, orientation, motion, and environment of the SLCS apparatus.

Sensor data is fused and filtered by the SLCS through non-linear flavors of a Kalman Filter to yield an accurate representation of the system's state. Closed-loop control methods including fuzzy-tuned proportional, integral, and derivative feedback controllers have bidirectional communication with advanced control methods including deep learning neural nets and future propagated Kalman filters, allowing for further real-time system identification.

In block 1815, decision and thrust control module 1800 performs state estimation using non-linear state estimators to project near-term future motion based on the data fusion and on feedback from the decision and control engine to the state estimator.

In block 1817, decision and thrust control module 1800 receives a functional mode selection, such as according to user input.

In block 1820, decision and thrust control module 1800 takes the state estimation 1815, informed by the user-selected functional mode or command state 1817, as well as additional feedback from the thrust and orientation mapping 1825 and output control 1835, and determines a desired direction of motion or rotation of the SLCS.

Algorithmic output is sent to motion or power controllers, such as ESCs, which will send the desired thrust response to the EDF via, for example phase control of pulse modulated power signals. The net thrust output is mapped in real-time through encoders and load cells then sent back to decision and control block 1820 and onward for closed-loop control.

In block 1825, decision and thrust control module 1800 maps desired orientation with thrust vectors from EDF to generate a thrust and orientation mapping to achieve the determined thrust and orientation of the SLCS apparatus.

In block 1830, decision and thrust control module 1800 maps the thrust and orientation mapping to fans and fan thrust vectors and generates a fan mapping to control EDFs to achieve the desired thrust and orientation of the SLCS.

In block 1835, decision and thrust control module 1800 applies the fan mapping to output power control signals to the fans or thrusters (or electronic components controlling the same) to achieve the determined thrust and orientation of the SLCS apparatus, exerting commanded control output and implementing a dynamic response in the form of thrust from the fans.

At done block 1899, decision and thrust control module 1800 may conclude or return to a module which may have called it.

Decision and thrust control module 1800 may be unmanned and automated aside from the high-level operator-selected functional control modes. Net output is a control force to move or stabilize a suspended load.

Figure 19:
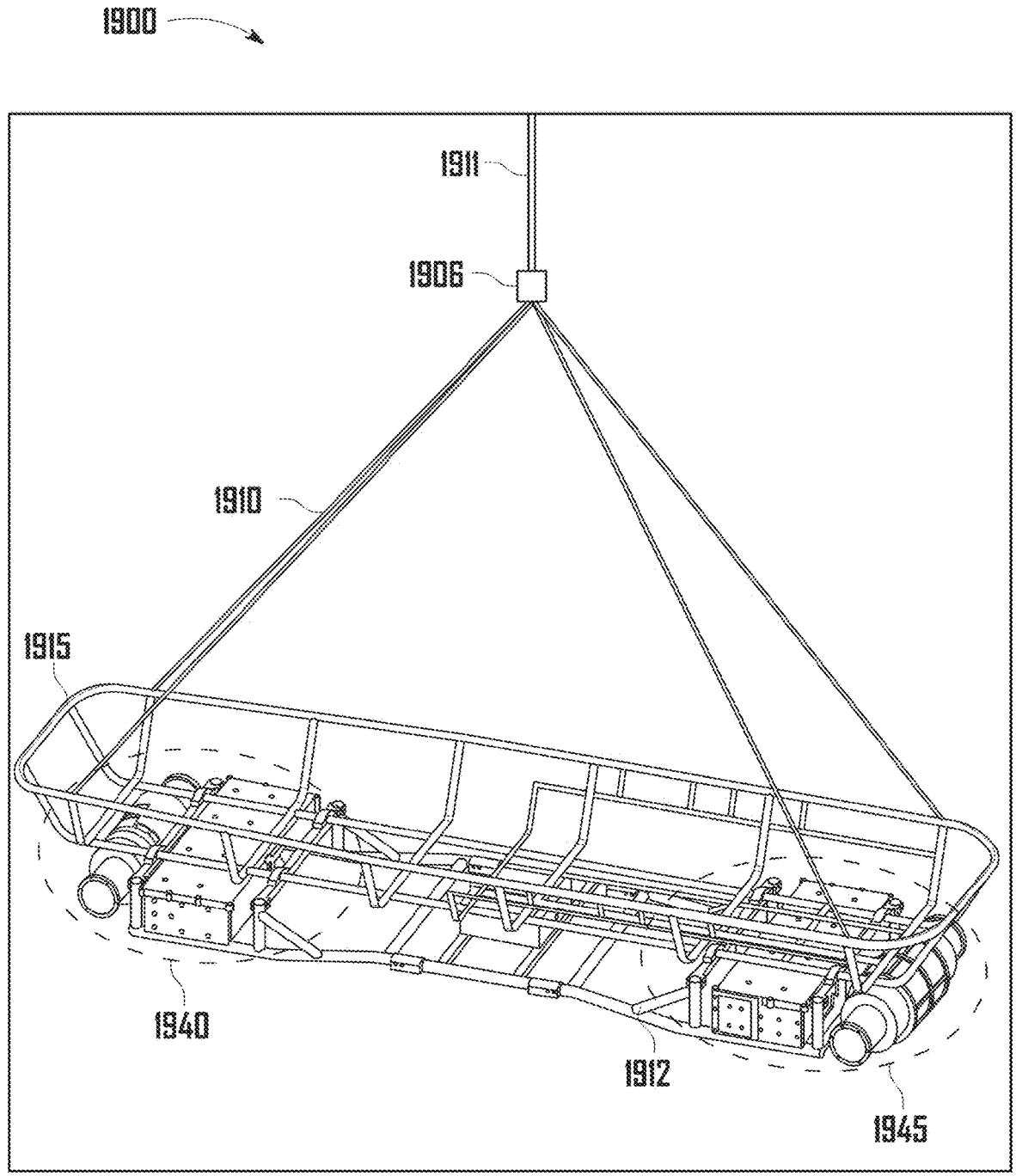
FIG. 19 illustrates a parallel projection of a suspended load control system ("SLCS") integrated into a litter, in accordance with an embodiment.

FIG. 19 illustrates a parallel projection of a suspended load control system ("SLCS") integrated into litter 1900, in accordance with an embodiment. This example comprises power supply and fan unit 1940 and control and power supply and fan unit 1945. Each of power supply and fan unit 1940 and control and power supply and fan unit 1945 comprise a fan unit; each fan unit comprises two EDFs, with outlets, and corresponding thrust vector potential, separated by one-hundred and eighty degrees. Hardware to host and/or perform operational module 1700 and decision and thrust control module 1800 may be in control and power supply and fan unit 1945. Batteries and power control modules to provide regulated power to fan unit may be in both power supply and fan unit 1940 and control and power supply and fan unit 1945.

Frame 1915 may comprise bracing 1912 to house and/or protect power supply and fan unit 1940 and control and power supply and fan unit 1945.

Load bearing connector lines 1910 may be secured to litter 1915, to load bearing rotational coupling 1906, and to main load bearing line 1911. Load bearing rotational coupling 1906 may allow litter 1915 to rotate separately from main load bearing line 1911.

With two fan units, with each fan unit comprising two EDFs, operational module 1700 and decision and thrust control module 1800 and SLCS integrated into litter 1900 may be capable of horizontal translation, as well as of imparting a rotational force or torque on SLCS integrated into litter 1900, so as to rotate SLCS integrated into litter 1900 or to counter undesired rotation of SLCS integrated into litter 1900.

Figure 20:
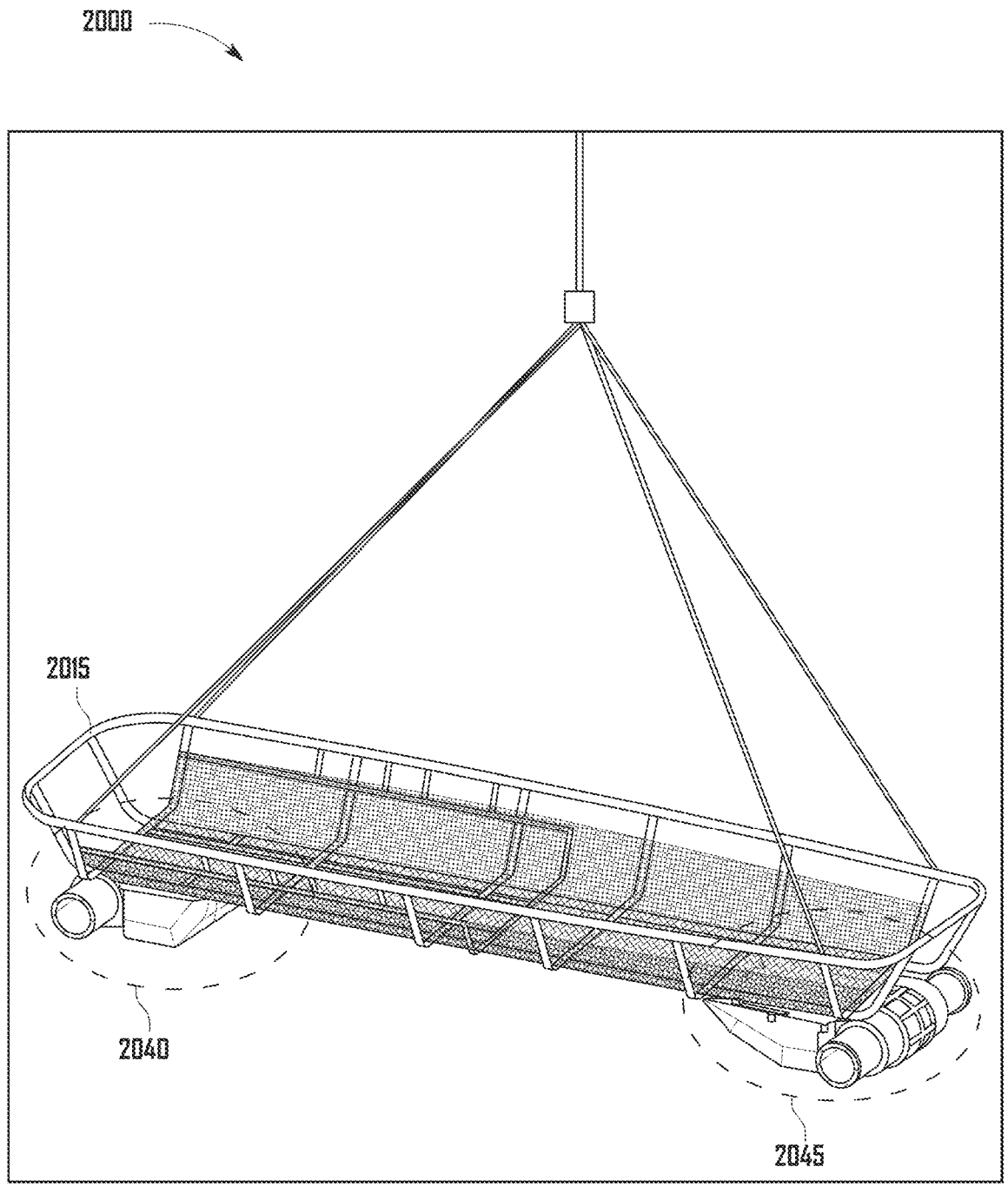
FIG. 20 illustrates a parallel projection of a suspended load control system ("SLCS") secured to a litter, in accordance with an embodiment.

FIG. 20 illustrates a parallel projection of a suspended load control system ("SLCS") secured to litter 2000, in accordance with an embodiment. In this example, a litter comprises a screen bed and further comprises power supply and fan unit 2040 and control and power supply and fan unit 2045. Each of power supply and fan unit 2040 and control and power supply and fan unit 2045 comprise a fan unit; each fan unit comprises two EDFs, with outlets, and corresponding thrust vector potential, separated by one-hundred and eighty degrees. Hardware to host and/or perform operational module 1700 and decision and thrust control module 1800 may be in control and power supply and fan unit 2045. Batteries and power control modules to provide regulated power to fan unit may be in both power supply and fan unit 2040 and control and power supply and fan unit 2045.

Each of power supply and fan unit 2040 and control and power supply and fan unit 2045 may be secured to litter 2015, using securement mechanisms such as those discussed herein.

With two fan units, with each fan unit comprising two EDFs, operational module 1700 and decision and thrust control module 1800 and SLCS secured to litter 2000 may be capable of horizontal translation, as well as of imparting a rotational force or torque on SLCS secured to litter 2000, so as to rotate SLCS secured to litter 2000 or to counter undesired rotation of SLCS secured to litter 2000.

Figure 21:
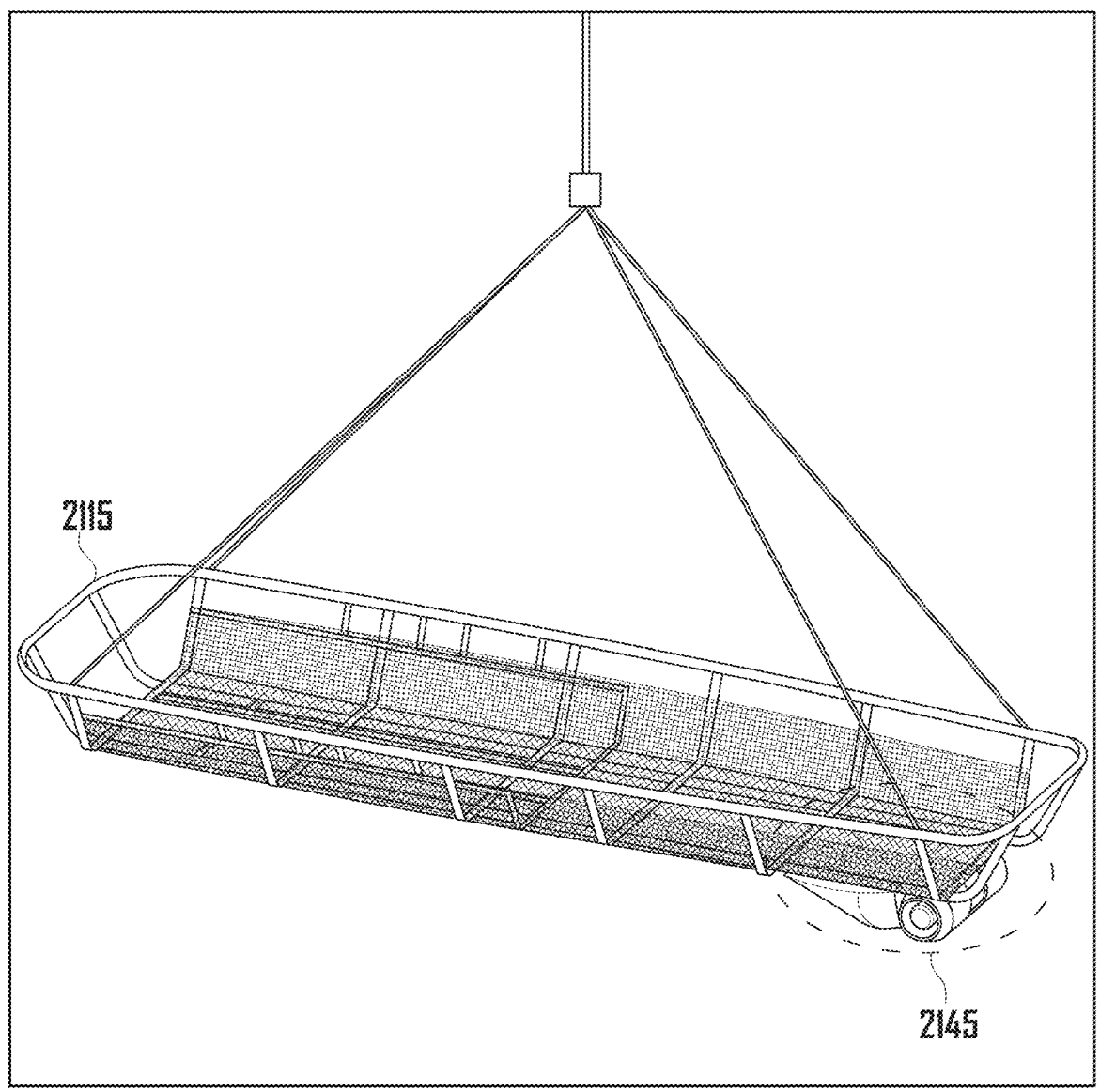
FIG. 21 illustrates a parallel projection of a suspended load control system ("SLCS") secured to a litter, in accordance with an embodiment.

FIG. 21 illustrates a parallel projection of a suspended load control system ("SLCS") secured to litter 2100, in accordance with an embodiment. In this example, control and power supply and fan unit 2145 is secured to one end of litter 2115. In this example, litter 2115 may have been in inventory of a SAR organization, before acquisition of control and power supply and fan unit 2145 by the organization and securement of it to litter 2115. In an alternative embodiment, control and power supply and fan unit 2145 may be integrated into litter 2115.

Control and power supply and fan unit 2145 may comprise one fan unit, comprising two EDFs. The two EDFs may be oriented one-hundred and eighty degrees apart. Hardware to host and/or perform operational module 1700 and decision and thrust control module 1800 may be in control and power supply and fan unit 2145. Batteries and power control modules to provide regulated power to fan unit may be in control and power supply and fan unit 2145.

With one fan unit at one end of litter 2115, with each fan unit comprising two EDFs, operational module 1700 and decision and thrust control module 1800 and SLCS secured to litter 2100 may be capable of imparting a rotational force or torque on SLCS secured to litter 2100, so as to rotate SLCS integrated into litter 1900 or to counter undesired rotation of SLCS integrated into litter 1900.

Figure 22:
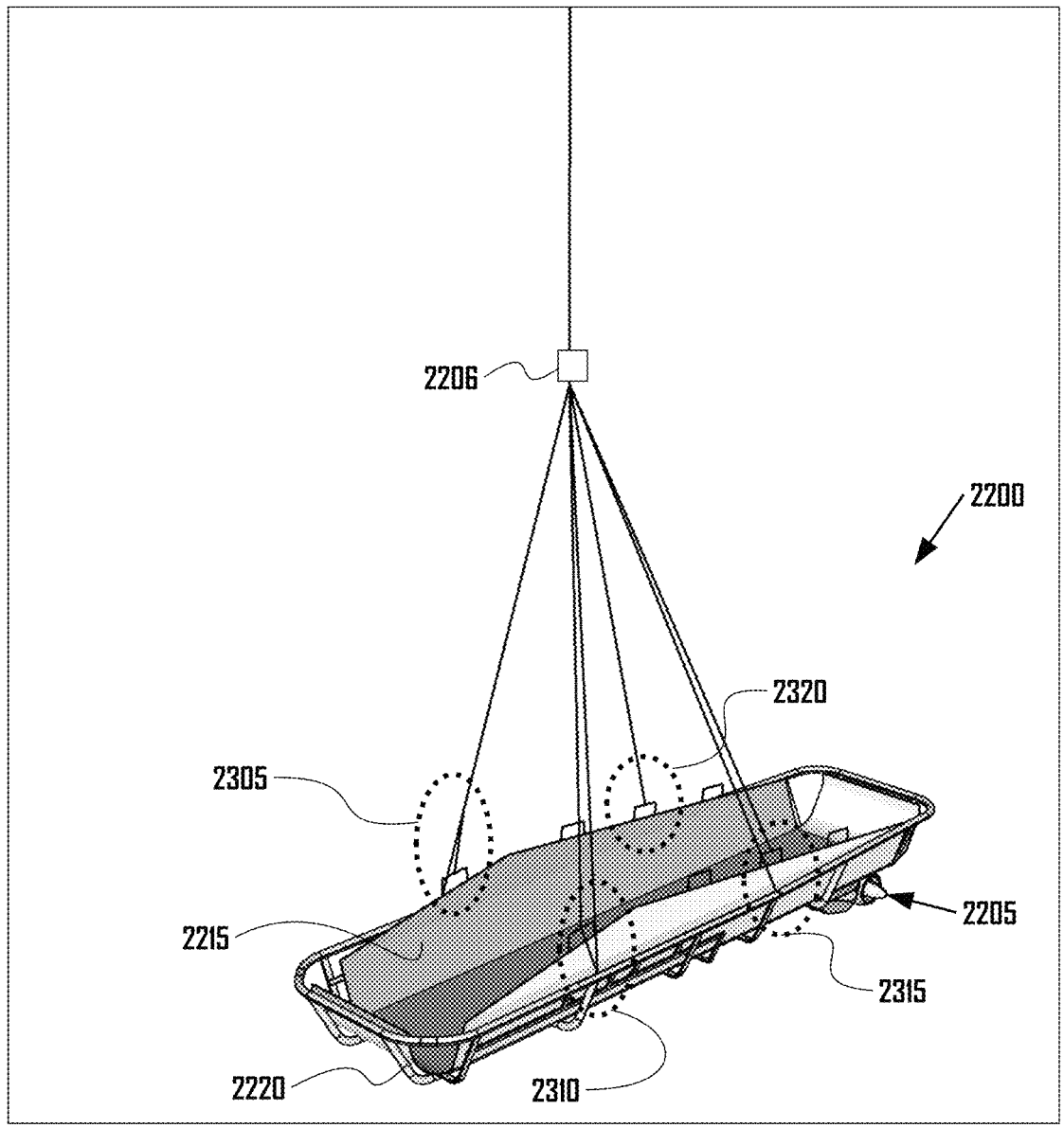
FIG. 22 illustrates a parallel projection of a suspended load control system ("SLCS") secured to a litter and illustrating securement of load bearing connector cables, in accordance with an embodiment.

FIG. 22 illustrates a parallel projection of a suspended load control system ("SLCS") secured to a litter 2200 and illustrating securement of load bearing connector cables to rotational coupling 2206, in accordance with an embodiment. Securement 2305 is illustrated and discussed further in relation to FIG. 23B. Securement 2310 is illustrated and discussed further in relation to FIG. 23A. Securement 2315 is illustrated and discussed further in relation to FIG. 23C. In this example, flexible litter 2215 may rest within and/or be secured to litter 2220. Litter 2220 may be optional, for example, such as if suspended load control system 2205 is part of or comprises a frame, similar to frame 110. Flexible litter 2215 may require that straps across its top, across its short axis, be tightened about a load in order to for flexible litter 2215 to assume a configuration as illustrated, with a long axis parallel to long axis of litter 2220.

Figure 23A:
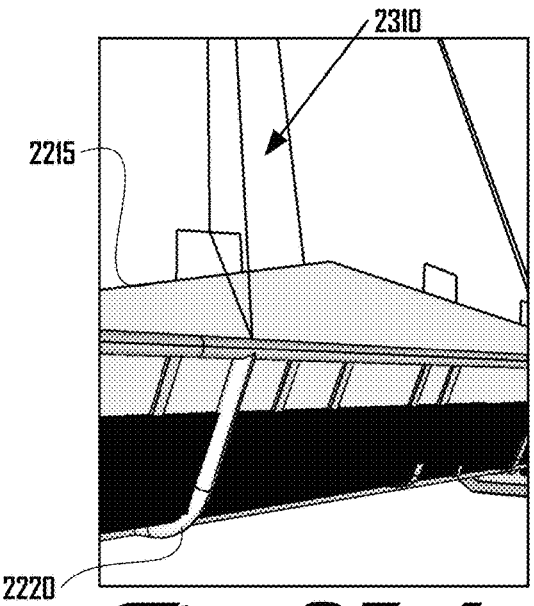
FIG. 23A illustrates a parallel projection of a detail of securement of a load bearing connector cable, in accordance with a first embodiment.

FIG. 23A illustrates a parallel projection of a detail of an example of securement of load bearing connector cables, in accordance with an embodiment. In this example, separate load bearing connector cables extend from rotational coupling 2206 and are separately secured to both flexible litter 2215, litter 2220, and between these securement locations. If a single of the securement location or load bearing connector cable fails, the other load bearing connector cable and securement location may provide a backup.

Figure 23B:
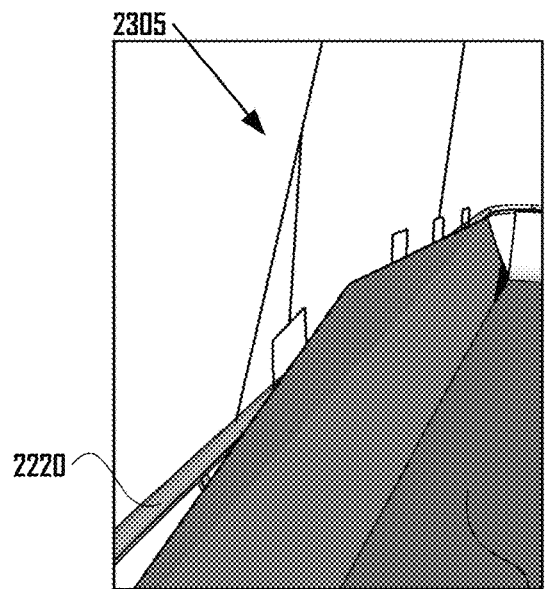
FIG. 23B illustrates a parallel projection of a detail of securement of a load bearing connector cable, in accordance with a second embodiment.

FIG. 23B illustrates a parallel projection of a detail of securement of load bearing connector cables, in accordance with an embodiment. In this example, a single load bearing connector cable extends from rotational coupling 2206, splits into two load bearing connector cables, each of which are separately secured to both flexible litter 2215, litter 2220. If a single of the securement location fails, the other securement location may provide a backup.

Figure 23C:
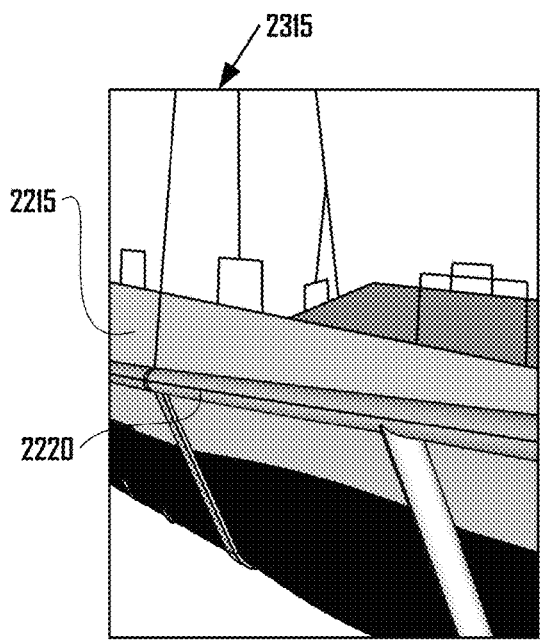
FIG. 23C illustrates a parallel projection of a detail of securement of a load bearing connector cable, in accordance with a third embodiment.

FIG. 23C illustrates a parallel projection of a detail of securement of load bearing connector cables, in accordance with an embodiment. In this example, separate load bearing connector cables extend from rotational coupling 2206 and are separately secured to both flexible litter 2215, litter 2220. If a single of the securement location or load bearing connector cable fails, the other load bearing connector cable and securement location may provide a backup. In an embodiment, a load bearing connector cable may only extend between rotational coupling and litter 2220 and not also to flexible litter 2215.

Figure 23D:
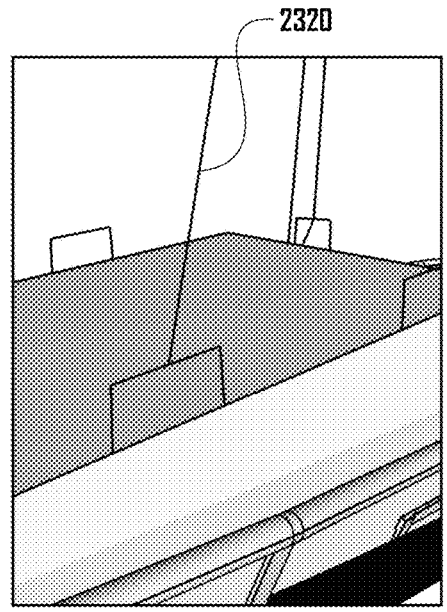
FIG. 23D illustrates a parallel projection of a detail of securement of a load bearing connector cable, in accordance with a fourth embodiment.

FIG. 23D illustrates a parallel projection of a detail of securement of a load bearing connector cable, in accordance with an embodiment. In this example, a single load bearing connector cable extends from rotational coupling 2206 to flexible litter 2215. In this example, litter 2220 and SLCS 2205 may be separately secured to flexible litter 2215 and/or to rotational coupling 2206.

FIG. 24 illustrates a parallel projection of a suspended load control system ("SLCS") secured to a litter 2400 and a detail of components of control and power supply and fan unit 2445, without a cowl or case to more clearly show internal components, in accordance with an embodiment. Coupling 2430 may be used to connect power and communications conduits, such as conduits to power supply and fan unit 2600. Quick release pin 2420 may be used to quickly and simply release control and power supply and fan unit 2445 from the litter to which it may be secured. Activation of quick release pin 2420 may both release control and power supply and fan unit 2445 from the litter and may also shut down or stop an EDF or other electronic components which may be operating. Emergency shut-off 2425 may be used to shut off control and power supply and fan unit 2445 and/or power supply and fan unit 2600, such as in response to twisting, turning, or pushing emergency shut-off 2425. Main power 2435 may be used to turn off main power to control and power supply and fan unit 2445, as well as to power supply and fan unit 2600.

Fan battery pack 2405 may contain one or more batteries to provide power to EDF in SLCS 2445. Power controller 2410 may comprise a power controller, such as an electronic speed controller, to output power and control signals to an EDF, such as in a pulse code modulated signal. Fan unit 2450 may comprise two EDFs, with thrust output nozzles oriented one-hundred and eighty degrees apart, as well as an air intake between them. Power controller 2410 may comprise three couplings: to fan battery pack 2405, to a processor on circuit board 2505 (see FIG. 25), and to an EDF in fan unit 2450. Additional components of control and power supply and fan unit 2445 are discussed in relation to FIG. 25. Power supply and fan unit 2600 illustrated in FIG. 24 is discussed further in relation to FIG. 26.

FIG. 25 illustrates a parallel projection of details of electronic components of control and power supply and fan unit 2445, in accordance with an embodiment. Circuit board 2505 may comprise amplifiers, power conditioners, and monitoring circuits between, for example, circuit board 2510 and power controller 2410. Circuit board 2510 may comprise processor and memory devices which may host or embody, for example, operational module 1700 and/or decision and thrust control module 1800. Radio frequency ("RF") board 2515 may comprise components used by a communications module, such as to enable wireless and wireline communication between components, including with power and supply fan unit 2600. Sensors, such as some or all of sensors 1605 may be in control and power supply and fan unit 2445.

Figure 26:
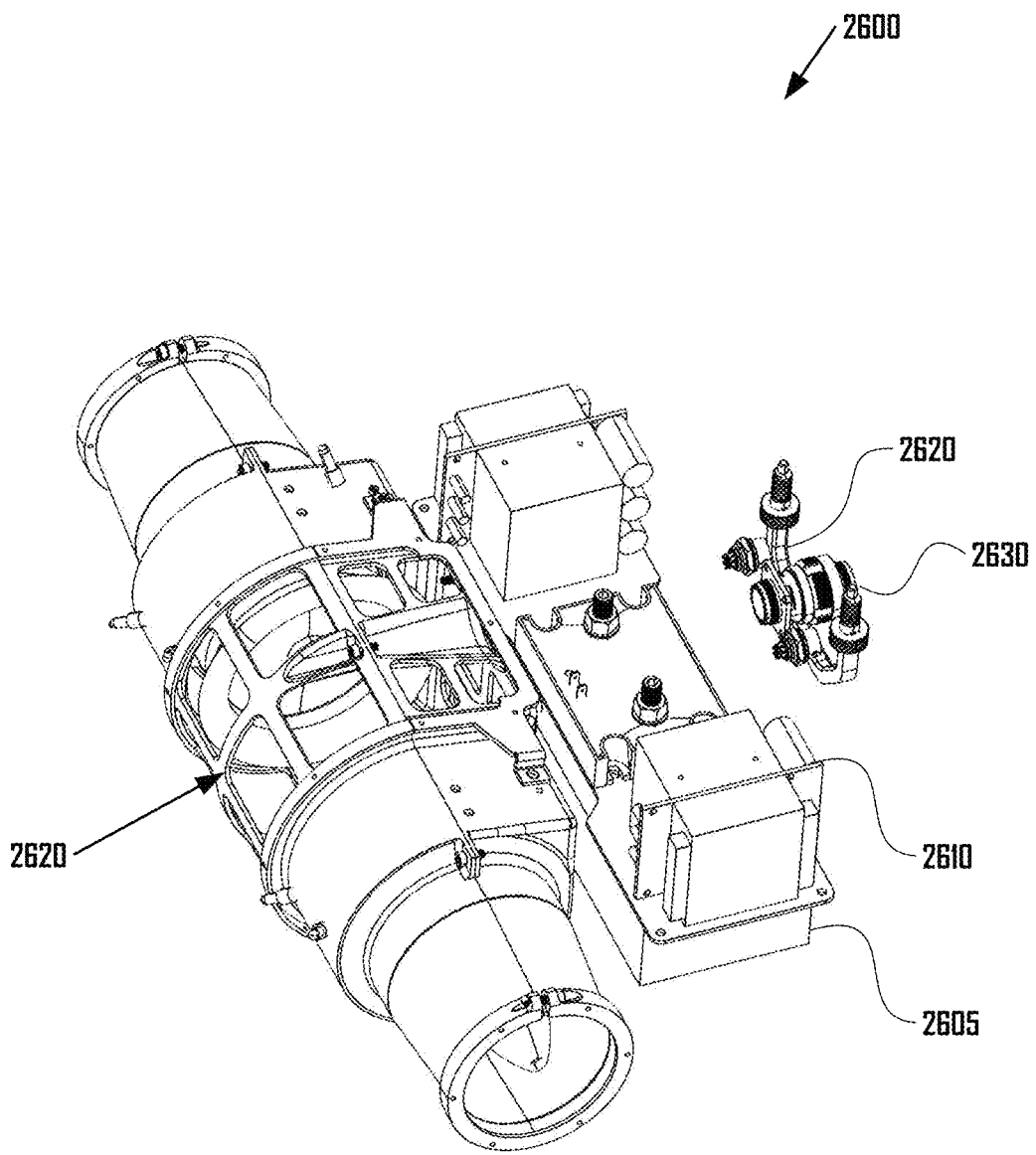
FIG. 26 illustrates a parallel projection of details of electronic components of the SLCS, in accordance with an embodiment.

FIG. 26 illustrates a parallel projection of electronic components of control and power supply and fan unit 2600, in accordance with an embodiment. Fan unit 2620 may comprise two EDFs and an air intake. Fan battery pack 2605 may comprise one or more batteries to provide power to EDFs in fan unit 2620. Power controller 2610 may comprise a power controller, such as an electronic speed controller, to provide power and control signals to an EDF in fan unit 2620. Fan battery pack 2605 and power controller 2610 may be located proximate to fan unit 2620 so as to reduce power losses and so as to increase signal fidelity between power controller 2610 and EDF in fan unit 2620. Coupling 2630 may be used to provide communications and/or electrical coupling to other components. For example, coupling 2630 may provide communications with control and power supply and fan unit 2445 and, for example, processor and memory and operational module 1700 and/or decision and thrust control module 1800 therein. Quick release pin 2620 may be used to quickly and simply release power supply and fan unit 2600 from the litter to which it may be secured. Activation of quick release pin 2620 may both release power supply and fan unit 2600 from the litter and may also shut down or stop an EDF or other electronic components which may be operating. Sensors, such as some or all of sensors 1605 may be in power supply and fan unit 2600.

Figure 27:
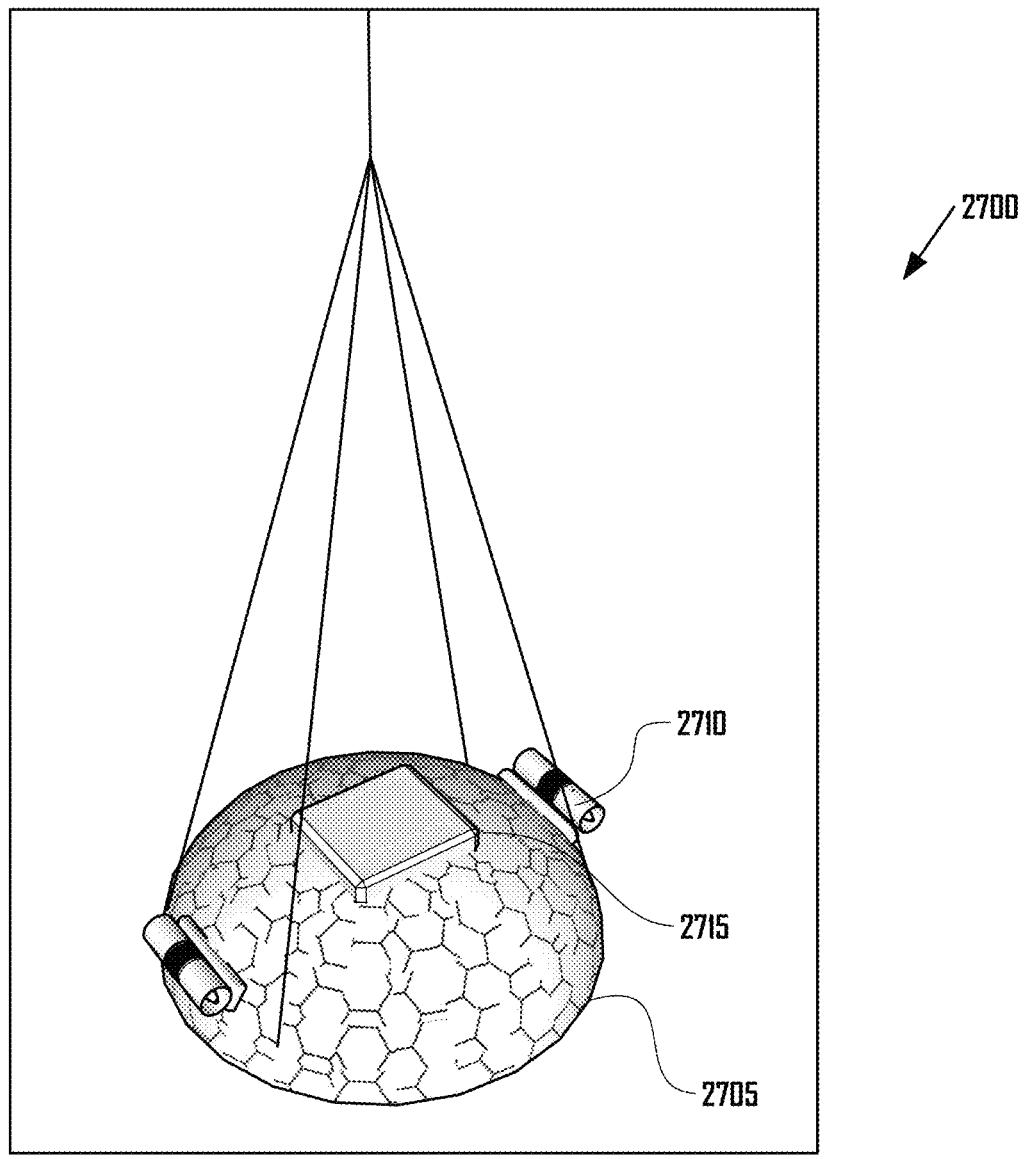
FIG. 27 illustrates a perspective view of a modular suspended load control system ("SLCS") secured to a load, in accordance with an embodiment.

FIG. 27 illustrates a perspective view of a modular suspended load control system ("SLCS") secured to a load 2700, in accordance with an embodiment. In this example, control unit 2715 may be a housing which contains processor, memory, sensors, such as sensors 1605, and modules such as operational module 1700 and decision and thrust control module 1800. Control unit 2715 and fan unit 2710 may be strapped, tied, clipped, bolted or otherwise secured to load 2705. Load 2705 may comprise multiple smaller loads within a webbing enclosure or webbing bundle, within a solid enclosure, or the like. Fan unit 2710 may comprise two EDF, as well as a power supply unit, similar to power supply and fan unit 2600. One of fan unit 2710 may be physically closer to control unit 2715. Sensors, such as some or all of sensors 1605 may be in power supply and fan unit 2710. Fan unit 2710 may be in wireless or wireline communication with control unit 2715. Control unit 2715 may control fan unit 2710 using, for example, modules such as operational module 1700 and decision and thrust control module 1800. Control unit 2715 and fan units 2710 are modular in the sense that these components may be contained in self-contained modules or units which may be secured to a load separately, but which may nonetheless work or function together.

Figure 28:
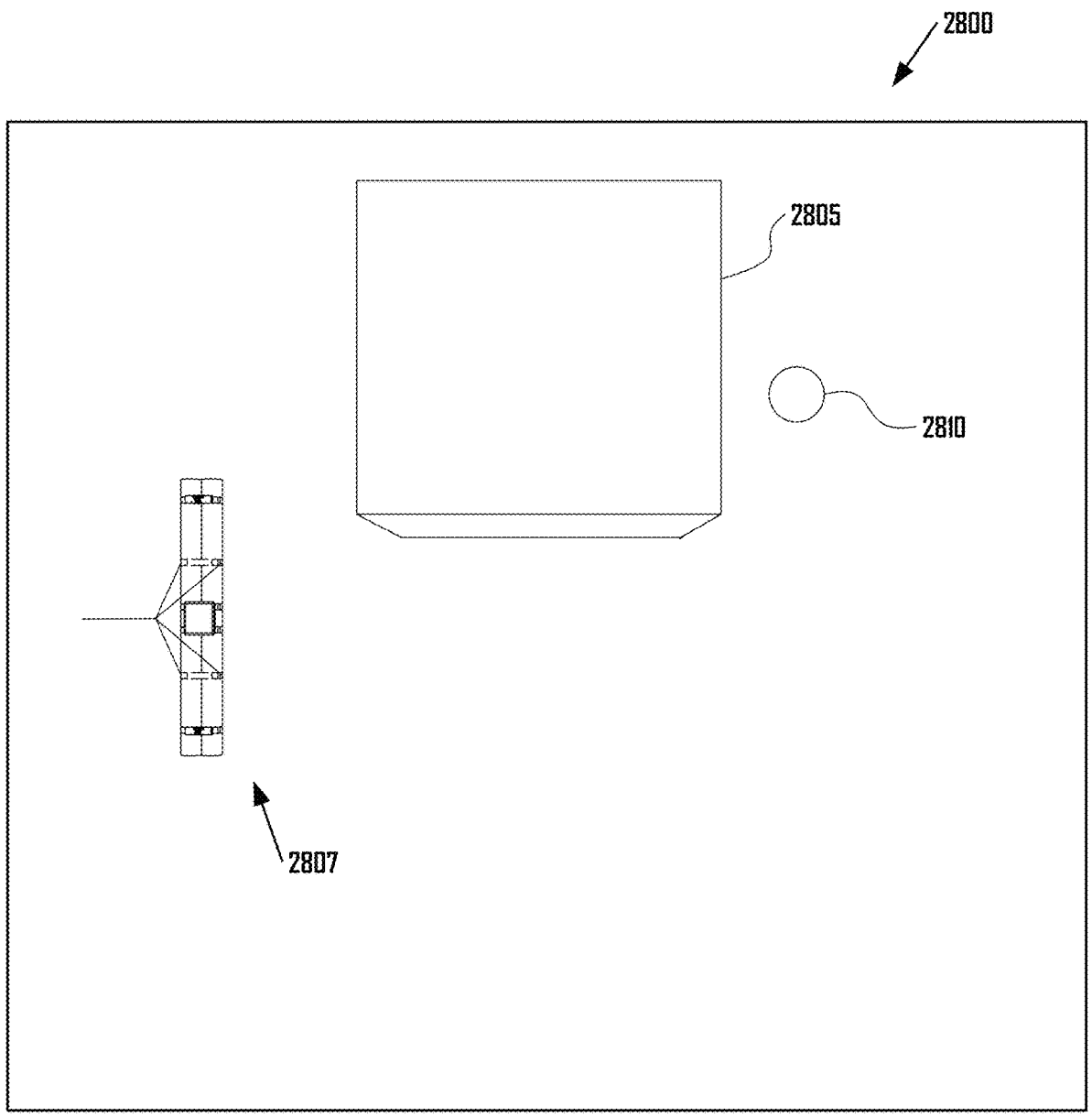
FIG. 28 illustrates a top perspective view of a modular suspended load control system ("SLCS") secured to a load in a first position relative to an obstacle, in accordance with an embodiment.

FIG. 28 illustrates a top perspective view of a modular suspended load control system ("SLCS") secured to load 2807 in a first position relative to an obstacle 2805, in accordance with an embodiment. Target 2810 may be an intended destination for the load. A remote positional unit or target node may be at target 2810. Target 2810 may also be identified by a user identifying such location on a map or according to coordinates. A carrier, such as a helicopter or crane, may be carrying SLCS secured to load 2807. Obstacle avoidance module 3800 and/or decision and thrust control module 1800 may be active and, in conjunction with operational module 1700 and decision and thrust control module 1800, may instruct SLCS secured to load 2807 to rotate the load so as to reduce the proximity of the SLCS' to obstacle 2805 or to negotiate the load relative to obstacle 2805.

Figure 29:
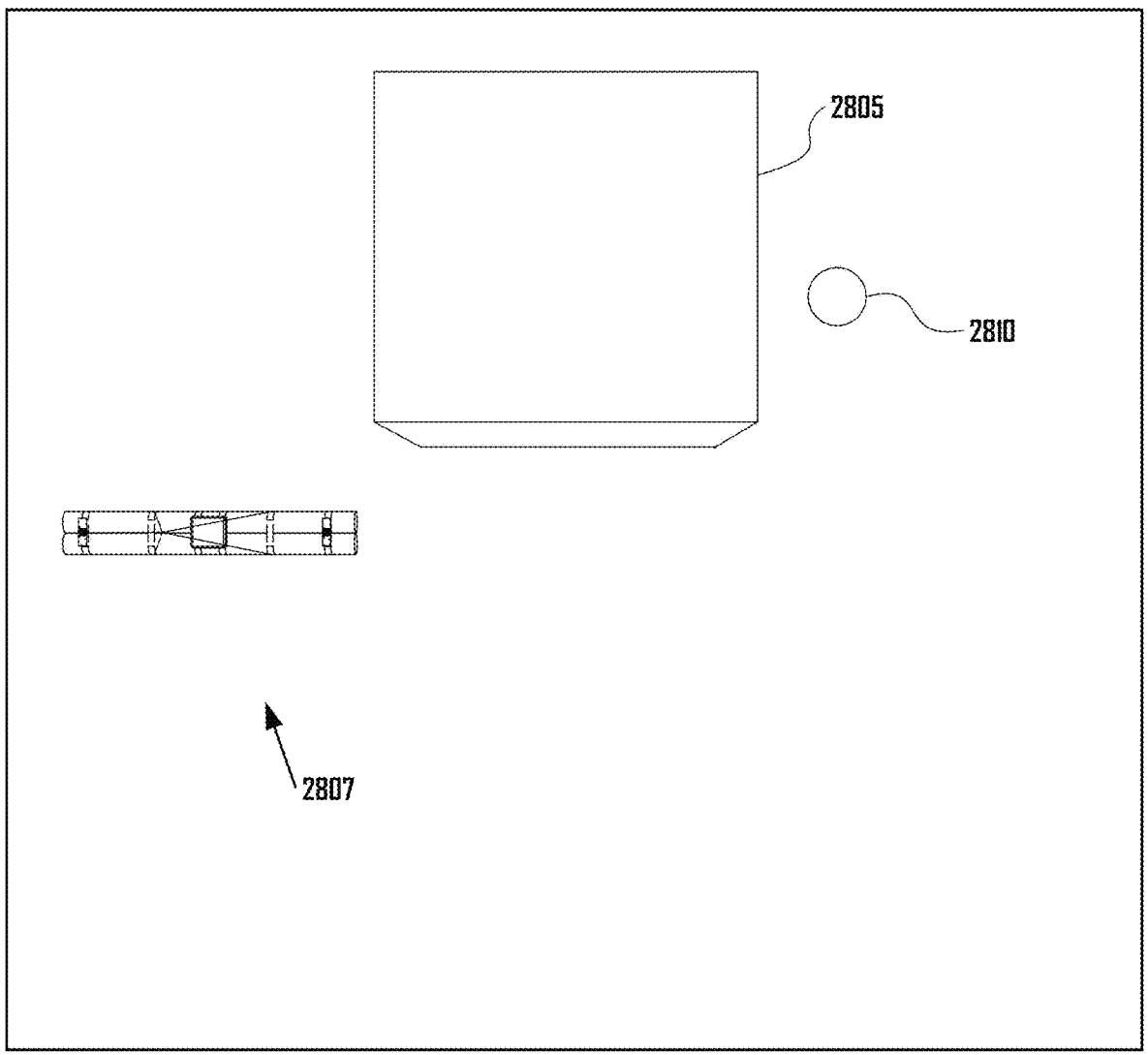
FIG. 29 illustrates a top perspective view of the modular suspended load control system ("SLCS") secured to the load of FIG. 28, in a second position relative to the obstacle, in accordance with an embodiment.

FIG. 29 illustrates a top perspective view of the modular suspended load control system ("SLCS") secured to load 2807 of FIG. 28, in a second position relative to obstacle 2805, in accordance with an embodiment. As illustrated in this example, obstacle avoidance module 3800, in conjunction with operational module 1700 and decision and thrust control module 1800, may have rotated load so as to equalize the distance of ends of load or of fan units on SLCS to obstacle 2805 or to negotiate the load relative to obstacle 2805, such that SLCS secured to load 2807 avoids contact with or obstacle 2805. This may allow the operator of the carrier to transport SLCS secured to load 2807 along a first side of obstacle 2805 toward target 2810.

Figure 30:
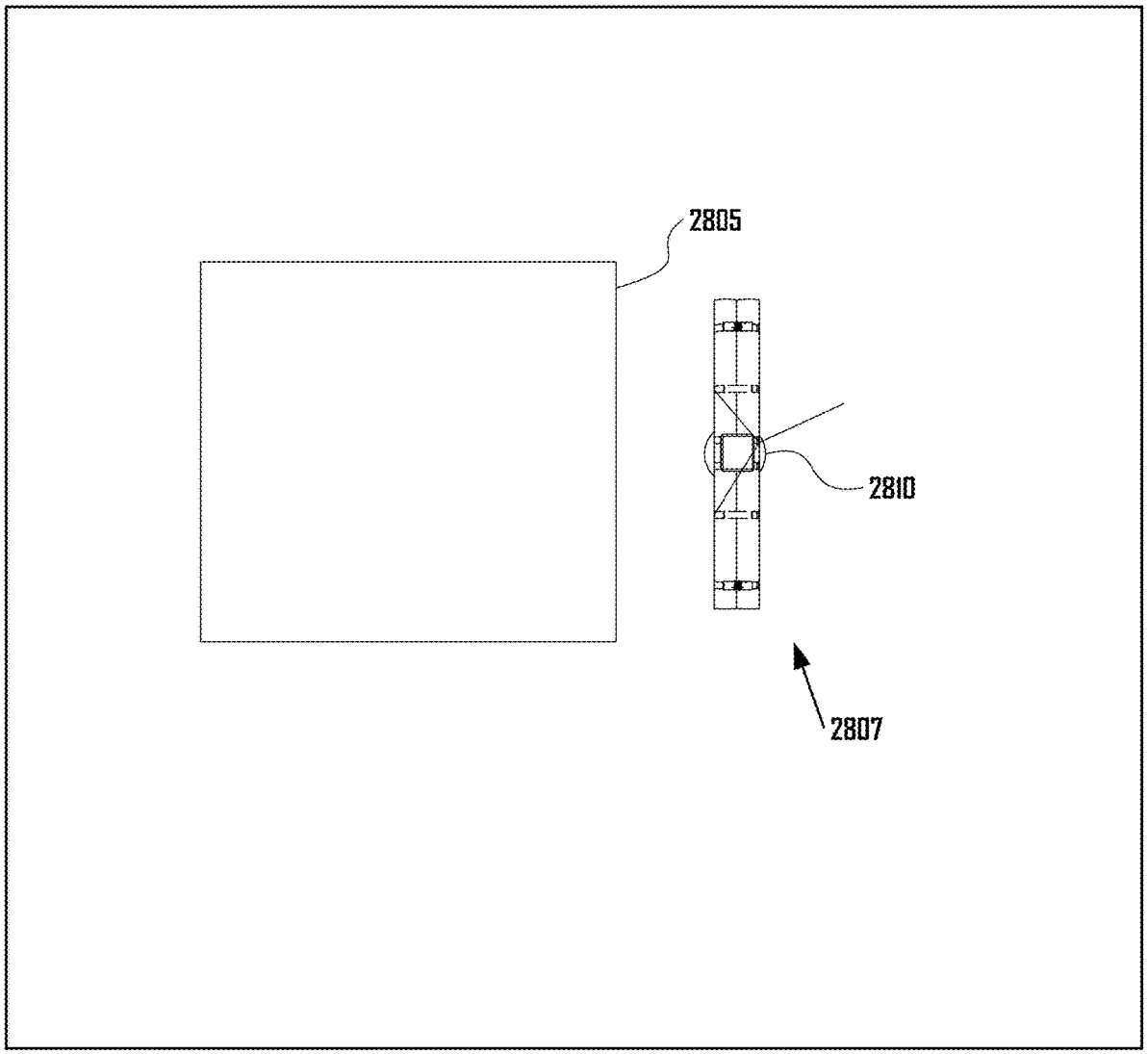
FIG. 30 illustrates a top perspective view of the modular suspended load control system ("SLCS") secured to the load of FIG. 28, in a third position relative to the obstacle, in accordance with an embodiment.

FIG. 30 illustrates a top perspective view of the modular suspended load control system ("SLCS") secured to load 2807 of FIG. 28, in a third position relative to obstacle 2805, in accordance with an embodiment. As illustrated in this example, obstacle avoidance module 3800, in conjunction with operational module 1700 and decision and thrust control module 1800, may have rotated SLCS secured to load 2807 so as to equalize the proximity of ends of SLCS secured to load 2807 relative to obstacle 2805 or to otherwise negotiate relative to obstacle 2805, which results in SLCS secured to load 2807 rotating ninety degrees as the load is transported around the corner of obstacle 2805. This may allow the operator of the carrier to continue transporting SLCS secured to load 2807 along a second the side of obstacle 2805 toward target 2810.

Figure 31:
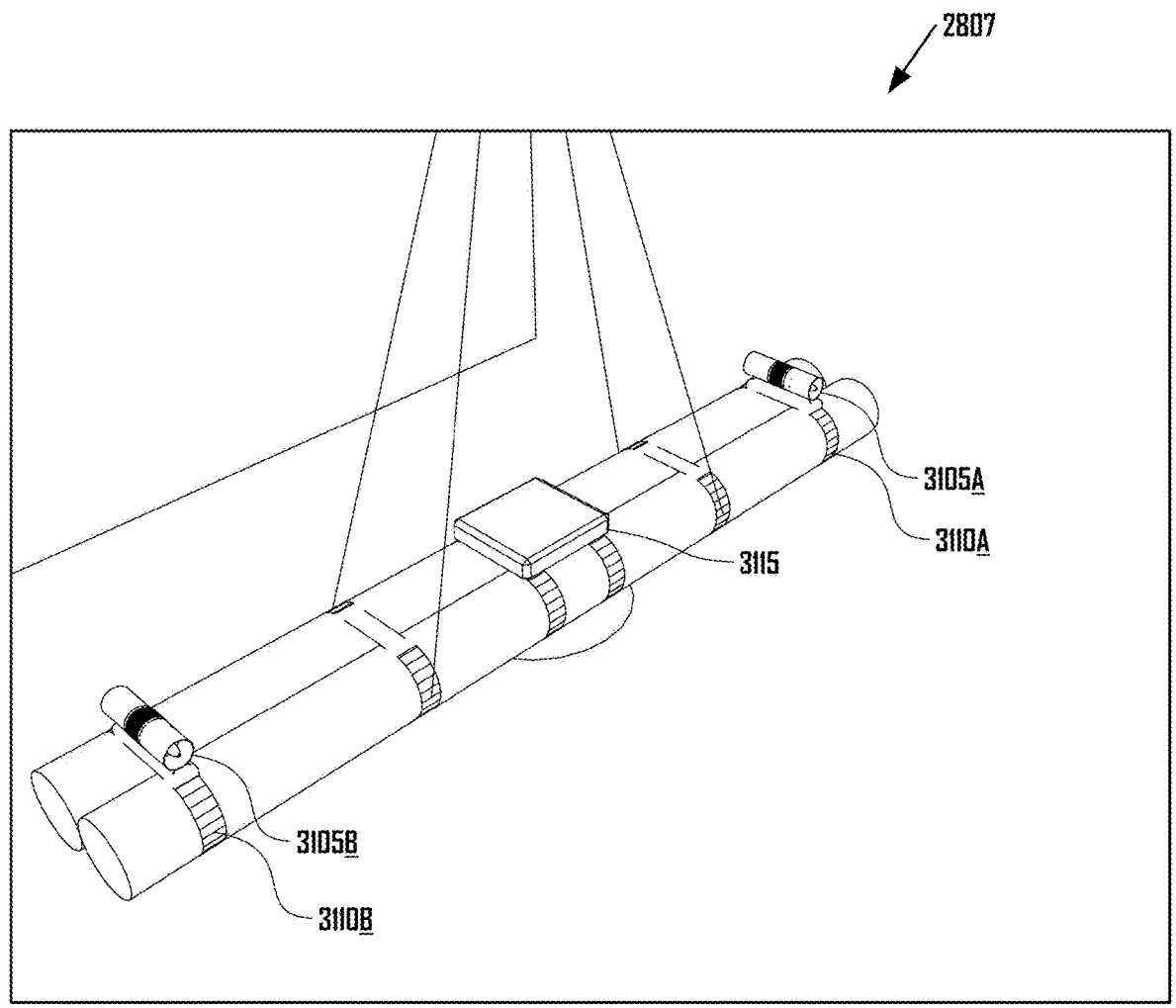
FIG. 31 illustrates a perspective view of the modular suspended load control system ("SLCS") secured to the load of FIG. 28, in accordance with an embodiment.

FIG. 31 illustrates a perspective view of the modular suspended load control system ("SLCS") secured to load 2807 of FIG. 28, in accordance with an embodiment. Fan unit 3105A and fan unit 3105B may comprise EDF and power supply units, similar to power supply and fan unit 2600. Fan unit 3105A is secured by straps 3110A to the load and fan unit 3105B may also be secured by straps 3110B to the load. Straps 3110 may comprise straps, webbing, rope, cable, chains, steel reinforced rubber and the like, secured with compression fittings and the like. In alternative embodiments, eye hooks and similar fasteners may be incorporated into straps or may be embedded into the load. Load bearing connector cables may connect to straps on load, wherein the straps on load may be similar to straps 3110. Control unit 3115 may similarly be secured to the load with straps or the like. Control unit 3115 may control fan units 3105 and may comprise components similar to load control system logical components 1601.

Figure 32:
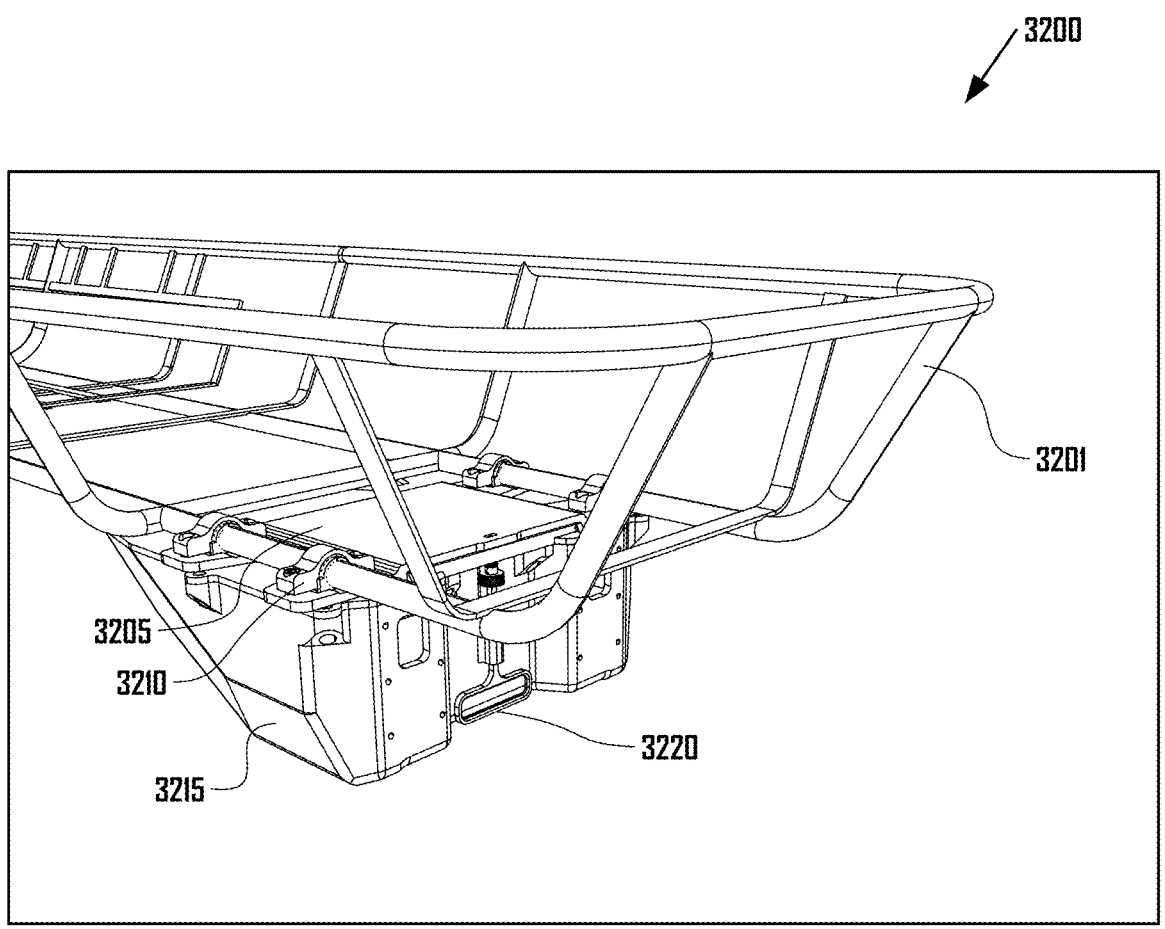
FIG. 32 illustrates a perspective view of a securement mechanism to releasably secure a modular component of a suspended load control system ("SLCS") to a load, in accordance with an embodiment.

FIG. 32 illustrates a perspective view of a securement mechanism 3200 to releasably secure a modular component of a suspended load control system ("SLCS") to a load, such as housing 3215, in accordance with an embodiment. The modular component represented by housing 3215 in FIG. 32 may be, for example, a control and power supply unit for a fan unit, though embodiments of securement mechanism 3200 may be used with and/or incorporated into other modular components, such as a power supply unit, a control unit, a fan unit, and the like. As illustrated in FIG. 32, load 3201 may be, for example, a litter, though may be another load which may be carried or transported by a carrier via a suspension cable, such as a box, a structural box, a cage, a sling load with a rigid surface to which securement mechanism 3200 may be secured, or the like.

Securement mechanism 3200 may comprise, for example, rail 3205, flange 3225, and pin 3220. Rail 3205, flange 3225, and pin 3220 may also be referred to herein as "interlocking structures" and, together, as a "set of interlocking structures". Rail 3205 may be secured or connected to load 3201, for example, via clamps 3210 or the like. Flange 3225 may be secured or connected to housing 3215, such as via bolts or the like. Rail 3205 and flange 3225 may comprise interlocking structures which allow rail 3205 and flange 3225 to be releasably secured. For example, rail 3205 and flange 3225 may physically overlap, slide together, or otherwise restrict relative degrees of freedom of motion of the structures. In the example illustrated in FIG. 32, rail 3205 restricts the freedom of motion of flange 3225 to one degree. The one degree of freedom of motion of flange 3225 may further be releasably constrained or precluded by, for example, pin 3220 or a similar structure which may be releasably interposed between or across the components. For example, rail 3205 and flange 3225 may comprise interlocking flanges, recesses, interlocking male and female components, or the like. As illustrated in FIG. 32 through 36, rail 3205 comprises or forms a notch or grove 3505 into which flange 3225 may slide, allowing rail 3205 and flange 3225 to engage such that rail hole 3206 and flange hole 3226 align.

When engaged, rail hole 3206 in rail 3205 may align with pin 3220 and, optionally, with flange hole 3226. Pin 3220 may pass through rail hole 3206 and, optionally, through flange hole 3226. When passed at least through rail hole 3206, pin 3220 constrains or precludes the one degree of freedom of motion allowed between engaged rail 3205 and flange 3225. If pin 3220 is not precluded in its freedom of motion relative to housing 3201, then pin 3220 may pass through both rail hole 3206 and flange hole 3226, to constrain or prohibit the one degree of freedom of motion between flange 3225 and rail 3205.

If, as illustrated in FIG. 32, pin 3220 is precluded in one or more degrees of freedom of motion relative to housing 3201, such as by bracket 3221, then pin 3220 may only need to pass through rail hole 3206 to constrain, preclude, or prohibit the one degree of freedom of motion allowed between flange 3225 and rail 3205.

Pin 3220 may comprise, for example, a handle, a rod, a spring. Pin 3220 may pass through bracket 3221 in, on, or of housing 3215. A spring in pin 3220 may bias pin 3220 to pass through or not to pass through flange hole 3226.

When flange 3225 and notch 3505 engage with rail 3205, with structures physically overlapping and constraining the motion of one or both structures to allow one degree of freedom of motion relative to one another, when such arrangement comprises alignment of a two dimensional passage between flange 3225 and rail 3205, such as alignment of rail hole 3206 and flange hole 3226, and when such two dimensional passage is transverse to the one degree of freedom of motion between flange 3225 and rail 3205, then the two dimensional passage may be occupied by a rigid body, such as pin 3220, with one degree of freedom of motion parallel to the passage between flange 32225 and rail 3205 and transverse to the one degree of freedom of motion between flange 3225 and rail 3205. When the passage between flange 32225 and rail 3205 is occupied by a rigid body, flange 3225, housing 3215, rail 3205, and load 3201 are releasably secured. When the rigid body, such as pin 3220, is withdrawn from the passage between flange 3225 and rail 3205, then flange 3225, housing 3215, rail 3205, and load 3201 are releasably securable.

Figure 33:
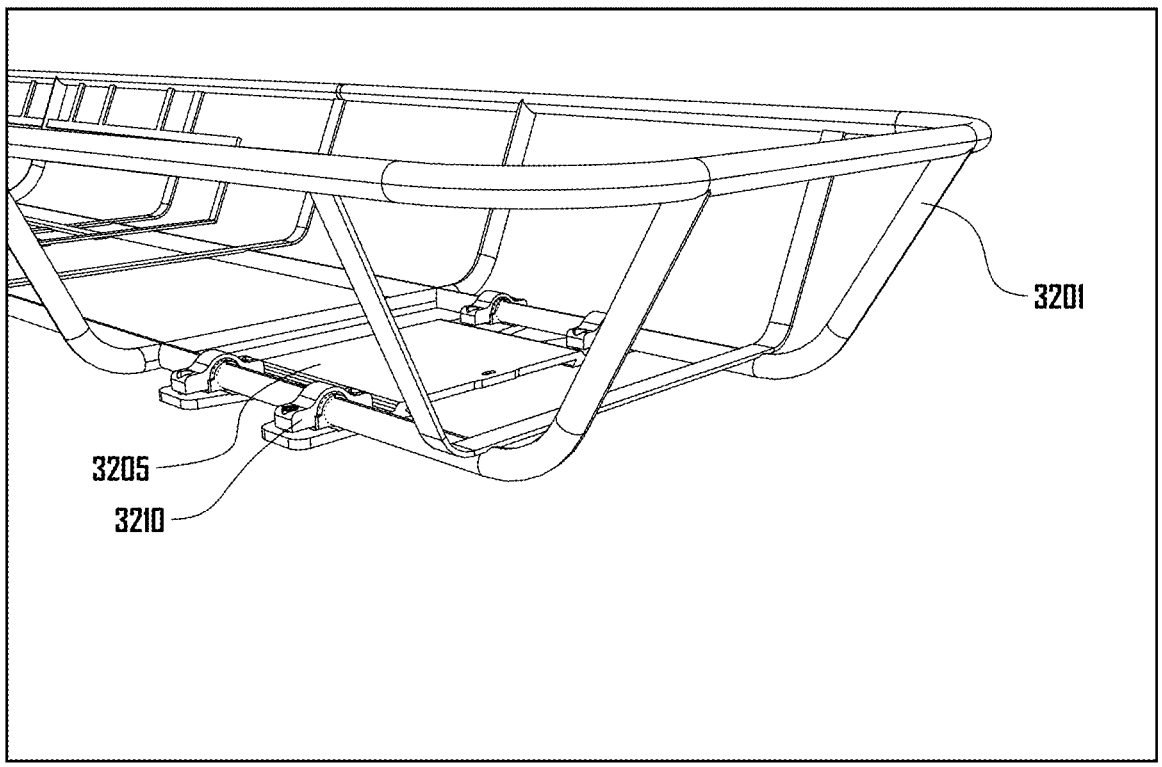
FIG. 33 illustrates a perspective view of components of the securement mechanism of FIG. 32, in accordance with an embodiment.

FIG. 33 illustrates a perspective view of components of securement mechanism 3200 of FIG. 32, in accordance with an embodiment. Rail 3205, clamp 3210, and load 3201 are illustrated with other components hidden for the sake of clarity.

Figure 34:
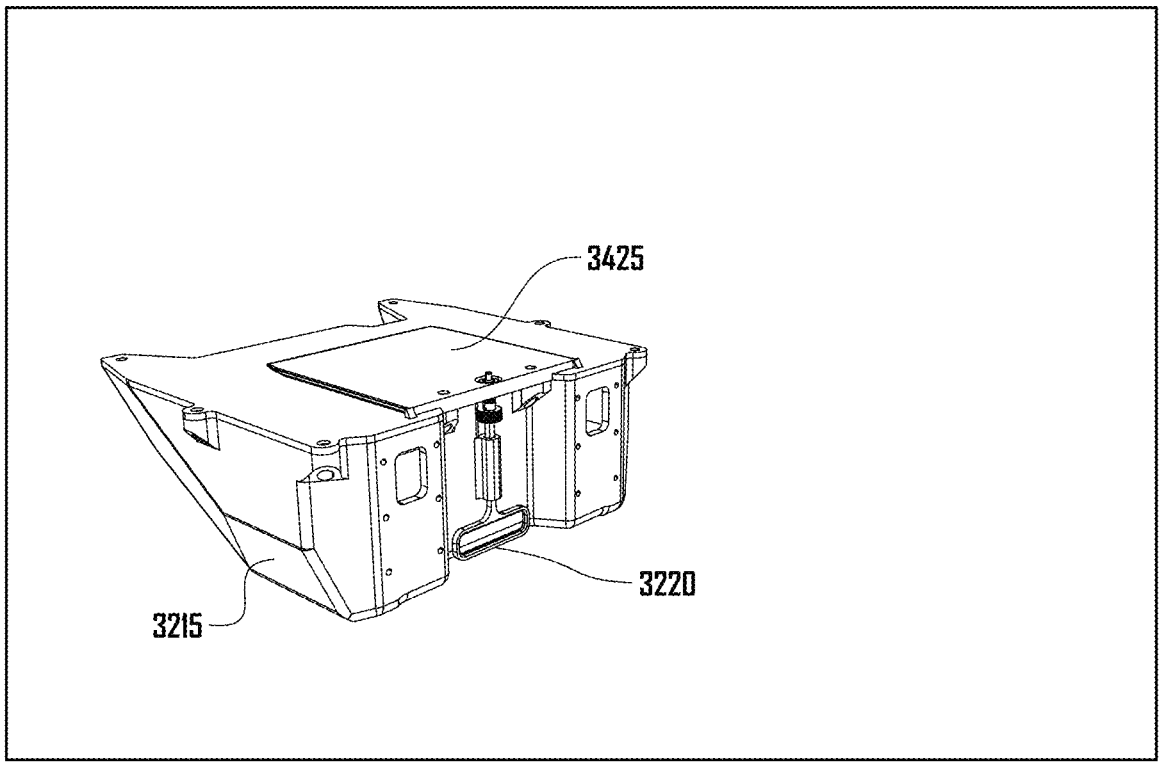
FIG. 34 illustrates a perspective view of components of the securement mechanism of FIG. 32, in accordance with an embodiment.

FIG. 34 illustrates a perspective view of components of securement mechanism 3200 of FIG. 32, in accordance with an embodiment. Housing 3215, pin 3220, flange 3225 are illustrated with other components hidden for the sake of clarity.

Figure 35:
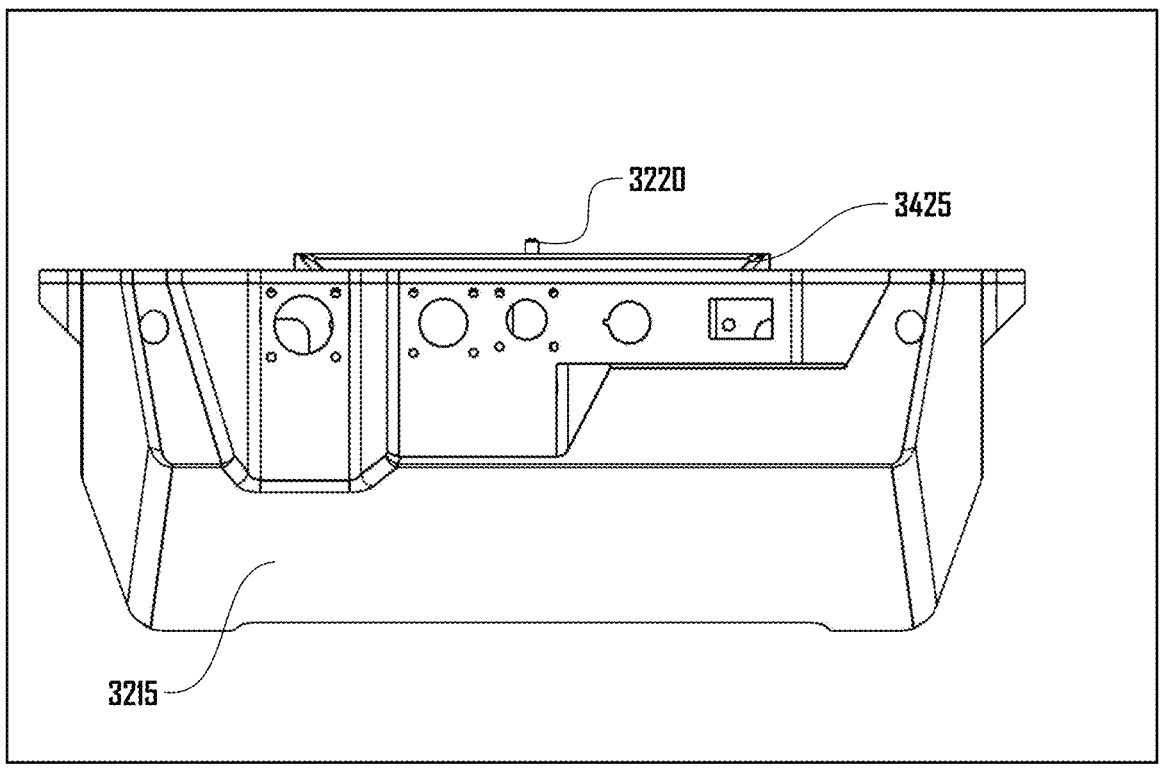
FIG. 35 illustrates a parallel projection of an elevation of components of the securement mechanism of FIG. 32, in accordance with an embodiment.

FIG. 35 illustrates a parallel projection of an elevation of components of securement mechanism 3200 of FIG. 32, in accordance with an embodiment. Pin 3220, flange 3225, and notch or grove 3505 are illustrated with other components hidden for the sake of clarity.

Figure 36:
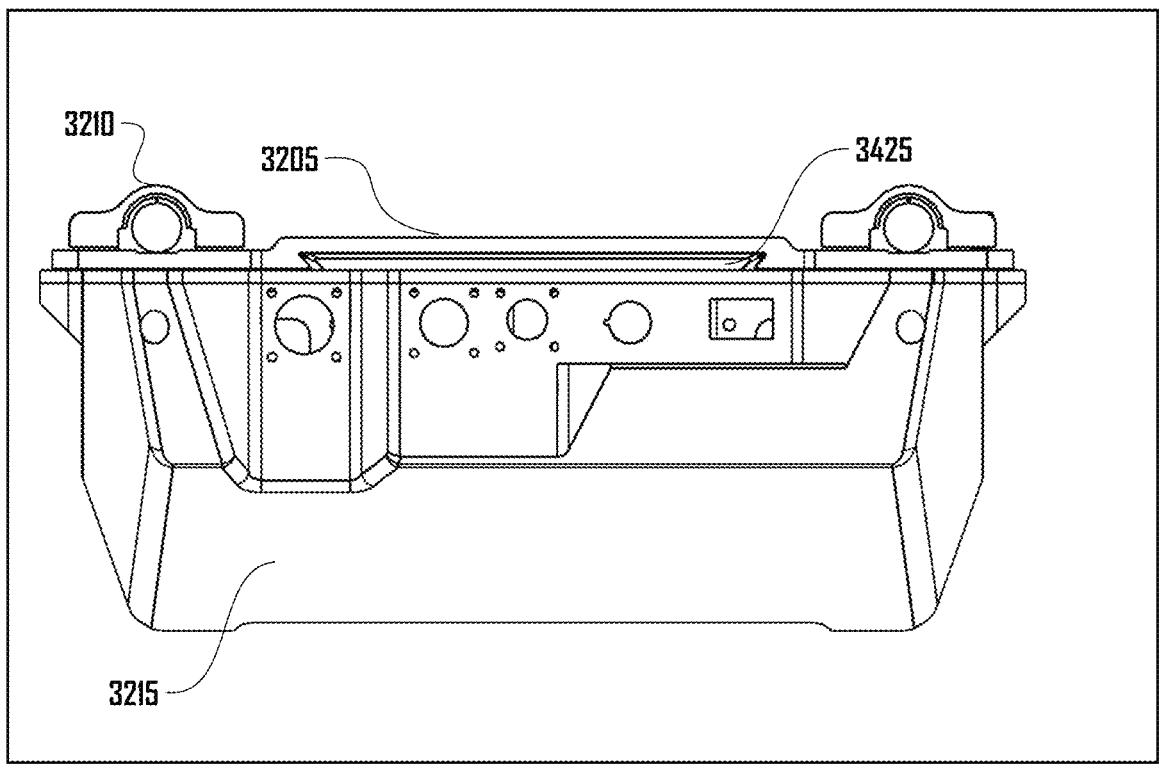
FIG. 36 illustrates a parallel projection of an elevation of components of the securement mechanism of FIG. 32, in accordance with an embodiment.

FIG. 36 illustrates a parallel projection of an elevation of components of securement mechanism 3200 of FIG. 32, in accordance with an embodiment. Clamp 3210, rail 3205, flange 3225, and housing 3215 are illustrated with other components hidden for the sake of clarity.

Figures 37A, 37B, 37C:
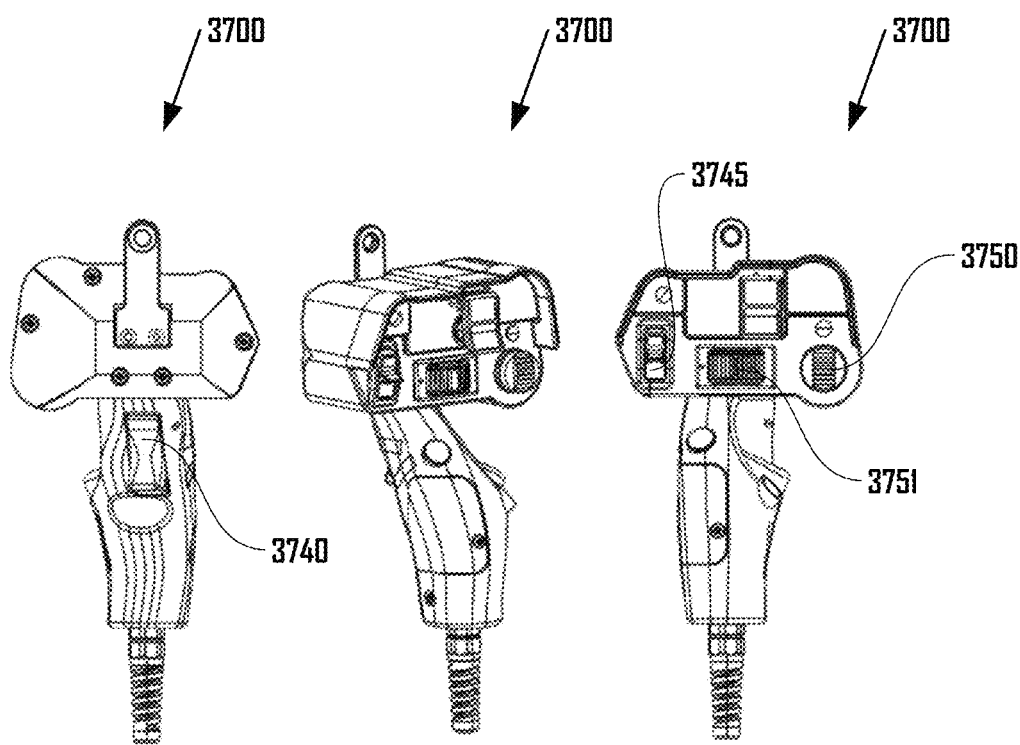
FIG. 37A is a back elevation view of a remote pendant, in accordance with an embodiment.
FIG. 37B is an oblique view of the remote pendant of FIG. 37A, in accordance with an embodiment.
FIG. 37C is a front elevation view of the remote pendant of FIG. 37A, in accordance with an embodiment.

FIG. 37A illustrates an embodiment of remote pendant 3735 comprising, for example, activation controller 3740. FIG. 37B illustrates another view of an embodiment of remote pendant 3735. FIG. 37C illustrates another view of an embodiment of remote pendant 3735 comprising, for example, on/off switch 3745, state selector 3750, and manual/rotational control 3751. On/off switch 3745 may be used to turn on remote pendant 3735. State selector 3750 may be used to select a command state operational module 1700, as may be discussed in relation to FIG. 17. Activation controller 3740 may be used to activate or deactivate an SLCS in or relative to a selected command state. Manual/rotational control 3751 may be used to manually activate fans to rotate or translate a load.

FIG. 37A illustrates an embodiment of remote pendant 3700 comprising, for example, activation controller 3740. FIG. 37B illustrates another view of an embodiment of remote pendant 3700. FIG. 37C illustrates another view of an embodiment of remote pendant 3700 comprising, for example, on/off switch 3745, state selector 3750, and manual/rotational control 3751. On/off switch 3745 may be used to turn remote pendant 3700 on or off. State selector 3750 may be used to select a command state of operational module 1700, as may be discussed in relation to FIG. 17. Activation controller 3740 may be used to activate or deactivate operational module 1700 in or relative to a command state selected or indicated by state selector 3750. Manual/rotational control 3751 may be used to manually activate fans to rotate or translate a load when state selector 3750 has been used to select, for example, direct control mode 1727.

Figure 38:
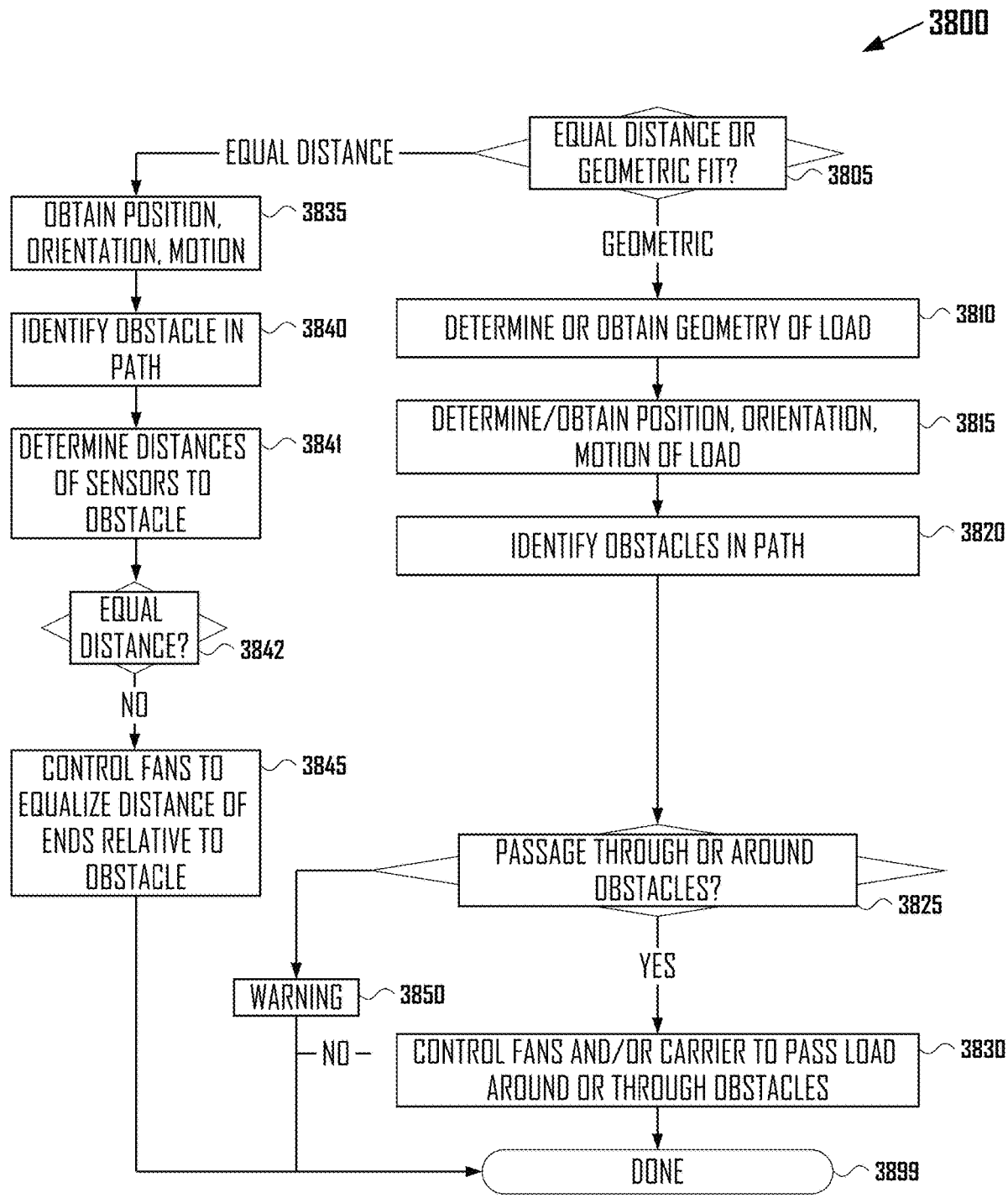
FIG. 38 illustrates a suspended load control system obstacle avoidance module, in accordance with one embodiment.

FIG. 38 illustrates an example of obstacle avoidance module 3800 of a suspended load control system ("SLCS"), in accordance with one embodiment. Instructions of, or which embody, obstacle avoidance module 3800 may be stored in, for example, memory 1625, and may be executed or performed by, for example, processor 1620, as well as by electrical circuits, firmware, and other computer and logical hardware of SLCS with which avoidance module 3800 may interact. In embodiments, computer processors and memory to perform some or all of obstacle avoidance module 3800 may be remote from SLCS, such as in an auxiliary computer in, for example, a carrier.

At decision block 3805, obstacle avoidance module 3800 may determine whether it is to follow an "equal distance" or "geometric fit" process. An equal distance process may, for example, control fans to maintain an approximately equal distance between obstacle(s) in the environment and fans, fan units, or load. A geometric fit process may, for example, control fans to cause a load to negotiate through or around an obstacle based on a determined or obtained geometry of a load. Equal distance process may have lower computational and sensor demands than geometric fit process. Which process to follow may be provided by user input, by selection of another process, and/or by availability of processing capacity and sensor input.

If geometric fit process or equivalent at decision block 3805, at block 3810, obstacle avoidance module 3800 may perform machine or computer vision processes or may receive input to determine or obtain a geometry of a load and an SLCS and to identify a load and SLCS as distinct from other (potential) objects in an environment. For example, in a nonexclusive embodiment, obstacle avoidance module 3800 may obtain information from distance or similar sensors in or of SLCS modules attached to load, which distance or similar sensors may obtain distance between such sensors (such as between distance sensors on different fan units of an SLCS) as well as between such sensors and the environment. Such information may be used by computer vision processes, e.g. object recognition, to determine the geometry of the load and SLCS. For example, in a nonexclusive embodiment, obstacle avoidance module 3800 may receive one or more images or pixels of load, SLCS, and the environment, such as from a camera, LIDAR, or another sensor on a carrier or on SLCS. Such images or pixels may comprise depth information, such as from a depth camera, a stereo camera, LIDAR, or the like. Such images or pixels may comprise edge, greyscale, and color information. Identification of load and SLCS, as distinct from other objects or artifacts in a field of view of such sensors, may be facilitated by electromagnetic or acoustic emitters, transmitters, or patterns on or of load or of suspension cable. For example, such emitters, transmitters, or patterns may be present on or may be of load or SLCS, suspension cable, and/or may be on or of modules of an SLCS secured to load; for example, a load and/or SLCS, may comprise radiofrequency transmitters, LEDs and other electromagnetic transmitters or emitters (including fans and other electrical components which may emit radiofrequency or electromagnetic radiation); for example, a load and/or SLCS may have a patterned surface or materials; for example, a load and/or SLCS may have a structures which sensors and computer vision processes are trained or programmed to identify (such as a suspension cable, a pattern on or of a load and SLCS), and the like. Corresponding sensors may be present on or in carrier or another location which as a view of load and SLCS, wherein the corresponding sensors may receive transmissions from such emitters or otherwise receive input, such as image input, which is used detect such patterns and to determine the geometry of the load and SLCS. In a nonexclusive embodiment, determination of geometry of load may be based on images or other information from sensors in SLCS relative to a known image, such as of the carrier. For example, if the carrier has a known or characterized geometry and size (or has transmitters with a known geometry), then computer vision processes can be executed separately for each of a plurality of sensors relative to the carrier to determine the geometric relationship of each of the plurality of sensors relative to the carrier; the geometric relationship of each of the plurality of sensors relative to the carrier can then be compared to determine the geometric relationship of each of the plurality of sensors relative to one another. For example, a suspension cable may hang down to load and SLCS; the suspension cable, load, and SLCS may be in one or more images and may be used to facilitate training of machine or computer vision to recognize one or more of suspension cable, load, SLCS, and/or carrier and to determine the geometry and size thereof. In a nonexclusive embodiment, the geometry and size may be provided by a user, such as by input into a remote interface or otherwise into obstacle avoidance module 3800. Computer vision and object recognition processes may include, for example, Intel RealSense® computer vision technology.

At block 3815, obstacle avoidance module 3800 may process such images or may obtain from another process, such as a computer vision process, such as Intel RealSense® computer vision technology, or may obtain from decision and control module 1800, such as from state estimation 1815, to determine or obtain orientation, position, and motion of the load and SLCS. The orientation, position, and motion of load and SLCS may include a current orientation, position, and motion as well as a predicted or projected future orientation, position, and motion.

At block 3820, obstacle avoidance module 3800 may identify obstacles in a path of load and SLCS, e.g., along a path of a projected motion of load and SLCS (including a path which accounts for an elevation of load and elevation of such obstacle(s)). Identification of obstacles in path of load and SLCS may be similar to identification of load and SLCS, e.g. based on sensor input and machine or computer vision analysis of such input. Identification of obstacles in path of load and SLCS may use input from sensors located on SLCS as well or instead of sensors located on the carrier. All objects or pixels not identified as load and SLCS may be identified as obstacle(s).

At decision block 3825, obstacle avoidance module 3800 may determine whether a passage through or around such identified obstacles may exist for load and SLCS, including based on different orientations of geometry of load and SLCS and based on available motions of load and SLCS, as may be driven by carrier and/or SLCS.

If affirmative or equivalent at decision block 3825, at block 3830, obstacle avoidance module 3800 may control fans and/or carrier to pass load and SLCS around or through obstacles. Control of carrier may comprise integration with control systems or modules of carrier and/or may comprise providing instructions to an operator of carrier. Control of fans may be through input to decision and thrust control module 1800, such as to block 1820.

If negative or equivalent at decision block 3825, at block 3850, obstacle avoidance module 3800 may provide a warning that no path, or that no safe path with a buffer margin, is available. The warning may be provided to, for example, an operator of carrier or to a process involved in the operation of carrier. Such warning may be provided via lights, auditory output, text output, or the like.

If equal distance or equivalent at decision block 3805, at block 3835, obstacle avoidance module 3800 may determine or obtain position, orientation, and motion of load and SLCS, such as of fan units or other distally located modules of SLCS. Determination or obtaining position, orientation, and motion of load and SLCS may be similar to block 3815, including based on predicate sensor input, though may be focused on distally located modules of SLCS, such as fan units, rather than on the entire geometry of load and SLCS. For in a nonexclusive embodiment, determination of position, orientation, and motion of load and SLCS may be obtained from decision and control module 1800, such as from state estimation 1815.

At block 3840, obstacle avoidance module 3800 may identify obstacles in a path of load and SLCS. Identification of obstacles in path may be similar to block 3820 and may involve machine or computer vision processes. In a nonexclusive embodiment, identification of obstacles may be based on though may be focused or based on distance information, images, LIDAR, and the like provided by sensors on or of SLCS, such as sensors on or of fan units. The sensors may be located at opposite ends of the load, such as in distally located fan units, at the ends of the load, or the like.

At block 3841, obstacle avoidance module 3800 may determine the distances of sensors of SLCS to the obstacle. Such determination may be based on distance information obtained by sensors in the SLCS, such as sensors in fan units or the like which may be located at opposite ends of a load. In embodiments, the sensor information may be distance information, such as distance information from distance cameras, LIDAR, RADAR, and the like. In an embodiment, obstacle avoidance module 3800 may only determine distance information for sensors in the SLCS, and may not also obtain position, orientation, or motion nor may also identify obstacles in the path of load and SLCS. In this embodiment, obstacle avoidance module 3800 may be activated by a user when a load and SLCS are proximate to an obstacle. In a nonexclusive embodiment, the sensor information may only be considered by obstacle avoidance module 3800 when the sensor information indicates a sensor that is within a threshold distance of the sensor.

At block 3842, obstacle avoidance module 3800 may determine whether the distance between the sensors and the obstacle of block 3841 are equal. For example, please refer to the discussion of FIGS. 28 to 31.

At block 3845, obstacle avoidance module 3800 may control fans in an SLCS to equalize distance load and SLCS to the obstacle.

At done block 3899, obstacle avoidance module 3800 may return to a previous block, to continue to iterate until a target is reached, or may conclude or return to another process which may have called it.

Status indicator lights may be mounted on various surfaces of the SLCS to aid in visibility and operation of the SLCS from above and below. For example, the SLCS may have external lighting such as LEDs near the thrusters that identify the edges and orientation of the SLCS. This allows for improved identification in hard viewing situations such as inclement weather. During operation, both on an interactive display and the system body, LED display indicators may show that the system is active and may convey useful information.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

Following are non-limiting examples.

Example 1. A load control system to influence at least one of a position, orientation, or motion of a load suspended by a cable from a carrier, comprising: a litter frame, a plurality of thrusters, a sensor suite, and a computer processor and memory, wherein the memory comprises a thrust control module which, when executed by the computer processor, determines a position, orientation, or motion based on a sensor data from the sensor suite and controls the plurality of thrusters according to the position, orientation, or motion to influence at least one of the position, orientation, or motion of the load and wherein the plurality of thrusters, sensor suite, and computer processor and memory are integrated into the litter frame.

Example 2. The load control system according to Example 1, further comprising a fan unit, wherein the fan unit comprises a first thruster and a second thruster in the plurality of thrusters.

Example 3. The load control system according to Example 2, wherein the fan unit comprises an air intake located between the first thruster and the second thruster.

Example 4. The load control system according to Example 2, wherein the fan unit is a first fan unit and further comprising a second fan unit, wherein the second fan unit comprises a third thruster and a fourth thruster in the plurality of thrusters, and wherein the first fan unit and the second fan unit are at opposite ends of the litter frame.

Example 5. The load control system according to Example 2, wherein the fan unit comprises a fan unit housing, wherein the fan unit housing protects the fan unit and acts as a bumper for the load.

Example 6. The load control system according to Example 1, wherein a sensor in the sensor suite is located in or proximate to one of a fan unit, a housing for the computer processor, a housing for a power controller, a housing for a power supply, the carrier, or a remote interface.

Example 7. The load control system according to Example 6, wherein the sensor is located to provide a line-of-sight view of at least one of a ground surface or the carrier.

Example 8. The load control system according to Example 6, wherein the sensor comprises at least one of a vector navigation unit, an inertial measurement unit, an orientation measurement system, an absolute position measurement system, a proximity sensor, an optical sensor, a stain gauge sensor, and a thrust speed sensor.

Example 9. The load control system according to Example 1, further comprising a housing containing the processor and memory and a power supply and wherein the processor executes the thrust control module in the memory to control the plurality of thrusters to influence at least one of the position, orientation, or motion of the load to impart a torque on the load.

Example 10. The load control system according to Example 9, wherein the housing is a first housing, the power supply is a first power supply and further comprising a second housing for a second power supply and wherein the processor executes the thrust control module in the memory to control the plurality of thrusters to influence at least one of the position, orientation, or motion of the load to impart one of a horizontal thrust vector or the torque on the load.

Example 11. The load control system according to Example 10, further comprising a first fan unit and a second fan unit, wherein the plurality of thrusters are contained in the first fan unit and the second fan unit, and wherein the processor executes the thrust control module in the memory to control the plurality of thrusters in the first fan unit and the second fan unit to influence at least one of the position, orientation, or motion of the load to impart one of a horizontal thrust vector or the torque on the load control system.

Example 12. The load control system according to Example 11, wherein the first fan unit is contained in the first housing and the second fan unit is contained in the second housing.

Example 13. The load control system according to Example 11, wherein the first fan unit and the second fan unit are at opposite ends of the litter frame.

Example 14. The load control system according to Example 1, further comprising a housing for the processor and memory, wherein the housing for the processor and memory is centrally located within the litter frame.

Example 15. The load control system according to Example 1, wherein the litter frame comprises a brace, wherein the brace protects at least one of the sensor suite, the computer processor and memory, or the plurality of thrusters.

Example 16. The load control system according to Example 1, wherein the thrust control module determines the position, orientation, or motion by combining the sensor data from the sensor suite through a non-linear filter to determine a current state.

Example 17. The load control system according to Example 16, wherein the thrust control module further projects near-term future motion based on the current state with feedback from at least one of a functional mode or command state of an operational module, a thrust and orientation mapping, or a fan mapping.

Example 18. The load control system according to Example 16, wherein the non-linear filter is a Kalman filter.

Example 19. The load control system according to Example 17, wherein the thrust control module further outputs an output control to the plurality of thrusters based on the fan mapping to control the plurality of thrusters to control the motion of the load.

Example 20. The load control system according to Example 17, wherein the functional mode or command state comprises at least one of idle, maintain relative location or position relative to a carrier, move to a location, hold position, obstacle avoidance, or direct control.

Example 21. The load control system according to Example 1, wherein the plurality of thrusters are configured to generate a plurality of thrust vectors, wherein the plurality of thrust vectors are perpendicular to a long axis of the litter frame.

Example 22. The load control system according to Example 1, wherein the motion comprises at least one of yaw, pendular motion, or horizontal translation.

Example 23. The load control system according to Example 1, wherein the litter frame comprises a plurality of mounts for the plurality of thrusters.

Example 24. A modular load control system to influence at least one of a position, orientation, or motion of a load suspended by a cable from a carrier, comprising: a plurality of thrusters, a sensor suite, and a computer processor and memory, wherein the memory comprises a thrust control module which, when executed by the computer processor, determines a position, orientation, or motion of the load based on a sensor data from the sensor suite and controls the plurality of thrusters according to the position, orientation, or motion to influence at least one of the position, orientation, or motion of the load, and further comprising a modular housing, wherein the modular housing contains at least one of a subset of the plurality of thrusters, the sensor suite, or the computer processor and memory, and a housing-load securement mechanism to releasably secure the modular housing to the load.

Example 25. The modular load control system according to Example 24, wherein the housing-load securement mechanism allows the modular housing to be secured to a plurality of loads.

Example 26. The modular load control system according to Example 25, wherein the plurality of loads comprise at least one of a litter, a webbing bundle, or a container.

Example 27. The modular load control system according to Example 26, wherein the container comprises a rigid rectangular structure.

Example 28. The modular load control system according to Example 27, wherein the securement mechanism secures the modular housing to at least one of a top, a side, or a bottom of the rigid rectangular structure.

Example 29. The modular load control system according to Example 24, wherein the housing-load securement mechanism comprises at least one of a strap, an expansion brace, a bolting track, or a set of interlocking structures.

Example 30. The modular load control system according to Example 29, wherein the set of interlocking structures comprises a first interlocking structure secured to the load and a second interlocking structure secured to the modular housing.

Example 31. The modular load control system according to Example 30, wherein the first interlocking structure and the second interlocking structure physically engage with one another and, when so engaged, provide one degree of freedom of motion between the first interlocking structure and the second interlocking structure, wherein the one degree of freedom of motion allows the modular housing to be releasably secured to the load.

Example 32. The modular load control system according to Example 30, wherein the set of interlocking structures further comprises a third interlocking structure, wherein the third interlocking structure engages with at least one of the first interlocking structure or the second interlocking structure to preclude or prohibit the one degree of freedom of motion between the first interlocking structure and the second interlocking structure.

Example 33. The modular load control system according to Example 32, wherein the third interlocking structure precludes or prohibits the one degree of freedom of motion between the first interlocking structure and the second interlocking structure when the third interlocking structure is releasably interposed through the first interlocking structure and through the second interlocking structure.

Example 34. The modular load control system according to Example 29, wherein the set of interlocking structure comprises a rail secured to the load, a flange secured to the modular housing, and a pin.

Example 35. The modular load control system according to Example 34, wherein the rail comprises a rail hole, the flange comprises a flange hole, wherein the rail and flange slide together to align the rail hole and the flange hole, and wherein the pin passes through the rail hole and the flange hole and thereby releasably secures the flange and the module housing to the load.

Example 36. The modular load control system according to Example 24, wherein the modular housing contains all of the plurality of thrusters, the sensor suite, and the computer processor and memory.

Example 37. The modular load control system according to Example 36, further comprising a first fan unit and a second fan unit, wherein the first fan unit and second fan unit contain the plurality of thrusters.

Example 38. The modular load control system according to Example 37, further comprising a fan unit repositioning mechanism, wherein the fan unit repositioning mechanism allows the first fan unit and second fan unit to be repositioned within the modular load control system.

Example 39. The modular load control system according to Example 24, further comprising a frame, wherein the frame contains the plurality of thrusters, the sensor suite, the computer processor and memory, and the modular housing, and further comprising a fan unit, wherein the fan unit contains at least a subset of the plurality of thrusters, and further comprising a fan unit repositioning mechanism, wherein the fan unit repositioning mechanism allows the fan unit to be repositioned within the frame.

Example 40. The modular load control system according to Example 24, wherein the thrust control module determines the position, orientation, or motion of the load by combining the sensor data from the sensor suite through a non-linear filter to determine a current state.

Example 41. The modular load control system according to Example 40, wherein the thrust control module further projects near-term future motion based on the current state with feedback from at least one of a functional mode or command state of an operational module, a thrust and orientation mapping, or a fan mapping.

Example 42. The modular load control system according to Example 40, wherein the non-linear filter is a Kalman filter.

Example 43. The modular load control system according to Example 41, wherein the thrust control module further outputs an output control to the plurality of thrusters based on the fan mapping to control the plurality of thrusters to control the motion of the load.

Example 44. The modular load control system according to Example 24, wherein the modular housing contains the processor and memory and a power supply and wherein the processor executes the thrust control module in the memory to control the plurality of thrusters to influence at least one of the position, orientation, or motion of the load to impart a torque on the load.

Example 45. The modular load control system according to Example 44, wherein the modular housing is a first modular housing, the power supply is a first power supply and further comprising a second modular housing for a second power supply and wherein the processor executes the thrust control module in the memory to control the plurality of thrusters to influence at least one of the position, orientation, or motion of the load to impart one of a horizontal thrust vector or the torque on the load.

Example 46. The modular load control system according to Example 44, further comprising a first fan unit in the first modular housing and a second fan unit in the second modular housing, wherein the plurality of thrusters are contained in the first fan unit and the second fan unit, and wherein the processor executes the thrust control module in the memory to control the plurality of thrusters in the first fan unit and the second fan unit to influence at least one of the position, orientation, or motion of the load to impart one of a horizontal thrust vector or the torque on the load control system.

Example 47. A computer implemented method to influence at least one of a position, orientation, or motion of a load suspended by a cable from a carrier, comprising: determining a position, orientation, or motion of the load based on a sensor data from a sensor suite and controlling a plurality of thrusters according to the position, orientation, or motion to influence at least one of the position, orientation, or motion of the load, wherein the plurality of thrusters, sensor suite, a computer processor and memory to implement the method are integrated into a litter frame.

Example 48. The method according to Example 44, wherein the plurality of thrusters are in a fan unit.

Example 49. The method according to Example 45, further comprising drawing thrust fluid into the fan unit through an air intake located between the first thruster and the second thruster.

Example 50. The method according to Example 45, wherein the fan unit is a first fan unit and further comprising a second fan unit, wherein the second fan unit comprises a third thruster and a fourth thruster in the plurality of thrusters, and wherein the first fan unit and the second fan unit are at opposite ends of the litter frame.

Example 51. The method according to Example 45, wherein the fan unit comprises a fan unit housing, and further comprising protecting the fan unit and providing a bumper for the litter frame with the fan unit housing.

Example 52. The method according to Example 44, wherein a sensor in the sensor suite is located in or proximate to one of a fan unit, a housing for the computer processor, a housing for a power controller, a housing for a power supply, the carrier, or a remote interface.

Example 53. The method according to Example 49, wherein the sensor is located to provide a line-of-sight view of at least one of a ground surface or the carrier.

Example 54. The method according to Example 49, wherein the sensor comprises at least one of a vector navigation unit, an inertial measurement unit, an orientation measurement system, an absolute position measurement system, a proximity sensor, an optical sensor, a stain gauge sensor, and a thrust speed sensor.

Example 55. The method according to Example 44, further comprising controlling the plurality of thrusters to impart a torque on the litter frame, wherein the processor and memory and a power supply are contained in a housing.

Example 56. The method according to Example 52, wherein the housing is a first housing, the power supply is a first power supply and further comprising a second housing for a second power supply and further comprising controlling the plurality of thrusters to impart one of a horizontal thrust vector or the torque on the load control system.

Example 57. The method according to Example 53, further comprising a first fan unit and a second fan unit, wherein the plurality of thrusters are contained in the first fan unit and the second fan unit, and controlling the plurality of thrusters in the first fan unit and the second fan unit to impart one of a horizontal thrust vector or the torque on the load control system.

Example 58. The method according to Example 54, wherein the first fan unit is contained in the first housing and the second fan unit is contained in the second housing.

Example 59. The method according to Example 54, wherein the first fan unit and the second fan unit are at opposite ends of the litter frame.

Example 60. The method according to Example 44, further comprising a housing, wherein the housing contains the processor and memory and wherein the housing is centrally located within the litter frame.

Example 61. The method according to Example 44, wherein the litter frame comprises a brace, wherein the brace protects at least one of the sensor suite, the computer processor and memory, or the plurality of thrusters.

Example 62. The method according to Example 44, further comprising determining the position, orientation, or motion by combining the sensor data from the sensor suite through a non-linear filter to determine a current state, wherein the current state comprises the position, orientation, or motion.

Example 63. The method according to Example 59, further comprising projecting near-term future motion based on the current state.

Example 64. The method according to Example 60, wherein projecting near-term future motion based on the current state comprises updating the current state with feedback from at least one of a functional mode or command state of an operational module, a thrust and orientation mapping, or a fan mapping.

Example 65. The method according to Example 59, wherein the non-linear filter is a Kalman filter.

Example 66. The method according to Example 60, further comprising controlling the plurality of thrusters to control the motion of the load by outputting an output control to the plurality of thrusters based on the fan mapping.

Example 67. The method according to Example 61, wherein the functional mode or command state comprises at least one of idling, maintaining relative location or position relative to a carrier, moving to a location, hold position, avoiding an obstacle, and directing control based on user input.

Example 68. The method according to Example 67, wherein avoiding an obstacle comprises at least one of determining distances of at least two sensors relative to an object and controlling the plurality of thrusters according to the position, orientation, or motion to equalize the distances of the at least two sensors relative to the object or determining a geometry and a path of the load, identifying obstacles in the path of the load, determining a passage relative to the obstacles based on the geometry and path of the load, and controlling the plurality of thrusters according to the position, orientation, or motion to influence the motion of the load and avoid the obstacles.

Example 69.

Example 70. The method according to Example 44, wherein controlling a plurality of thrusters according to the position, orientation, or motion to control the motion of the load comprises generating a plurality of thrust vectors, wherein the plurality of thrust vectors are perpendicular to a long axis of the litter frame.

Example 71. The method according to Example 44, wherein the motion comprises at least one of yaw, pendular motion, or horizontal translation.

Example 72. The method according to Example 44, wherein the litter frame comprises a plurality of mounts for the plurality of thrusters.

Example 73. A computer implemented method to influence at least one of a position, orientation, or motion of a load suspended by a cable from a carrier, comprising: determining a position, orientation, or motion of the load based on a sensor data from a sensor suite and controlling a plurality of thrusters according to the position, orientation, or motion to control the motion of the load, wherein at least one of the plurality of thrusters, the sensor suite, or a computer processor and memory to perform the method are contained in a modular housing, wherein the modular housing comprises a housing-load securement mechanism to releasably secure the modular housing to the load.

Example 74. The method according to Example 68, further comprising securing the modular housing to at least one of a plurality of loads with the housing-load securement mechanism.

Example 75. The method according to Example 68, wherein the plurality of loads comprise at least one of a litter, a webbing bundle, or a container.

Example 76. The method according to Example 68, wherein the container comprises a rigid rectangular structure.

Example 77. The method according to Example 71, further comprising securing the modular housing to at least one of a top, a side, or a bottom of the rigid rectangular structure with the securement mechanism.

Example 78. The method according to Example 68, wherein the housing-load securement mechanism comprises at least one of a strap, an expansion brace, or a bolting track, or a set of interlocking structures.

Example 79. The method according to Example 73, wherein the set of interlocking structures comprises a first interlocking structure secured to the load and a second interlocking structure secured to the modular housing.

Example 80. The method according to Example 73, further comprising engaging the first interlocking structure and the second interlocking structure with one another to provide one degree of freedom of motion between the first interlocking structure and the second interlocking structure, wherein the one degree of freedom of motion allows the modular housing to be releasably secured to the load.

Example 81. The method according to Example 75, wherein the set of interlocking structures further comprises a third interlocking structure, and further comprising engaging the third interlocking structure with at least one of the first interlocking structure or the second interlocking structure to preclude or prohibit the one degree of freedom of motion between the first interlocking structure and the second interlocking structure.

Example 82. The method according to Example 76, further comprising releasably interposing the third interlocking structure through the first interlocking structure and the second interlocking structure to preclude or prohibit the one degree of freedom of motion between the first interlocking structure and the second interlocking structure.

Example 83. The method according to Example 73, wherein the set of interlocking structure comprises a rail secured to the load, a flange secured to the modular housing, and a pin.

Example 84. The method according to Example 78, wherein the rail comprises a rail hole, the flange comprises a flange hole, wherein the rail and flange slide together to align the rail hole and the flange hole, and wherein the pin passes through the rail hole and the flange hole and thereby releasably secures the flange and the module housing to the load.

Example 85. The method according to Example 68, wherein the modular housing contains all of the plurality of thrusters, the sensor suite, and the computer processor and memory.

Example 86. The method according to Example 74, further comprising a first fan unit and a second fan unit, wherein the first fan unit and second fan unit contain the plurality of thrusters.

Example 87. The method according to Example 81, further comprising a fan unit repositioning mechanism, and further comprising repositioning the first fan unit and second fan unit within the modular load control system with the fan unit repositioning mechanism.

Example 88. The method according to Example 68, further comprising a frame, wherein the frame contains the plurality of thrusters, the sensor suite, the computer processor and memory, and the modular housing, and further comprising a fan unit, wherein the fan unit contains at least a subset of the plurality of thrusters, and a fan unit repositioning mechanism, and further comprising reposition the fan unit with the fan unit repositioning mechanism within the frame.

Example 89. The method according to Example 68, further comprising determining the position, orientation, or motion by combining the sensor data from the sensor suite through a non-linear filter to determine a current state.

Example 90. The method according to Example 83, further comprising projecting near-term future motion based on the current state with feedback from at least one of a functional mode or command state of an operational module, a thrust and orientation mapping, or a fan mapping.

Example 91. The method according to Example 90, wherein the functional mode or command state of the operational module comprises at least one of idle, maintain relative location or position relative to a carrier, move to a location, hold position, obstacle avoidance, or direct control.

Example 92. The method according to Example 91, wherein obstacle avoidance comprises at least one of determining distances of at least two sensors relative to an object and controlling the plurality of thrusters according to the position, orientation, or motion to equalize the distances of the at least two sensors relative to the object or determining a geometry and a path of the load, identifying obstacles in the path of the load, determining a passage relative to the obstacles based on the geometry and path of the load, and controlling the plurality of thrusters according to the position, orientation, or motion to influence the motion of the load and avoid the obstacles.

Example 93. The method according to Example 83, wherein the non-linear filter is a Kalman filter.

Example 94. The method according to Example 85, further comprising controlling the plurality of thrusters to control the motion of the load by outputting an output control to the plurality of thrusters based on the fan mapping.

Example 95. An apparatus for control of a motion of a load suspended by a cable from a carrier, comprising: means comprising a computer processor and memory to determine a position, orientation, or motion based on a sensor data from a sensor suite and means to control a plurality of thrusters according to the position, orientation, or motion to influence at least one of the position, orientation, or motion of the load, wherein the plurality of thrusters, sensor suite, the computer processor and memory are integrated into a litter frame.

Example 96. The apparatus according to Example 88, further comprising means to propel thrust fluid with the plurality of thrusters to generate thrust vectors to control the motion of the load.

Example 97. The apparatus according to Example 89, further comprising means to draw thrust fluid into the plurality of thrusters through an air intake between a first thruster and a second thruster of the plurality of thrusters, wherein the first thruster and the second thruster are in a fan unit and the air intake is between the first thruster and the second thruster in the fan unit.

Example 98. The apparatus according to Example 90, wherein the fan unit is a first fan unit and further comprising a second fan unit, wherein the second fan unit comprises a third thruster and a fourth thruster in the plurality of thrusters, and wherein the first fan unit and the second fan unit are at opposite ends of the litter frame.

Example 99. The apparatus according to Example 90, further comprising means to protect the fan unit and means to provide a bumper for the litter frame with a fan unit housing.

Example 100. The apparatus according to Example 88, wherein a sensor in the sensor suite is located in or proximate to one of a fan unit, a housing for the computer processor, a housing for a power controller, a housing for a power supply, the carrier, or a remote interface.

Example 101. The apparatus according to Example 88, wherein the sensor comprises at least one of a vector navigation unit, an inertial measurement unit, an orientation measurement system, an absolute position measurement system, a proximity sensor, an optical sensor, a stain gauge sensor, and a thrust speed sensor.

Example 102. The apparatus according to Example 88, further comprising means to control the plurality of thrusters to influence at least one of the position, orientation, or motion of the load to impart a torque on the litter frame, wherein the processor and memory and a power supply are contained in a housing.

Example 103. The apparatus according to Example 88, wherein the housing is a first housing, the power supply is a first power supply and further comprising a second housing for a second power supply and further comprising means to control the plurality of thrusters to influence at least one of the position, orientation, or motion of the load to impart one of a horizontal thrust vector or the torque on the load control system.

Example 104. The apparatus according to Example 96, further comprising a first fan unit and a second fan unit, wherein the plurality of thrusters are contained in the first fan unit and the second fan unit, and further comprising means to control the plurality of thrusters in the first fan unit and the second fan unit to influence at least one of the position, orientation, or motion of the load to impart one of a horizontal thrust vector or the torque on the load control system.

Example 105. The apparatus according to Example 97, wherein the first fan unit is contained in the first housing and the second fan unit is contained in the second housing.

Example 106. The apparatus according to Example 97, wherein the first fan unit and the second fan unit are at opposite ends of the litter frame.

Example 107. The apparatus according to Example 88, further comprising means for a brace to protect at least one of the sensor suite, the computer processor and memory, or the plurality of thrusters.

Example 108. The apparatus according to Example 88, further comprising means to determine the position, orientation, or motion using means to combine the sensor data from the sensor suite through a non-linear filter to determine a current state, wherein the current state comprises the position, orientation, or motion.

Example 109. The apparatus according to Example 101, further comprising means to project near-term future motion based on the current state.

Example 110. The apparatus according to Example 102, wherein means to project near-term future motion based on the current state comprises means to update the current state with feedback from at least one of a functional mode or command state of an operational module, a thrust and orientation mapping, or a fan mapping.

Example 111. The apparatus according to Example 101, wherein the non-linear filter is a Kalman filter.

Example 112. The apparatus according to Example 103, further comprising means to control the plurality of thrusters to control the motion of the load using means to output an output control to the plurality of thrusters based on the fan mapping.

Example 113. The apparatus according to Example 103, wherein the functional mode or command state comprises at least one of means to idle, means to maintain relative location or position relative to a carrier, means to move to designated a location, means to hold a position, means to avoid an obstacle, and means to direct control based on user input.

Example 114. The apparatus according to Example 88, wherein means to control a plurality of thrusters according to the position, orientation, or motion and means to control the motion of the load comprises means to generate a plurality of thrust vectors, wherein the plurality of thrust vectors are perpendicular to a long axis of the litter frame.

Example 115. The apparatus according to Example 88, wherein the motion comprises at least one of yaw, pendular motion, or horizontal translation.

Example 116. The apparatus according to Example 88, wherein the litter frame comprises a plurality of mounts for the plurality of thrusters.

Example 117. An apparatus for control of a motion of a load suspended by a cable from a carrier, comprising: means comprising a computer processor and memory to determine a position, orientation, or motion based on a sensor data from a sensor suite and means to control a plurality of thrusters according to the position, orientation, or motion to control the motion of the load, wherein at least one of a subset of the plurality of thrusters, the sensor suite, or the computer processor and memory are contained in a modular housing, and means for a housing-load securement mechanism to releasably secure the modular housing to the load.

Example 118. The apparatus according to Example 110, wherein the means for the housing-load securement mechanism further comprise means to releasably secure the modular housing to at least one of a plurality of loads.

Example 119. The apparatus according to Example 111, wherein the plurality of loads comprise at least one of a litter, a webbing bundle, or a container.

Example 120. The apparatus according to Example 112, wherein the container comprises a rigid rectangular structure.

Example 121. The apparatus according to Example 113, further comprising means to secure the modular housing to at least one of a top, a side, or a bottom of the rigid rectangular structure with the securement mechanism.

Example 122. The apparatus according to Example 110, wherein the means for the housing-load securement mechanism comprises at least one of a strap, an expansion brace, a bolting track, or a set of interlocking structures.

Example 123. The apparatus according to Example 115, wherein the set of interlocking structures comprises means for a first interlocking structure secured to the load and a second interlocking structure secured to the modular housing.

Example 124. The apparatus according to Example 116, further comprising means for the first interlocking structure and the second interlocking structure to physically engage with one another and, when so engaged, means for the first interlocking structure and the second interlocking structure to provide one degree of freedom of motion between the first interlocking structure and the second interlocking structure, wherein the one degree of freedom of motion allows the modular housing to be releasably secured to the load.

Example 125. The apparatus according to Example 116, wherein the set of interlocking structures further comprises a third interlocking structure, wherein the third interlocking structure comprises means to engage with at least one of the first interlocking structure or the second interlocking structure to preclude or prohibit the one degree of freedom of motion between the first interlocking structure and the second interlocking structure.

Example 126. The apparatus according to Example 118, wherein the third interlocking structure comprises means to preclude or prohibit the one degree of freedom of motion between the first interlocking structure and the second interlocking structure when the third interlocking structure is releasably interposed through the first interlocking structure and through the second interlocking structure.

Example 127. The apparatus according to Example 115, wherein the set of interlocking structure comprises a rail secured to the load, a flange secured to the modular housing, and a pin.

Example 128. The apparatus according to Example 120, wherein the rail comprises a rail hole, the flange comprises a flange hole, and further comprising means for the rail and flange to slide together to align the rail hole and the flange hole, and means for the pin to pass through the rail hole and the flange hole and thereby releasably secure the flange and the module housing to the load.

Example 129. The apparatus according to Example 110, further comprising means for the modular housing to contain all of the plurality of thrusters, the sensor suite, and the computer processor and memory.

Example 130. The apparatus according to Example 116, further comprising a first fan unit and a second fan unit, and further comprising means for the first fan unit and second fan unit to contain the plurality of thrusters.

Example 131. The apparatus according to Example 123, further comprising means to means to reposition the first fan unit and second fan unit within the modular load control system with a fan unit repositioning mechanism.

Example 132. The apparatus according to Example 110, further comprising a frame, wherein the frame contains the plurality of thrusters, the sensor suite, the computer processor and memory, and the modular housing, and further comprising a fan unit, wherein the fan unit contains at least a subset of the plurality of thrusters, and further comprising means to reposition the fan unit within the frame.

Example 133. The apparatus according to Example 110, further comprising means to combine the sensor data from the sensor suite through a non-linear filter to determine a current state, wherein the current state comprises the position, orientation, or motion.

Example 134. The computer apparatus according to Example 125, further comprising means to project near-term future motion based on the current state with feedback from at least one of a functional mode or command state of an operational module, a thrust and orientation mapping, or a fan mapping.

Example 135. The computer apparatus according to Example 125, wherein the non-linear filter is a Kalman filter.

Example 136. The computer apparatus according to Example 110, further comprising means to output control to the plurality of thrusters based on the fan mapping to control the plurality of thrusters to control the motion of the load.

Example 137. One or more computer-readable media comprising instructions that cause a computer device, in response to execution of the instructions by a processor of the computer device, to: determine a position, orientation, or motion of a load suspended by a cable from a carrier based on a sensor data from a sensor suite and control a plurality of thrusters according to the position, orientation, or motion to influence at least one of the position, orientation, or motion of the load, wherein the plurality of thrusters, sensor suite, the computer processor, and a memory comprising the instructions are integrated into a litter frame and wherein the load comprises the litter frame.

Example 138. The computer-readable media according to Example 130, wherein the plurality of thrusters are in a fan unit.

Example 139. The computer-readable media according to Example 131, wherein the fan unit comprises an air intake located between the first thruster and the second thruster.

Example 140. The computer-readable media according to Example 131, wherein the fan unit is a first fan unit and further comprising a second fan unit, wherein the second fan unit comprises a third thruster and a fourth thruster in the plurality of thrusters, and wherein the first fan unit and the second fan unit are at opposite ends of the litter frame.

Example 141. The computer-readable media according to Example 131, wherein the fan unit comprises a fan unit housing, wherein the fan unit housing protects the fan unit and acts as a bumper for the load.

Example 142. The computer-readable media according to Example 130, wherein a sensor in the sensor suite is located in or proximate to one of a fan unit, a housing for the computer processor, a housing for a power controller, a housing for a power supply, the carrier, or a remote interface.

Example 143. The computer-readable media according to Example 135, wherein the sensor comprises at least one of a vector navigation unit, an inertial measurement unit, an orientation measurement system, an absolute position measurement system, a proximity sensor, an optical sensor, a stain gauge sensor, and a thrust speed sensor.

Example 144. The computer-readable media according to Example 130, wherein the instructions further cause the computer device, in response to execution of the instructions by a processor of the computer device, to control the plurality of thrusters to influence at least one of the position, orientation, or motion of the load to impart a torque on the litter frame, wherein the processor and memory and a power supply are contained in a housing.

Example 145. The computer-readable media according to Example 137, wherein the housing is a first housing, the power supply is a first power supply and further comprising a second housing for a second power supply and wherein the instructions further cause the computer device, in response to execution of the instructions by a processor of the computer device, to control the plurality of thrusters to influence at least one of the position, orientation, or motion of the load to impart one of a horizontal thrust vector or the torque on the load control system.

Example 146. The computer-readable media according to Example 137, further comprising a first fan unit and a second fan unit, wherein the plurality of thrusters are contained in the first fan unit and the second fan unit, and wherein the instructions further cause the computer device, in response to execution of the instructions by a processor of the computer device, to control the plurality of thrusters in the first fan unit and the second fan unit to influence at least one of the position, orientation, or motion of the load to impart one of a horizontal thrust vector or the torque on the load control system.

Example 147. The computer-readable media according to Example 139, wherein the first fan unit is contained in the first housing and the second fan unit is contained in the second housing.

Example 148. The computer-readable media according to Example 139, wherein the first fan unit and the second fan unit are at opposite ends of the litter frame.

Example 149. The computer-readable media according to Example 130, further comprising a housing, wherein the housing contains the processor and memory and wherein the housing is centrally located within the litter frame.

Example 150. The computer-readable media according to Example 130, wherein the litter frame comprises a brace, wherein the brace protects at least one of the sensor suite, the computer processor and memory, or the plurality of thrusters.

Example 151. The computer-readable media according to Example 130, wherein the instructions further cause the computer device, in response to execution of the instructions by a processor of the computer device, to determine the position, orientation, or motion by combining the sensor data from the sensor suite through a non-linear filter to determine a current state, wherein the current state comprises the position, orientation, or motion.

Example 152. The computer-readable media according to Example 147, wherein the instructions further cause the computer device, in response to execution of the instructions by a processor of the computer device, to project near-term future motion based on the current state.

Example 153. The computer-readable media according to Example 148, wherein project near-term future motion based on the current state comprises update the current state with feedback from at least one of a functional mode or command state of an operational module, a thrust and orientation mapping, or a fan mapping.

Example 154. The computer-readable media according to Example 147, wherein the non-linear filter is a Kalman filter.

Example 155. The computer-readable media according to Example 148, wherein the instructions further cause the computer device, in response to execution of the instructions by a processor of the computer device, to output an output control to the plurality of thrusters based on the fan mapping.

Example 156. The computer-readable media according to Example 149, wherein the functional mode or command state causes the computer device, in response to execution of the instructions by a processor of the computer device, to at least one of idle, maintain relative location or position relative to a carrier, move to a location, hold position, avoiding an obstacle, and directing control based on user input.

Example 157. The computer-readable media according to Example 130, wherein control a plurality of thrusters according to the position, orientation, or motion to control the motion of the load comprises generate a plurality of thrust vectors, wherein the plurality of thrust vectors are perpendicular to a long axis of the litter frame.

Example 158. The computer-readable media according to Example 130, wherein the motion comprises at least one of yaw, pendular motion, or horizontal translation.

Example 159. The computer-readable media according to Example 130, wherein the litter frame comprises a plurality of mounts for the plurality of thrusters.

Example 160. One or more computer-readable media comprising instructions that cause a computer device, in response to execution of the instructions by a processor of the computer device, to: determine a position, orientation, or motion based on a sensor data from a sensor suite and control a plurality of thrusters according to the position, orientation, or motion to influence at least one of the position, orientation, or motion of a load suspended by a cable from a carrier, wherein at least one of a subset of the plurality of thrusters, the sensor suite, or the computer processor and memory are contained in a modular housing, wherein the modular housing comprises a housing-load securement mechanism to releasably secure the modular housing to the load.

Example 161. The computer-readable media according to Example 153, wherein the housing-load securement mechanism is configured to secure the modular housing to at least one of a plurality of loads.

Example 162. The computer-readable media according to Example 154, wherein the plurality of loads comprise at least one of a litter, a webbing bundle, or a container.

Example 163. The computer-readable media according to Example 155, wherein the at least one of the plurality of loads comprises the container and the container comprises a rigid rectangular structure.

Example 164. The computer-readable media according to Example 156, wherein the modular housing is secured to at least one of a top, a side, or a bottom of the rigid rectangular structure with the securement mechanism.

Example 165. The computer-readable media according to Example 153, wherein the housing-load securement mechanism comprises at least one of a strap, an expansion brace, a bolting track, or a set of interlocking structures.

Example 166. The computer-readable media according to Example 158, wherein the set of interlocking structures comprises a first interlocking structure secured to the load and a second interlocking structure secured to the modular housing.

Example 167. The computer-readable media according to Example 159, wherein the first interlocking structure and the second interlocking structure physically engage with one another and, when so engaged, provide one degree of freedom of motion between the first interlocking structure and the second interlocking structure, wherein the one degree of freedom of motion allows the modular housing to be releasably secured to the load.

Example 168. The computer-readable media according to Example 159, wherein the set of interlocking structures further comprises a third interlocking structure, wherein the third interlocking structure engages with at least one of the first interlocking structure or the second interlocking structure to preclude or prohibit the one degree of freedom of motion between the first interlocking structure and the second interlocking structure.

Example 169. The computer-readable media according to Example 161, wherein the third interlocking structure precludes or prohibits the one degree of freedom of motion between the first interlocking structure and the second interlocking structure when the third interlocking structure is releasably interposed through the first interlocking structure and through the second interlocking structure.

Example 170. The computer-readable media according to Example 158, wherein the set of interlocking structure comprises a rail secured to the load, a flange secured to the modular housing, and a pin.

Example 171. The computer-readable media according to Example 163, wherein the rail comprises a rail hole, the flange comprises a flange hole, wherein the rail and flange slide together to align the rail hole and the flange hole, and wherein the pin passes through the rail hole and the flange hole and thereby releasably secures the flange and the module housing to the load.

Example 172. The computer-readable media according to Example 153, wherein the modular housing contains all of the plurality of thrusters, the sensor suite, and the computer processor and memory.

Example 173. The computer-readable media according to Example 165, further comprising a first fan unit and a second fan unit, wherein the first fan unit and second fan unit contain the plurality of thrusters.

Example 174. The computer-readable media according to Example 166, further comprising a fan unit repositioning mechanism, wherein the fan repositioning mechanism is configured to reposition the first fan unit and second fan unit within the modular load control system.

Example 175. The computer-readable media according to Example 153, further comprising a frame, wherein the frame contains the plurality of thrusters, the sensor suite, the computer processor and memory, and the modular housing, and further comprising a fan unit, wherein the fan unit contains at least a subset of the plurality of thrusters, and further comprising a fan unit repositioning mechanism, wherein the fan unit repositioning mechanism allows the fan unit to be repositioned within the frame.

Example 176. The computer-readable media according to Example 153, wherein the instructions further cause the computer device, in response to execution of the instructions by a processor of the computer device, to combine the sensor data from the sensor suite through a non-linear filter to determine a current state, wherein the current state comprises the position, orientation, or motion.

Example 177. The computer-readable media according to Example 169, wherein the instructions further cause the computer device, in response to execution of the instructions by a processor of the computer device, to project near-term future motion based on the current state with feedback from at least one of a functional mode or command state of an operational module, a thrust and orientation mapping, or a fan mapping.

Example 178. The computer-readable media according to Example 169, wherein the non-linear filter is a Kalman filter.

Example 179. The computer-readable media according to Example 153, wherein the instructions further cause the computer device, in response to execution of the instructions by a processor of the computer device, to output control to the plurality of thrusters based on the fan mapping to control the plurality of thrusters to control the motion of the load.

What is claimed is:

1. A modular load control system to influence at least one of a position, orientation, or motion of a load suspended by a cable from a carrier, comprising:
a plurality of modular thruster housings, a sensor suite, and a computer processor and memory, wherein the memory comprises a thrust control module which, when executed by the computer processor, is to determine a position, orientation, or motion based on a sensor data from the sensor suite and is to control a plurality of fans in the plurality of thrusters housings according to the position, orientation, or motion to influence at least one of the position, orientation, or motion of the load, further comprising a fan repositioning mechanism, wherein the fan repositioning mechanism allows at least two of the modular thruster housings to be repositioned in the modular load control system.

2. The modular load control system according to claim 1, wherein to determine the position, orientation, or motion based on the sensor data from the sensor suite comprises to fuse the sensor data from the sensor suite in a non-linear filter to determine a current state of the modular load control system.

3. The modular load control system according to claim 2, wherein the non-linear filter comprises a non-linear flavor of a Kalman filter.

4. The modular load control system according to claim 2, wherein the thrust control module is further to project near-term future motion based on the current state.

5. The modular load control system according to claim 4, wherein to project near-term future motion based on the current state comprises to fuse the sensor data in a non-linear flavor of a Kalman filter.

6. The modular load control system according to claim 2, wherein to control the plurality of thrusters according to the position, orientation, or motion to influence at least one of the position, orientation, or motion of the load comprises to fuse the sensor data from the sensor suite in the non-linear filter to determine the current state of the modular load control system with feedback from at least one of a functional mode or command state of an operational module, a thrust and orientation mapping, or a fan mapping.

7. The modular load control system according to claim 4, wherein the control module is further to determine the thrust and orientation mapping according to at least one of an orientation of a fan in plurality of thruster housings or a power signal to the fan in the plurality of thruster housings.

8. A method to influence at least one of a position, orientation, or motion of a load suspended by a cable from a carrier, comprising:
securing a modular thruster housing to the load;
with a computer processor and memory, wherein the memory comprises a thrust control module, performing the thrust control module with the computer processor and thereby determining the position, orientation, or motion of the load based on a sensor data from a sensor suite; and controlling a thruster in the modular thruster housing according to the position, orientation, or motion to influence at least one of the position, orientation, or motion of the load, and further comprising repositioning the modular thruster housing with a fan unit repositioning mechanism.

9. The method according to claim 8, wherein determining the position, orientation, or motion based on the sensor data from the sensor suite comprises fusing the sensor data from the sensor suite in a non-linear filter to determine a current state of the load.

10. The method according to claim 9, wherein the non-linear filter comprises a non-linear flavor of a Kalman filter.

11. An apparatus to influence at least one of a position, orientation, or motion of a load suspended by a cable from a carrier, comprising:
means to secure a modular thruster housing to the load;
means to, with a thrust control module in a computer memory, perform the thrust control module and means to thereby determine the position, orientation, or motion of the load based on a sensor data from a sensor suite; and
means to control a thruster in the modular thruster housing according to the position, orientation, or motion to influence at least one of the position, orientation, or motion of the load; and further comprising
means to reposition the modular thruster housing with a fan unit repositioning mechanism.

12. The apparatus according to claim 11, wherein means to determine the position, orientation, or motion based on the sensor data from the sensor suite comprises means to fuse the sensor data from the sensor suite in a non-linear filter to determine a current state of the load.

13. The apparatus according to claim 12, wherein the non-linear filter comprises a non-linear flavor of a Kalman filter.

14. The apparatus according to claim 12, further comprising means to project near-term future motion based on the current state.

15. The apparatus according to claim 12, wherein means to project near-term future motion based on the current state comprises to means to fuse the sensor data in a non-linear flavor of a Kalman filter.

16. The apparatus according to claim 12, wherein means to control the plurality of thrusters according to the position, orientation, or motion to influence at least one of the position, orientation, or motion of the load comprises means to fuse the sensor data from the sensor suite in the non-linear filter to determine the current state of the modular load control system with feedback from at least one of a functional mode or command state of an operational module, a thrust and orientation mapping, or a fan mapping.

17. The apparatus according to claim 16, further comprising mean to determine the thrust and orientation mapping according to at least one of an orientation of a fan in plurality of thruster housings or a power signal to the fan in the plurality of thruster housings.

* * * * *